(12) United States Patent
Chen et al.

(10) Patent No.: US 10,548,124 B2
(45) Date of Patent: Jan. 28, 2020

(54) DOWNLINK CONTROL FORMAT INDICATOR

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US); Tao Luo, San Diego, CA (US); Srinivas Yerramalli, San Diego, CA (US); Tingfang Ji, San Diego, CA (US); Aleksandar Damnjanovic, Del Mar, CA (US); Yongbin Wei, La Jolla, CA (US); Naga Bhushan, San Diego, CA (US); Durga Prasad Malladi, San Diego, CA (US); Ravi Teja Sukhavasi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/659,451

(22) Filed: Jul. 25, 2017

(65) Prior Publication Data

US 2017/0339683 A1   Nov. 23, 2017

Related U.S. Application Data

(62) Division of application No. 14/494,956, filed on Sep. 24, 2014.
(Continued)

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/001* (2013.01); *H04L 5/0044* (2013.01);
(Continued)

(58) Field of Classification Search
CPC ..... H04L 5/001; H04L 5/0044; H04L 5/0053; H04L 5/0055; H04L 5/0091;
(Continued)

(56) References Cited

U.S. PATENT DOCUMENTS

| 6,011,784 A | 1/2000 | Brown et al. |
| 2006/0159003 A1 | 7/2006 | Nanda et al. |

(Continued)

FOREIGN PATENT DOCUMENTS

| CN | 101272540 A | 9/2008 |
| CN | 102106096 A | 6/2011 |

(Continued)

OTHER PUBLICATIONS

ISA/EP, International Search Report and Written Opinion of the International Searching Authority, Int'l Application No. PCT/US2014/057519, Dec. 5, 2014, European Patent Office, Rijswijk, NL, 11 pgs.
(Continued)

*Primary Examiner* — Steven H Nguyen
(74) *Attorney, Agent, or Firm* — Holland & Hart LLP

(57) ABSTRACT

Methods, apparatuses, systems, and devices are described for wireless communication. In one method, a control format indicator value for a frame may be received over a physical carrier in a shared spectrum. Based on the control format indicator value, a number of subframes of the frame to be used by a base station for downlink transmissions over the physical carrier may be determined. The control format indicator value may indicate an end of transmission, if data is to be transmitted during the frame, a number of subframes to be used for transmission, or whether the current subframe is the final subframe used for transmission. In some cases, a user equipment (UE) may use the control format indicator value to determine a sleep schedule. Further, ACK/NACK transmissions by a UE may be scheduled based on the control format indicator value.

13 Claims, 36 Drawing Sheets

Related U.S. Application Data

(60) Provisional application No. 61/890,554, filed on Oct. 14, 2013.

(51) Int. Cl.
    *H04W 52/02* (2009.01)
    *H04L 29/06* (2006.01)
    *H04W 16/14* (2009.01)
    *H04W 74/02* (2009.01)
    *H04W 76/15* (2018.01)

(52) U.S. Cl.
    CPC .......... *H04L 5/0053* (2013.01); *H04L 5/0055* (2013.01); *H04L 5/0091* (2013.01); *H04L 69/14* (2013.01); *H04W 16/14* (2013.01); *H04W 52/0209* (2013.01); *H04W 74/02* (2013.01); *H04W 76/15* (2018.02); *Y02D 70/00* (2018.01)

(58) Field of Classification Search
    CPC ...... H04L 65/601; H04L 69/14; H04W 16/14; H04W 52/0209; H04W 72/042; H04W 74/02; H04W 76/025; H04W 76/15; Y02B 60/50; Y02D 70/00; Y02D 70/1222; Y02D 70/1242; Y02D 70/1262; Y02D 70/1264; Y02D 70/142; Y02D 70/146; Y02D 70/26
    See application file for complete search history.

(56) References Cited

U.S. PATENT DOCUMENTS

| | | |
|---|---|---|
| 2006/0239292 A1 | 10/2006 | Kahana et al. |
| 2006/0251051 A1 | 11/2006 | Bhatt et al. |
| 2007/0286122 A1 | 12/2007 | Fonseca |
| 2009/0046605 A1 | 2/2009 | Gao et al. |
| 2009/0241004 A1* | 9/2009 | Ahn ....................... H04L 1/1812 714/749 |
| 2011/0128922 A1 | 6/2011 | Chen et al. |
| 2011/0317645 A1 | 12/2011 | Jen |
| 2012/0127938 A1* | 5/2012 | Lv ..................... H04W 72/1205 370/329 |
| 2012/0207036 A1 | 8/2012 | Ong et al. |
| 2012/0245355 A1* | 9/2012 | Viscomi ............... C07D 498/22 546/40 |
| 2012/0250532 A1 | 10/2012 | Husted et al. |
| 2012/0264468 A1 | 10/2012 | Turtinen et al. |
| 2012/0275355 A1 | 11/2012 | Park et al. |
| 2012/0294210 A1* | 11/2012 | Jiang ..................... H04L 1/1887 370/280 |
| 2013/0003664 A1 | 1/2013 | Frenne et al. |
| 2013/0083740 A1* | 4/2013 | Eriksson ............... H04L 1/1861 370/329 |
| 2013/0094456 A1 | 4/2013 | Ng |
| 2013/0163575 A1 | 6/2013 | Pak et al. |
| 2013/0195041 A1 | 8/2013 | Papasakellariou et al. |
| 2013/0195066 A1* | 8/2013 | Lee ....................... H04W 52/04 370/329 |
| 2013/0195073 A1 | 8/2013 | Chen et al. |
| 2013/0242928 A1 | 9/2013 | Goel et al. |
| 2013/0258914 A1 | 10/2013 | Seo et al. |
| 2014/0022960 A1 | 1/2014 | Fu et al. |
| 2014/0328292 A1 | 11/2014 | Yang et al. |
| 2015/0103715 A1 | 4/2015 | Chen et al. |
| 2015/0103777 A1 | 4/2015 | Chen et al. |
| 2015/0146643 A1 | 5/2015 | Fu et al. |
| 2015/0358915 A1* | 12/2015 | Semaan ............... H04W 52/146 370/329 |
| 2015/0359029 A1 | 12/2015 | Seo et al. |
| 2016/0128089 A1* | 5/2016 | Seo ......................... H04L 5/00 370/329 |

FOREIGN PATENT DOCUMENTS

| | | |
|---|---|---|
| CN | 102238639 A | 11/2011 |
| CN | 102835174 A | 12/2012 |
| EP | 2385649 A1 | 11/2011 |
| JP | 2010521942 A | 6/2010 |
| WO | WO-2010011104 A2 | 1/2010 |
| WO | WO-2010133043 A1 | 11/2010 |
| WO | WO-2011126100 A1 | 10/2011 |
| WO | WO-2012109195 A2 | 8/2012 |
| WO | WO-2012134863 A1 | 10/2012 |
| WO | WO-2012139278 A1 | 10/2012 |
| WO | WO-2013006988 A1 | 1/2013 |
| WO | WO-2013149387 A1 | 10/2013 |

OTHER PUBLICATIONS

Wikipedia—ISM Band, Sep. 27, 2013, pp. 1-5.

Huawei Technologies et al., "The Unlicensed Spectrum Usage for Future IMT Technologies Efficient LTE Technologies enables better Performance and Experience Content", Sep. 2, 2013, XP055234793, 18 pages.

Motorola: "LTE Advanced technical proposals" 3GPP IMT-Advanced Workshop, No. REV-080011, Apr. 2008 (2008-041, XP002559610 p. 7-p. 14.

Nihtila T., et al., "System performance of LTE and IEEE 802.11 coexisting on a shared frequency band", 2013 IEEE Wireless Communications and Networking Conference (WCNC), Apr. 1, 2013 (Apr. 1, 2013), XP055356721, pp. 1038-1043.

* cited by examiner

2300

Receive over a first physical carrier of a shared spectrum an indication from a base station of whether a clear channel assessment (CCA) performed by the base station for a second physical carrier of the shared spectrum was successful — 2305

FIG. 23

DOWNLINK CONTROL FORMAT INDICATOR

CROSS REFERENCES

The present Application for Patent is a Divisional of U.S. patent application Ser. No. 14/494,956, by Chen et al., entitled "Downlink Control Format Indicator," filed Sep. 24, 2014, which claims priority to U.S. Provisional Patent Application No. 61/890,554, by Chen et al., entitled "Downlink Control Management In LTE-U," filed Oct. 14, 2013, assigned to the assignee hereof, and expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of access points. The access points of a cellular network may include a number of base stations, such as NodeBs (NBs) or evolved NodeBs (eNBs). The access points of a wireless local area network (WLAN) may include a number of WLAN access points, such as WiFi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of a WLAN to offload some of the traffic and/or signaling of a cellular network. WLANs (or WiFi networks) are attractive because, unlike cellular networks that operate in a licensed spectrum, WiFi networks generally operate in an unlicensed spectrum.

When devices that communicate using different protocols (e.g., cellular and WLAN protocols) share a spectrum, a contention-based protocol may be used to determine what device(s) are able to transmit in different transmission periods of the shared spectrum.

SUMMARY

The described features generally relate to one or more improved methods, apparatuses, systems, and/or devices for wireless communication. More particularly, the described features relate to improved techniques for transmitting control information when physical carriers are capable of cross-scheduling in a shared spectrum. A control format indicator value, such as for a frame, may be transmitted/received. The recipient of the transmission may use the control format indicator value to determine a number of subframes to be used for downlink transmissions. In this way, the recipient of the transmission may know how long to listen for the scheduled transmission. Additionally, the recipient may determine a sleep schedule of a user equipment, or schedule acknowledgment/negative-acknowledgment transmissions based on the control format indicator value.

According to a first set of illustrative embodiments, a method for wireless communication is described. In one configuration, a control format indicator value for a frame may be received. The control format indicator value for the frame may be received over a physical carrier in a shared spectrum. The method may further include determining a number of subframes of the frame to be used by a base station for downlink transmissions over the physical carrier. In some cases, determining the number of subframes may be based on the control format indicator value.

In certain examples, a sleep schedule of a user equipment (UE) for the frame may be determined. The sleep schedule may be determined based on the control format indicator value.

In certain examples, acknowledgment (ACK)/negative-acknowledgment (NACK) transmissions by a user equipment (UE) may be scheduled. The ACK/NACK transmissions may be scheduled based on the control format indicator value. Additionally or alternatively, the control format indicator value is received during a first subframe of the frame. In some cases, the control format indicator value is received during a first symbol of the first subframe of the frame.

In certain examples, the control format indicator value is received during a last subframe of a previous frame. The control format indicator value may be received during a first symbol of a subframe of the frame. In some cases, a bitwidth of the control format indicator value may be based on a structure of the frame. The control format indicator value may indicate at least one of an end of transmission, if data is to be transmitted during the frame, a number of subframes of the frame to be used for transmission, and a final subframe for transmission. In some cases, the control format indicator value may be received as a part of at least one of a Channel Usage Pilot Signal (CUPS), Channel Usage Beacon Signal (CUBS), cell-specific reference signal (CRS), enhanced CRS (eCRS), transmission format indicator channel (TFICH), enhanced TFICH (eTFICH), physical control format indicator channel (PCFICH), and enhanced PCFICH (EPCFICH).

According to a second set of illustrative embodiments, an apparatus for wireless communication may include a processor and memory coupled to the processor. The processor may be configured to receive, over a physical carrier in a shared spectrum, a control format indicator value for a frame; and determine, based on the control format indicator value, a number of subframes of the frame to be used by a base station for downlink transmissions over the physical carrier. The processor may be further configured to perform one or more aspects of the method of the first set of illustrative embodiments.

According to a third set of illustrative embodiments, a method for wireless communication may include determining a number of subframes of a frame to be used by a base station for downlink transmissions over a physical carrier in a shared spectrum, and transmitting, over the physical carrier, a control format indicator value for the frame based on the determined number of subframes of the frame.

In certain examples, acknowledgment (ACK)/negative-acknowledgment (NACK) transmissions may be received by a user equipment (UE) based on the control format indicator value. The control format indicator value may be transmitted during a first subframe of the frame. In some cases, the control format indicator value is transmitted during a first symbol of the first subframe of the frame. The control format indicator value may be transmitted during a last subframe of a previous frame. In some examples, the control format indicator value may be transmitted during a first symbol of a subframe of the frame.

In certain examples, a bitwidth of the control format indicator value may be based on a structure of the frame. The control format indicator value may indicate at least one of an end of transmission, if data is to be transmitted during the frame, a number of subframes of the frame to be used for transmission, and a final subframe for transmission. In some cases, the control format indicator value may be transmitted as a part of at least one of a Channel Usage Pilot Signal (CUPS), Channel Usage Beacon Signal (CUBS), cell-specific reference signal (CRS), enhanced CRS (eCRS), transmission format indicator channel (TFICH), enhanced TFICH (eTFICH), physical control format indicator channel (PCFICH), and enhanced PCFICH (EPCFICH).

According to a fourth set of illustrative embodiments, an apparatus for wireless communication may include a processor and memory coupled to the processor. The processor may be configured to determine a number of subframes of a frame to be used by a base station for downlink transmissions over a physical carrier in a shared spectrum; and transmit, over the physical carrier, a control format indicator value for the frame based on the determined number of subframes of the frame. In certain examples, the processor may be further configured to implement one or more aspects of the method of the third set of illustrative embodiments.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 23 is a flowchart illustrating an examples of a method for wireless communication, in accordance with various aspects of the present disclosure;

DETAILED DESCRIPTION

Figure 1:
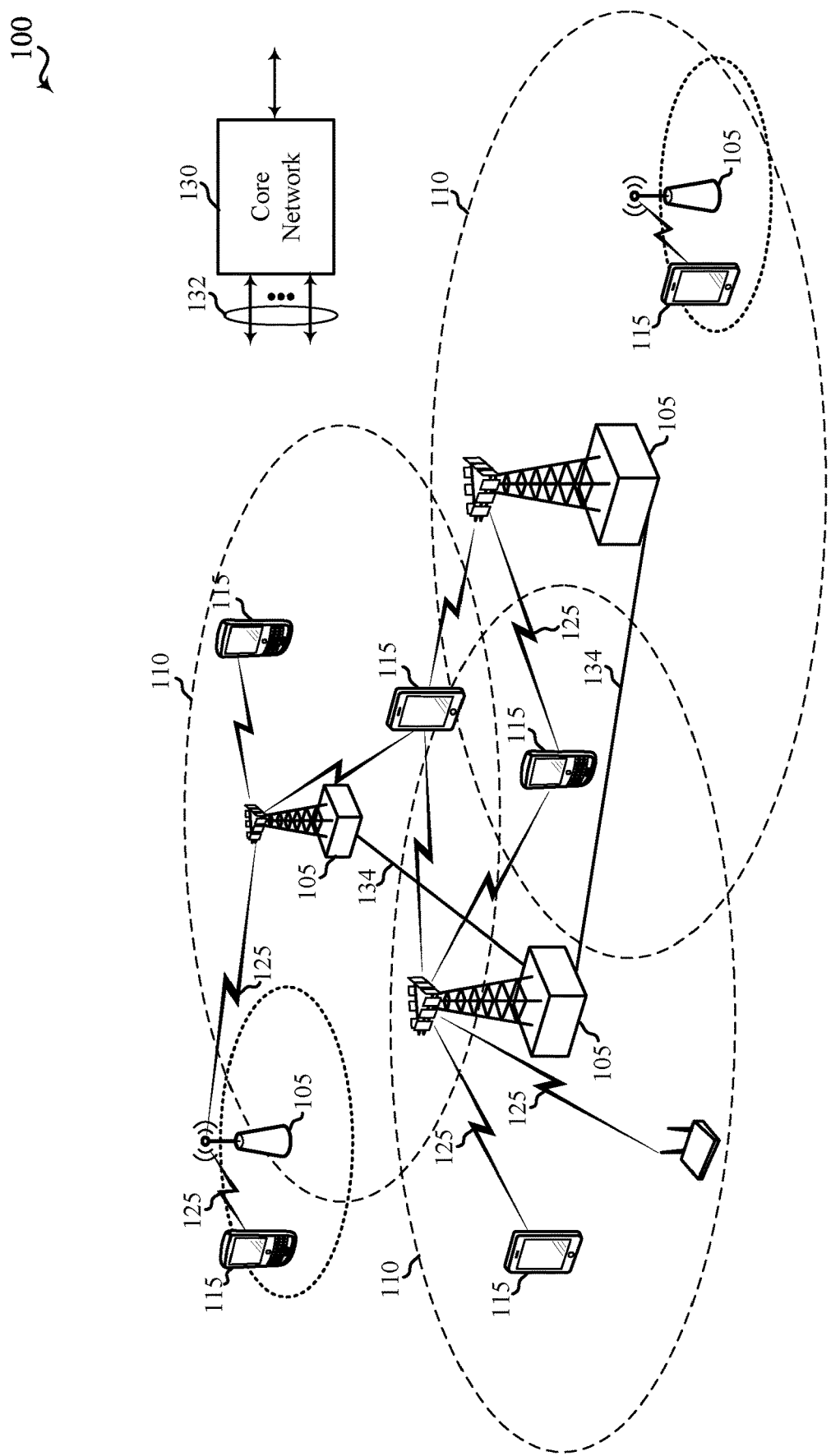
FIG. 1 shows a diagram of a wireless communication system, in accordance with various aspects of the present disclosure.

Methods, apparatuses, systems, and devices are described in which a transmitting device contends for access to a plurality of physical carriers in a shared spectrum. Because access to all of the plurality of physical carriers may not be guaranteed, issues may arise when the physical carriers are cross-scheduled. For example, when a first physical carrier is cross-scheduled with a second physical carrier, and a transmitting device is able to gain access to the first physical carrier but not the second physical carrier, a receiving device may not receive the control information which is necessary to make use of transmissions via the first physical carrier. Reservation of the first physical carrier without gaining access to the second physical carrier may therefore waste resources and/or delay transmissions.

In some cases, the methods, apparatuses, systems, and devices described herein may provide operators of cellular networks (e.g., operators of Long Term Evolution (LTE) or LTE-Advanced (LTE-A) communications networks) with more opportunities to use a shared unlicensed spectrum (e.g., a WLAN spectrum typically used for WiFi communications).

The techniques described herein are not limited to LTE, and may also be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a diagram of a wireless communication system 100, in accordance with various aspects of the present disclosure. The wireless communication system 100 includes a plurality of access points (e.g., base stations, eNBs, or WLAN access points) 105, a number of user equipments (UEs) 115, and a core network 130. Some of the access points 105 may communicate with the UEs 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node, a node, or some other suitable terminology. The coverage area 110 for an access point may be divided into sectors making up only a portion of the coverage area (not shown). The wireless communication system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In some embodiments, the wireless communication system 100 may include an LTE/LTE-A communications system (or network), which LTE/LTE-A communications system may support one or more unlicensed or shared spectrum modes of operation or deployment scenarios. In other embodiments, the wireless communication system 100 may support wireless communication using an unlicensed spectrum and an access technology different from LTE/LTE-A, or a licensed spectrum and an access technology different from LTE/LTE-A. In LTE/LTE-A communications systems, the term evolved NodeB or eNB may be generally used to describe of the access points 105. The wireless communication system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1 application protocol, etc.). The eNBs 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communication system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), an unlicensed spectrum or both. Similarly, the uplink transmissions may be made using a licensed spectrum (e.g., LTE), an unlicensed spectrum, or both.

In some embodiments of the wireless communication system 100, various deployment scenarios for LTE/LTE-A over an unlicensed or shared spectrum may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum.

In some examples, transmissions scheduled on a carrier of the unlicensed spectrum may be scheduled using a carrier of the licensed spectrum. For example, a first carrier in the licensed spectrum may be an anchor carrier configured to schedule transmissions to a receiving device over a second carrier in the unlicensed spectrum. However, the transmitting device may only be able to transmit the scheduled transmission over the second carrier if access to the second carrier is obtained using a clear channel assessment (CCA) procedure. Thus, in some examples, the first carrier may transmit an indication to the receiving device of whether the CCA for the second carrier was successful. This indication may allow the receiving device to ascertain whether to listen to the second carrier for the scheduled transmission. As explained in more detail below, the receiving device may also adjust ACK/NACK and CSI parameters for the second carrier based on the indication received on the first carrier.

Figure 2A:
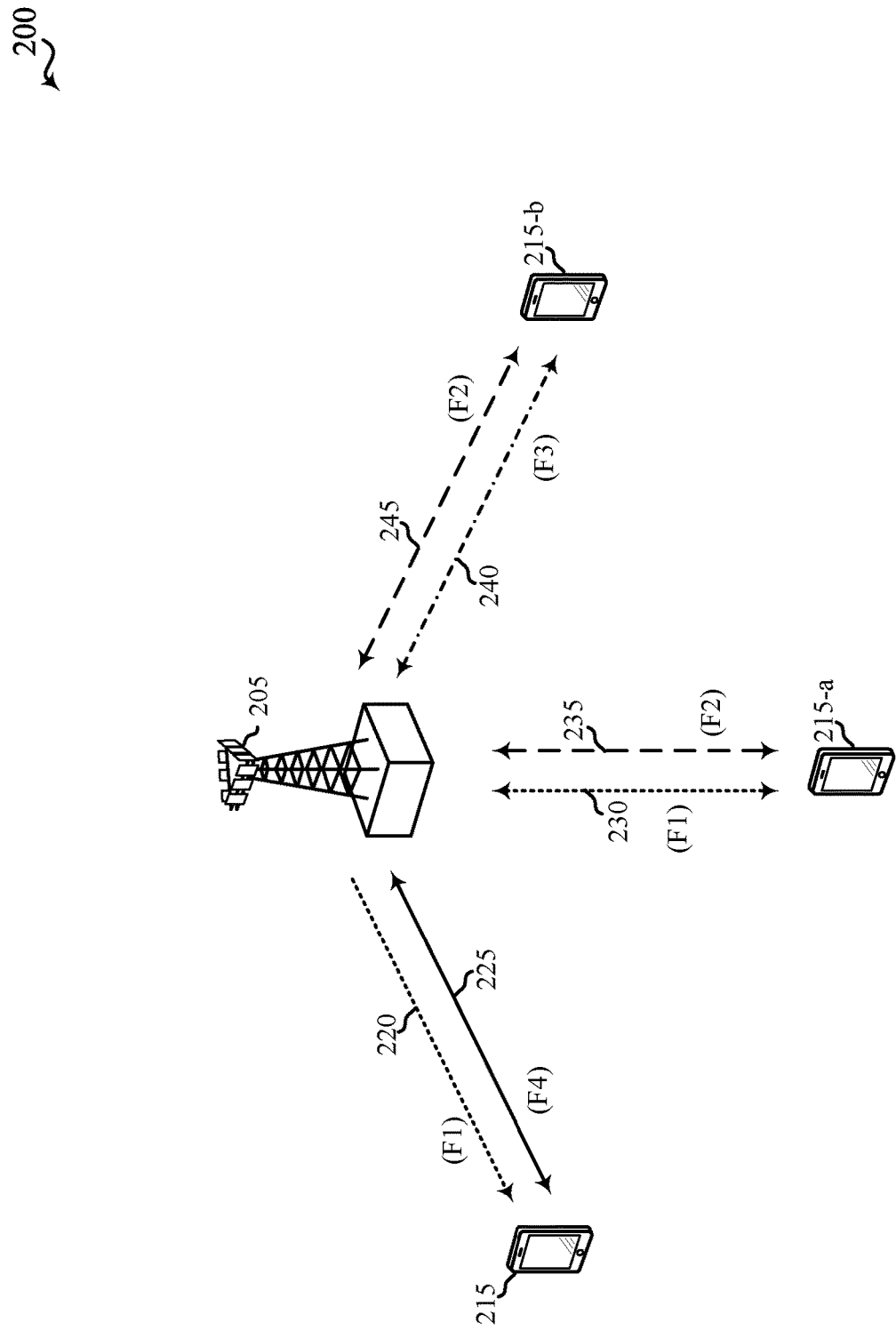
FIG. 2A shows a diagram that illustrates examples of deployment scenarios for using long term evolution (LTE) in an unlicensed spectrum, in accordance with various aspects of the present disclosure.

FIG. 2A shows a diagram that illustrates examples of deployment scenarios for using LTE in an unlicensed spectrum, in accordance with various aspects of the present disclosure. In one embodiment, FIG. 2A illustrates a wireless communication system 200 illustrating examples of a supplemental downlink mode and a carrier aggregation mode for an LTE network that supports LTE/LTE-A over an unlicensed or shared spectrum. The wireless communication system 200 may be an example of portions of the wireless communication system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in the wireless communication system 200, the base station 205 may transmit OFDMA communications signals to a UE 215 using a downlink 220. The downlink 220 may be associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some embodiments, the downlink 220 may be used for unicast services (e.g., addressed to one UE) services or for multicast services (e.g., addressed to several UEs). This scenario may occur with any service provider (e.g., traditional mobile network operator (MNO)) that uses a licensed spectrum and needs to relieve some of the traffic and/or signaling congestion.

In one example of a carrier aggregation mode in the wireless communication system 200, the base station 205 may transmit OFDMA communications signals to a UE 215-a using a bidirectional link 230 and may receive SC-FDMA communications signals from the same UE 215-a using the bidirectional link 230. The bidirectional link 230 may be associated with the frequency F1 in the unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic and/or signaling congestion.

In another example of a carrier aggregation mode in the wireless communication system 200, the base station 205 may transmit OFDMA communications signals to a UE 215-b using a bidirectional link 240 and may receive SC-FDMA communications signals from the same UE 215-b using the bidirectional link 240. The bidirectional link 240 may be associated with a frequency F3 in an unlicensed spectrum. The base station 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios that combine LTE over a licensed spectrum and LTE over an unlicensed or shared spectrum for capacity offload.

As described above, the typical service provider that may benefit from the capacity offload offered by using LTE in an unlicensed band is a traditional MNO with LTE spectrum. For these service providers, an operational configuration may include a bootstrapped mode (e.g., supplemental downlink, carrier aggregation) that uses the LTE primary component carrier (PCC) on the licensed spectrum and a secondary component carrier (SCC) on the unlicensed spectrum.

In the carrier aggregation mode, data and control may generally be communicated in LTE (e.g., bidirectional links 225, 235, and 245) while data may generally be communicated in LTE/LTE-A over an unlicensed or shared spectrum (e.g., bidirectional links 230 and 240). The carrier aggregation mechanisms supported when using an unlicensed or shared spectrum may fall under a hybrid frequency division duplexing-time division duplexing (FDD-TDD) carrier aggregation or a TDD-TDD carrier aggregation with different symmetry across component carriers.

Figure 2B:
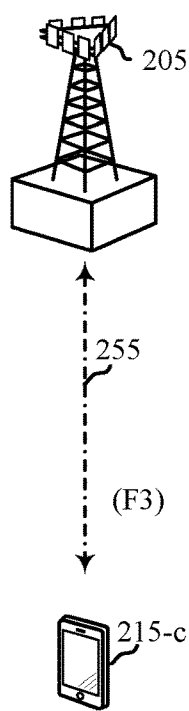
FIG. 2B shows a wireless communication system that illustrates an example of a standalone mode for wireless communications over an unlicensed or shared spectrum, in accordance with various aspects of the present disclosure.

FIG. 2B shows a wireless communication system 250 that illustrates an example of a standalone mode for an unlicensed or shared spectrum, in accordance with various aspects of the present disclosure. The wireless communication system 250 may be an example of portions of the wireless communication system 100 of FIG. 1 and/or 200 of FIG. 2A. Moreover, the base station 205 may be an example of the base stations 105 and/or 205 described with reference to FIG. 1 and/or 2A, while the UE 215-c may be an example of the UEs 115 and/or 215 of FIG. 1 and/or 2A.

In the example of a standalone mode in the wireless communication system 250, the base station 205 may transmit OFDMA communications signals to the UE 215-c using a bidirectional link 255 and may receive SC-FDMA communications signals from the UE 215-c using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have licensed spectrum.

In some embodiments, a transmitting apparatus such as an eNB 105 and/or base station 205 described with reference to FIGS. 1, 2A, and/or 2B, or a UE 115 and/or 215 described with reference to FIGS. 1, 2A, and/or 2B, may use a gating interval to gain access to a channel of the shared spectrum (e.g., to a physical channel of the licensed or unlicensed spectrum). The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting apparatus needs to perform a Clear Channel Assessment (CCA). The outcome of the CCA may indicate to the transmitting apparatus whether a channel of the shared unlicensed spectrum is available or in use. When the CCA indicates that the channel is available (e.g., "clear" for use), the gating interval may allow the transmitting apparatus to use the channel—typically for a predefined transmission interval. In some cases, if the CCA indicates that the channel is available, channel state information (CSI) for the channel may be measured and reported, such as based on reference signals in the frame where the CCA is cleared. In some examples, the CSI may be an instantaneous, or short-term, CSI and/or a statistical, or long-term, CSI. When the CCA indicates that the channel is not available (e.g., in use or reserved), the gating interval may prevent the transmitting apparatus from using the channel during the transmission interval. In some cases, if the CCA indicates that the channel is not available, CSI may be measured based on a previous frame and/or may be omitted for the frame. In some examples, the CCA may be an extended CCA (ECCA), in which successful contention to the unlicensed radio frequency spectrum band depends on the performance of a plurality of N CCAs, where N is a predefined positive integer.

In some cases, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in a shared spectrum, and to synchronize at least one boundary of the periodic gating interval with at least one boundary of a periodic frame structure (e.g., LTE/LTE-A radio frame) associated with the cellular downlink. Examples of such synchronization are shown in FIG. 3.

Figure 3:
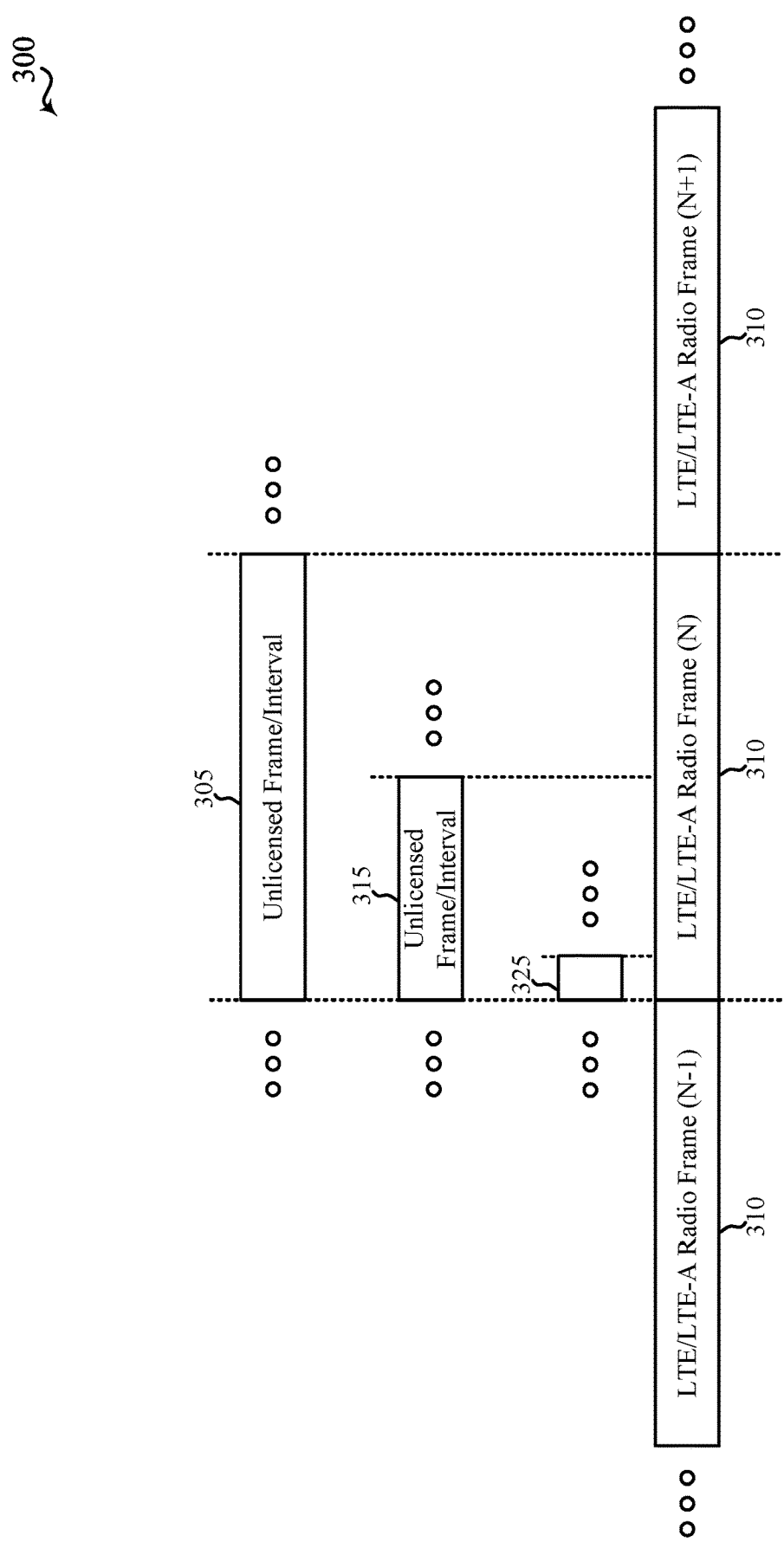
FIG. 3 shows examples of an unlicensed frame/interval for a cellular downlink in an unlicensed spectrum, in accordance with various aspects of the present disclosure.

FIG. 3 shows examples 300 of an unlicensed frame/interval 305, 315, and/or 325 for a cellular downlink in an unlicensed spectrum, in accordance with various aspects of the present disclosure. The unlicensed frame/interval 305, 315, and/or 325 may be used as a periodic gating interval by an eNB that supports transmissions over the unlicensed spectrum. Examples of such an eNB may be the access points 105 and/or base stations 205 described with reference to FIG. 1, 2A, and/or 2B. The unlicensed frame/interval 305, 315, and/or 325 may be used with the wireless communication system 100, 200, and/or 250 described with reference to FIGS. 1, 2A, and/or 2B.

By way of example, the duration of the unlicensed frame/interval 305 is shown to be equal to (or approximately equal to) a duration of an LTE/LTE-A radio frame 310 of a periodic frame structure associated with a cellular downlink. In some embodiments, "approximately equal" means the duration of the unlicensed frame/interval 305 is within a cyclic prefix (CP) duration of the duration of the periodic frame structure.

At least one boundary of the unlicensed frame/interval 305 may be synchronized with at least one boundary of the periodic frame structure that includes the LTE/LTE-A radio frames N−1 to N+1. In some cases, the unlicensed frame/interval 305 may have boundaries that are aligned with the frame boundaries of the periodic frame structure. In other cases, the unlicensed frame/interval 305 may have boundaries that are synchronized with, but offset from, the frame boundaries of the periodic frame structure. For example, the boundaries of the unlicensed frame/interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the unlicensed frame/interval 305 may also have a duration of ten milliseconds. In these cases, the boundaries of the unlicensed frame/interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the duration of the unlicensed frames/intervals 315 and 325 are shown to be sub-multiples of (or approximate sub-multiples of) the duration of the periodic frame structure associated with the cellular downlink. In some embodiments, an "approximate sub-multiple of" means the duration of the unlicensed frame/interval 315, 325 is within a cyclic prefix (CP) duration of the duration of a sub-multiple of (e.g., half or one-tenth) the periodic frame structure. For example, the unlicensed frame/interval 315 may have a duration of five milliseconds and the unlicensed frame/interval 325 may have a duration of 1 or 2 milliseconds.

Figure 4A:
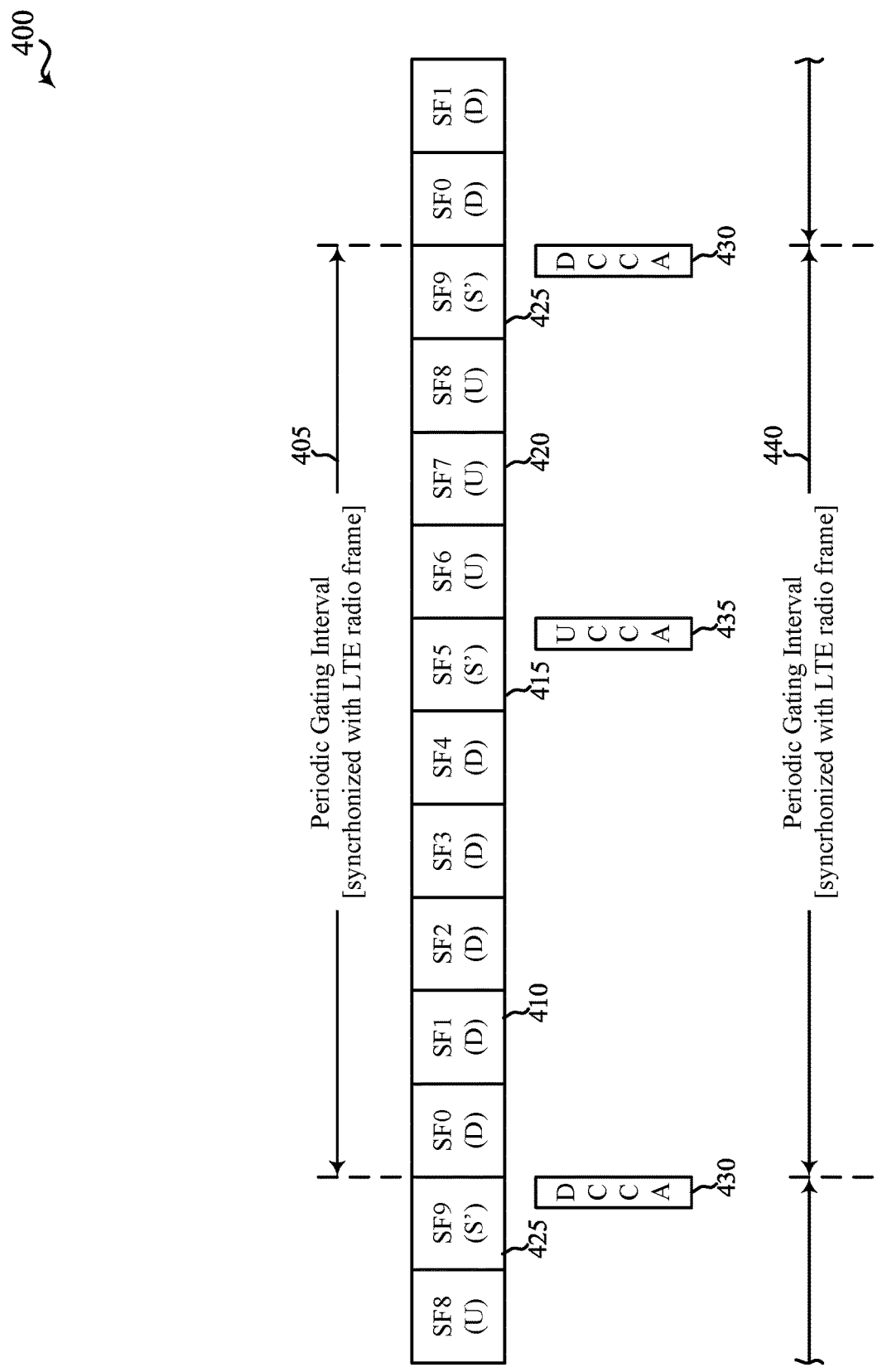
FIG. 4A shows an example of a periodic gating interval usable by both a cellular downlink and a cellular uplink in an unlicensed spectrum, in accordance with various aspects of the present disclosure.

FIG. 4A shows an example 400 of a periodic gating interval 405 usable by both a cellular downlink and a cellular uplink in an unlicensed spectrum. The periodic gating interval 405 may be used by eNBs and UEs that support LTE/LTE-A communications in an unlicensed or shared spectrum. Examples of such eNBs may be the eNBs 105 and 205 described with reference to FIGS. 1, 2A, and 2B. Examples of such UEs may be the UEs 115 and 215 described with reference to FIGS. 1, 2A, and 2B.

By way of example, the duration of the periodic gating interval 405 is shown to be equal to (or approximately equal to) the duration of a periodic frame structure 440 associated with the cellular downlink. The boundaries of the periodic gating interval 405 may be synchronized with (e.g., aligned with) the boundaries of the periodic frame structure 440.

The periodic frame structure 440 may include an LTE/LTE-A radio frame having ten subframes (e.g., SF0, SF1, . . . , SF9). Subframes SF0 through SF4 may be downlink (D) subframes 410, subframe SF5 may be a special (S') subframe 415, subframes SF6 through SF8 may be uplink (U) subframes 420, and subframe SF9 may be a special (S') subframe 425. The S' subframe SF9 may be used by an eNB to perform a CCA (e.g., a downlink CCA or DCCA 430) for a downlink transmission in subframes SF0 through SF4. The S' subframe SF5 may be used by a UE to perform a CCA (e.g., an uplink CCA or ULCCA 435) for an uplink transmission in subframes SF6 through part of SF9. In some cases, an S' subframe may be used by an eNB to perform an ECCA.

Because the S' subframes 415 and 425 have durations of one millisecond, they may include one or more CCA slots or windows in which the transmitting devices contending for a particular physical channel of an unlicensed spectrum may perform their CCAs. When a transmitting device's CCA indicates the physical channel is available, but the device's CCA is completed before the end of an S' subframe 415 or 425, the device may transmit one or more signals to reserve the channel until the end of the S' subframe 415 or 425. The one or more signals may in some cases include Channel Usage Pilot Signals (CUPS), Channel Usage Beacon Signals (CUBS), and/or a cell-specific reference signal (CRS). CUPS, CUBS, and/or a CRS may be used for both channel synchronization and channel reservation. That is, a device that performs a CCA for the channel after another device begins to transmit CUPS, CUBS, or a CRS on the channel may detect the energy of the CUPS, CUBS, or CRS and determine that the channel is currently unavailable.

In some cases, a transmitting device, such as an eNB, may not have data to transmit during all of the allowed subframes, such as D subframes 410. For example, the transmitting device may not have data, but may transmit other information (e.g., primary synchronization signals (PSS), secondary synchronization signals (SSS), cell specific reference signals (CRS), enhanced CRS (eCRS), etc.). A portion of CUBS, such as one payload combination, may be used and/or reserved to indicate that the transmitting device is not transmitting data and/or only transmitting synchronization signals. In some examples, a portion (e.g., one payload combination) of an enhanced transmission format indicator channel (eTFICH) or an enhanced physical format indicator channel (ePFICH) may be used and/or reserved to indicate that the transmitting device is not transmitting data and/or only transmitting synchronization signals.

In some examples, a transmitting device, such as an eNB, may stop transmission before all of the allowed subframes, such as D subframes 410, are over. Additional bits may be added, such as to CUBS, to indicate the number of subframes the transmitting device intends to use for transmission, though this may increase the number of hypothesis for CUBS. In some cases, a signal, such as one similar to CUBS, may be used at the end of transmission, such as symbol 0 of the next subframe, to indicate the end of transmission. In some examples, a signal, such as a physical control format indicator channel (PCFICH) or a similar signal, may carry the number of active subframes, such as in the first symbol of a subframe. In some cases, the PCFICH or similar signal may carry at least one bit to indicate whether the current subframe is the last of the subframes to be used for transmission.

Following a transmitting device's successful completion of CCA for a physical channel and/or the transmission of CUPS, CUBS, or a CRS over a physical channel, the transmitting device may use the physical channel for up to a predetermined period of time (e.g., a portion of an LTE/LTE-A radio frame) to transmit a waveform (e.g., an LTE-based waveform).

Figure 4B:
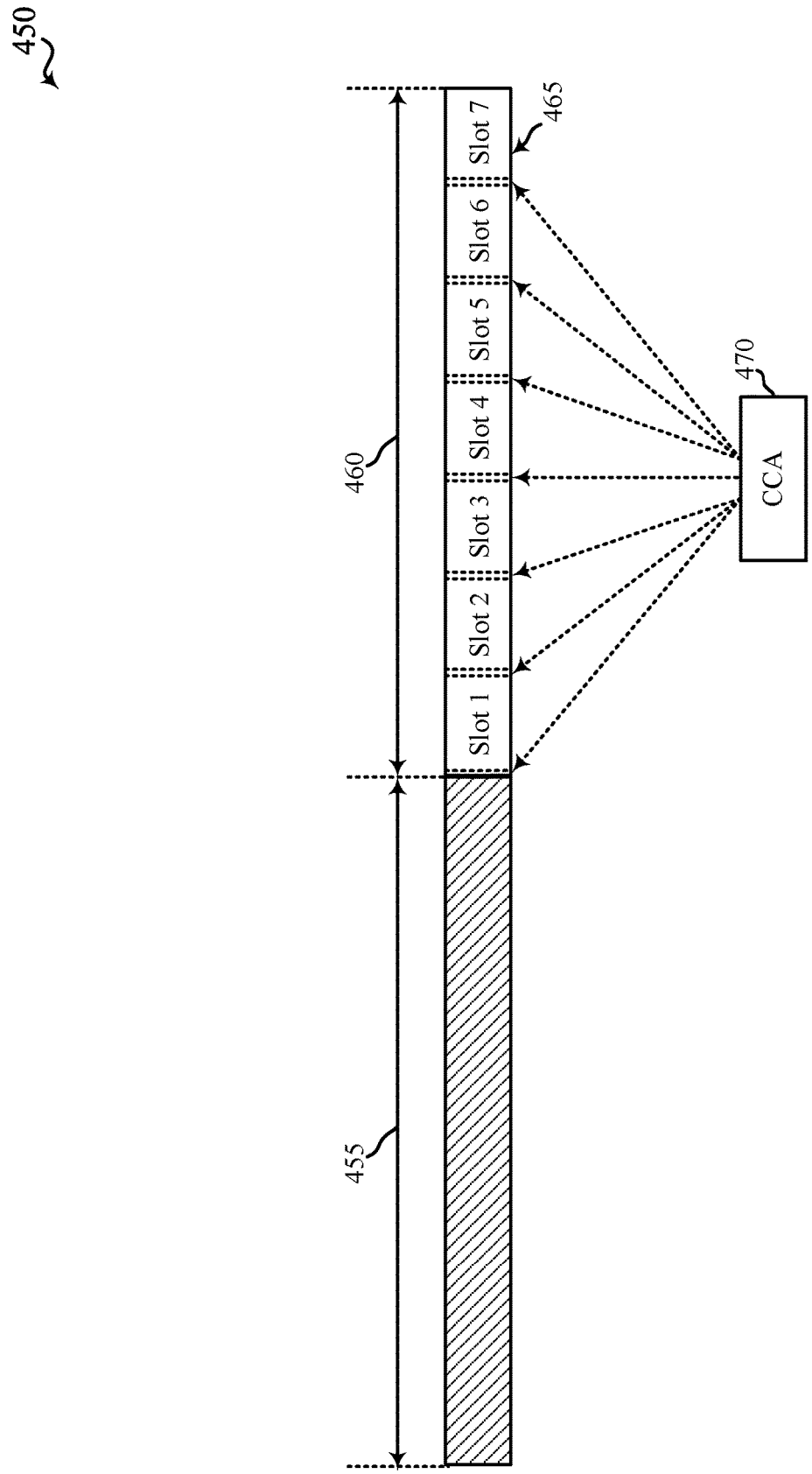
FIG. 4B shows an example of how a contention-based protocol such as LBT may be implemented within an S' subframe, in accordance with various aspects of the present disclosure.

FIG. 4B shows an example of how a contention-based protocol such as LBT may be implemented within an S' subframe 450 such as the S' subframe 415 or 425 described with reference to FIG. 4A. The contention-based protocol may be used with, for example, the wireless communication system 100, 200, and/or 300, the access points or eNBs 105 and/or 205, and/or the UEs 115 and/or 215 described with reference to FIG. 1, 2A, and/or 2B.

When used as the S' subframe 415, the S' subframe 450 may have a guard period (or silent period) 455 and a CCA period 460. By way of example, each of the guard period 455 and the CCA period 460 may have a duration of 0.5 milliseconds and include seven OFDM symbol positions 4615 (labeled in FIG. 4B as Slots 1 through 7). When used as the S' subframe 425, the S' subframe 450 may have an uplink transmission period in place of the guard period 455.

In some cases, an eNB may select one or more of the OFDM symbol positions 465 to perform a CCA 470 for a subsequent transmission period of an unlicensed spectrum, to determine whether the transmission period of the unlicensed spectrum is available for a transmission during the transmission period. In some cases, the CCA 470 is a part of an ECCA procedure. In some examples, if the CCA indicates that a channel is available, CSI, such as CSI feedback for the channel or carrier, may be measured and/or reported based on reference signals in a frame, such as the frame which includes the OFDM symbol position 465 used to perform the CCA 470. In some examples, if the CCA indicates that a channel is not available, CSI, such as CSI feedback for the channel or carrier, may be measured based on a previous frame, or may be omitted for the frame. In some cases, different ones of the OFDM symbol positions 465 may be pseudo-randomly identified or selected by an eNB in different occurrences of the S' subframe 450 (i.e., in different S' subframes used to perform CCA 470 for different transmission periods of the unlicensed spectrum). The pseudo-random identification or selection of OFDM symbol positions may be controlled using a hopping sequence. In other cases, the same OFDM symbol position 465 may be selected by an eNB in different occurrences of the S' subframe.

The eNBs of a wireless communications system may be operated by the same or different operators. In some embodiments, the eNBs operated by different operators may select different ones of the OFDM symbol positions 465 in a particular S' subframe 450, thereby avoiding CCA collisions between different operators. If the pseudo-random selection mechanisms of different operators are coordinated, OFDM symbol positions 465 may be pseudo-randomly selected by a plurality of different operators such that the eNBs of the different operators each have an equal opportunity to perform CCA 470 in the earliest OFDM symbol position (i.e., Slot 1) for certain transmission periods. Thus, over time, the eNBs of the different operators may each have an opportunity to perform CCA 470 first and gain access to a transmission period of the unlicensed spectrum regardless of the needs of eNBs of other operators. After a successful CCA 470, an eNB may transmit CUPS, CUBS, or a CRS to prevent other devices and/or operators from using one or more physical channels of the transmission interval of the unlicensed spectrum.

Figure 5:
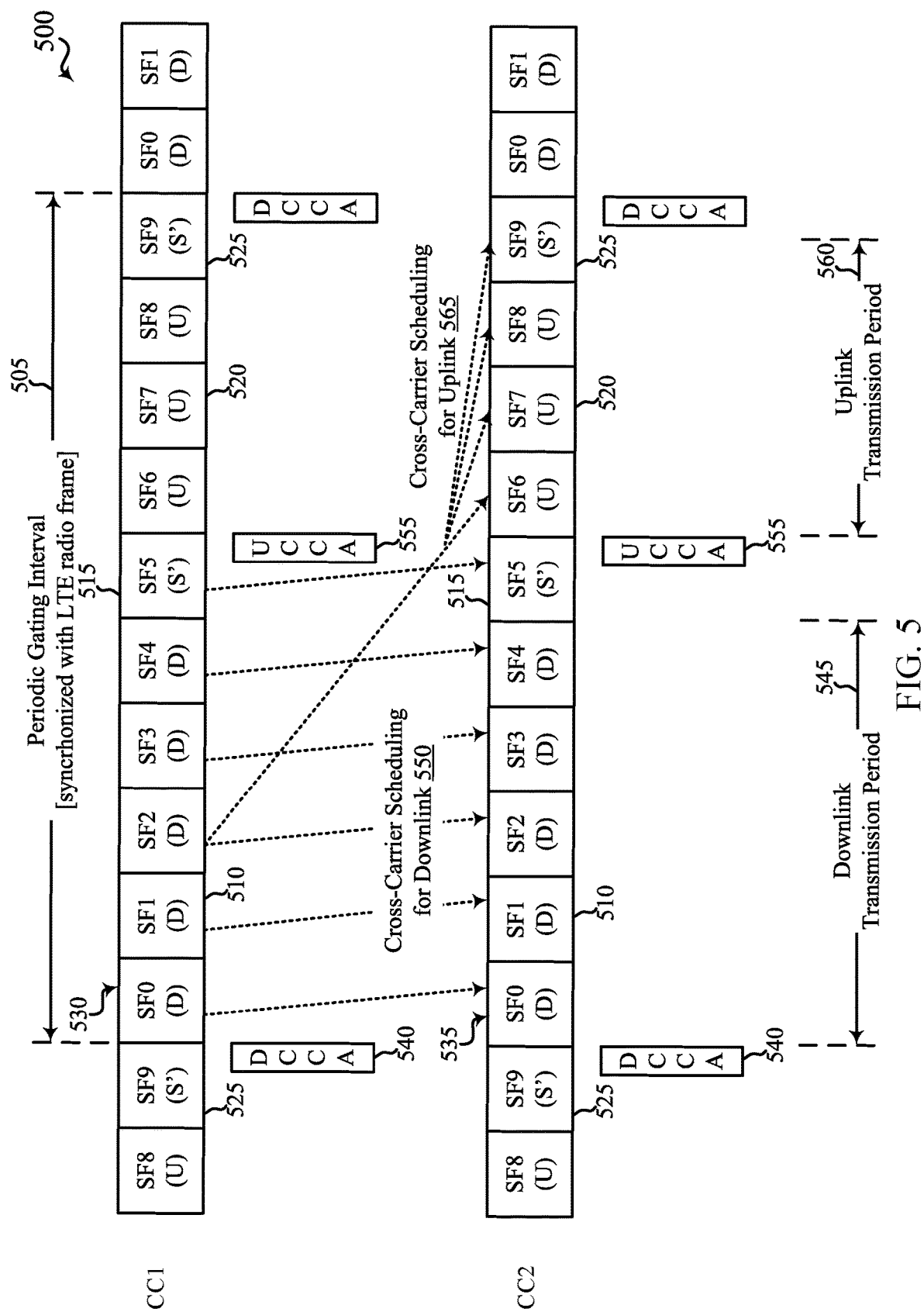
FIG. 5 shows an example of cross-carrier scheduling within a periodic gating interval of a shared spectrum, in accordance with various aspects of the present disclosure.

FIG. 5 shows an example 500 of cross-carrier scheduling within a periodic gating interval 505 of a shared spectrum. The periodic gating interval 505 may be an example of one or more aspects of the periodic gating interval 405 shown in FIG. 4 and may include a number of subframes (e.g., ten subframes labeled SF0, SF1, . . . , SF9). In the example shown, subframes SF0 through SF4 are downlink (D) subframes 510, subframe SF5 is a special (S') subframe 515 in which a number of CCA slots may be provided for the apparatuses (e.g., UEs) of different operators to perform an uplink CCA (UCCA), subframes SF6 through SF8 are uplink (U) subframes 520, and subframe SF9 is a special (S') subframe 525 in which a number of CCA slots may be provided for the apparatuses (e.g., eNBs) of different operators to perform a downlink CCA (DCCA).

FIG. 5 shows two sequences of subframes. A first sequence of subframes 530 is shown for a first physical carrier (e.g., a first component carrier (CC1)), and a second sequence of subframes 535 is shown for a second physical carrier (e.g., a second component carrier (CC2)). In some cases, one or both of the sequences of subframes 530, 535 may be a sequence of subframes in an unlicensed or shared spectrum. In some cases, one or both of the sequences of subframes 530, 535 may be a sequence of subframes in a licensed and/or LTE/LTE-A spectrum. The downlink subframes 510 of CC2 may be cross-carrier scheduled via the downlink subframes 510 of CC1. The uplink subframes 520 of CC2 may also be cross-carrier scheduled via the downlink subframes 510 of CC1.

A problem that arises when relying on multiple physical carriers (e.g., CC1 and CC2) for data transmissions in a shared spectrum is that transmissions on each physical carrier may be subject to CCA, and CCAs may separately pass or fail for each physical carrier (e.g., separately for CC1 and CC2). Thus, a CCA may pass for an uplink or downlink transmission period on a first physical carrier, but because a CCA fails for an uplink or downlink transmission period on a second physical carrier, which second physical carrier dynamically schedules the first physical carrier, the uplink or downlink transmission period on the first physical carrier may be wasted. For example, if a DCCA 540 passes for CC2, a downlink transmission period 545 may be reserved for a downlink transmission via CC2. However, if the DCCA 540 fails for CC1, the downlink transmission period 545 may not be reserved for CC1. If the downlink subframes 510 of the downlink transmission period 545 of CC2 were to be cross-carrier scheduled via the downlink subframes 510 of the downlink transmission period 545 of CC1 (e.g., via cross-carrier scheduling for DL 550), the downlink control information that was to be carried via the downlink subframes 510 of the downlink transmission period 545 of CC1 will not be available, effectively wasting the downlink subframes 510 of the downlink transmission period 545 of CC2 and also making the special subframe 515 unusable for performing a UCCA 555 for the uplink transmission period 560 of CC2. Furthermore, if the uplink subframes 520 of the uplink transmission period 560 of CC2 were to be cross-carrier scheduled via the downlink subframes 510 of the downlink transmission period 545 of CC1 (e.g., via cross-carrier scheduling for UL 565), the uplink control information that was to be carried via the downlink subframes 510 of the downlink transmission period 545 of CC1 may not be available. Still further, if the uplink subframes 520 of the uplink transmission period 560 of CC1 were to be scheduled via the downlink subframes 510 of the downlink transmission period 545 of CC1, the uplink control information that was to be carried via the downlink subframes 510 of the downlink transmission period 545 of CC1 will not be available, and even if a UCCA 555 for the uplink transmission period 560 of CC1 passes, the uplink subframes 520 of the uplink transmission period 560 of CC1 may not be usable.

To enable the dynamic scheduling of one or more physical carriers (e.g., one or more CCs) capable of being cross-carrier scheduled, despite a CCA failure on another physical carrier (e.g., despite a CCA failure such as the CCA failure described with reference to FIG. 5), each of the one or more physical carriers may be configured to support same-carrier scheduling in addition to cross-carrier scheduling, such that each of the one or more physical carriers may be cross-carrier or same-carrier scheduled, depending on whether CCA passes or fails for the physical carrier(s) on which the one or more physical carriers are capable of being cross-scheduled. A UE may then be configured to monitor multiple physical carriers (e.g., two or more physical carriers including a first physical carrier and a second physical carrier) for the control information used to dynamically schedule the one or more physical carriers. Thus, for example, a first physical carrier and a second physical carrier may be monitored for a downlink control transmission for the first physical carrier.

The monitoring of multiple physical carriers for the control information used to dynamically schedule one or more physical carriers may be used in the context of both uplink and downlink scheduling, and also in the context of semi-persistent scheduling (SPS).

Figure 6A:
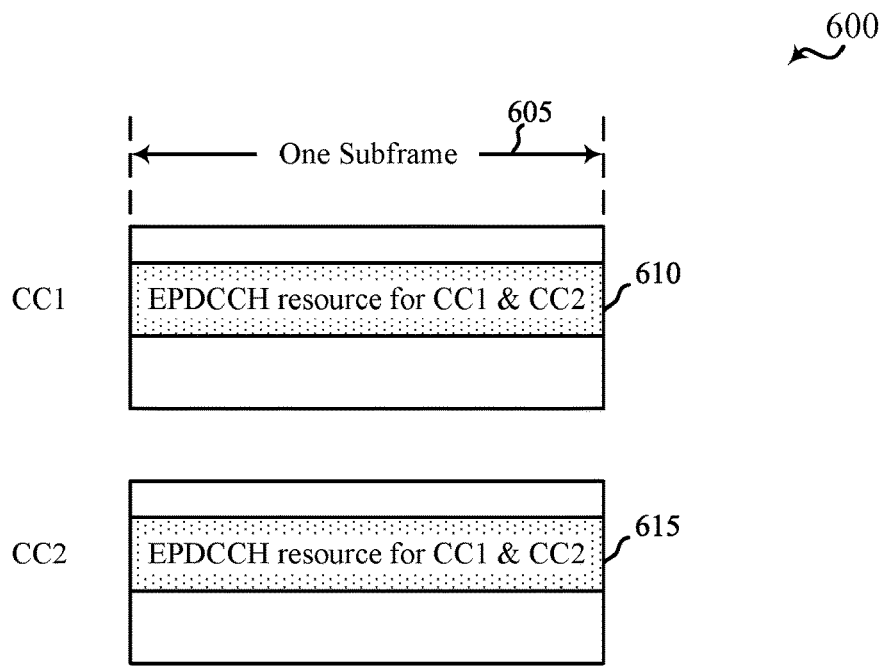
FIG. 6A shows a first example in which a first physical carrier and a second physical carrier may be monitored for a downlink control transmission for the first physical carrier, in accordance with various aspects of the present disclosure.

FIG. 6A shows a first example 600 in which a first physical carrier (e.g., CC1) and a second physical carrier (e.g., CC2) may be monitored for a downlink control transmission for the first physical carrier. In particular, an EPDCCH resource 610 (e.g., a control channel) of CC1 may carry a downlink control transmission for a transmission (e.g., a PDSCH transmission) on CC1 in a given subframe 605 or an EPDCCH resource 615 of CC2 may carry a downlink control transmission for the transmission (e.g., the PDSCH transmission) on CC1 in the given subframe 605. A UE may therefore monitor both the first physical carrier and the second physical carrier for the downlink control transmission for CC1. In the given subframe 605, the UE may discover the downlink control transmission for the PDSCH transmission on CC1 has been scheduled using the EPDCCH resource 610 of CC1 or the EPDCCH resource 615 of CC2. In another subframe, the UE may discover the downlink control transmission for CC1 has been scheduled using the same or different EPDCCH resource (e.g., the EPDCCH resource 610 of CC1 or EPDCCH resource 615 of CC2) as the previous subframe. In some cases, the identity of the EPDCCH resource 610 or 615 on which the downlink control transmission is carried may depend on whether a CCA was successful for CC1 and/or CC2, and/or the level of interference associated with CC1 and/or CC2.

In some cases, the first physical carrier and/or the second physical carrier may also be monitored for a downlink control transmission for the second physical carrier. For example, the EPDCCH resource 610 of CC1 may also or alternately carry a downlink control transmission for a transmission (e.g., a PDSCH transmission) on CC2 in a given subframe 605, and/or the EPDCCH resource 615 of CC2 may also or alternately carry a downlink control transmission for a transmission (e.g., the PDSCH transmission) on CC2 in the given subframe 605. A UE may therefore monitor both the first physical carrier and the second physical carrier for the downlink control transmission for CC2.

By way of example, FIG. 6A illustrates an example 600 in which at least one of the first physical carrier (e.g., CC1) or the second physical carrier (e.g., CC2) may include a control channel for a plurality of different physical carriers (e.g., EPDCCH for CC1 and CC2). In some cases, however, separate control channels may be provided for each physical carrier, as described with reference to FIG. 6B.

Figure 6B:
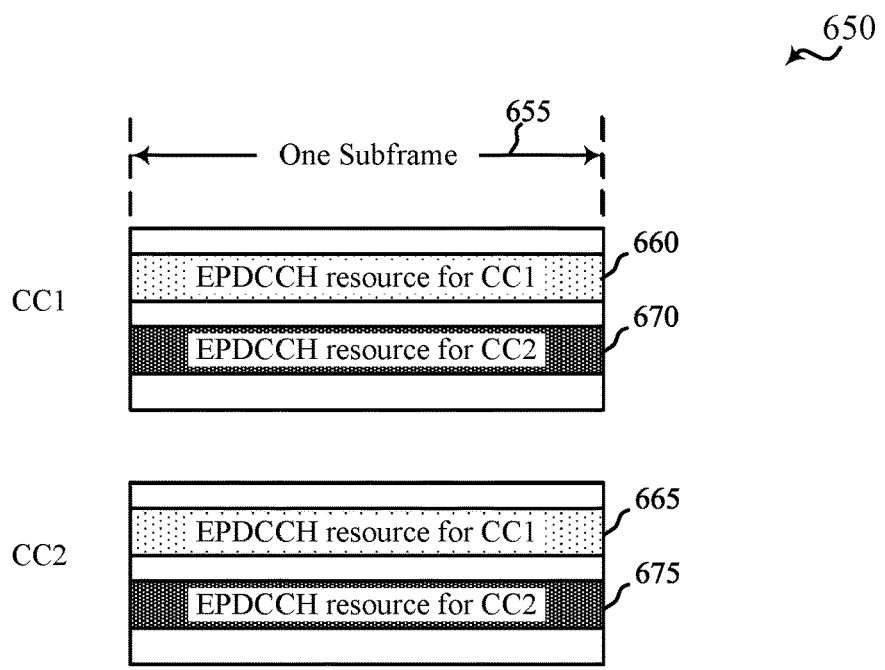
FIG. 6B shows a second example in which a first physical carrier and a second physical carrier may be monitored for a downlink control transmission for the first physical carrier, in accordance with various aspects of the present disclosure.

FIG. 6B shows a second example 650 in which a first physical carrier (e.g., CC1) and a second physical carrier (e.g., CC2) may be monitored for a downlink control transmission for the first physical carrier. In particular, an EPDCCH resource 660 of CC1 may carry a downlink control transmission for a transmission (e.g., a PDSCH transmission) on CC1 in a given subframe 655 or an EPDCCH resource 665 of CC2 may carry a downlink control transmission for the transmission (e.g., the PDSCH transmission) on CC1 in the given subframe 655. A UE may therefore monitor both the first physical carrier and the second physical carrier for the downlink control transmission for CC1. In the given subframe 655, the UE may discover the downlink control transmission for the PDSCH transmission on CC1 has been scheduled using the EPDCCH resource 660 of CC1 or the EPDCCH resource 665 of CC2. In another subframe, the UE may discover the downlink control transmission for CC1 has been scheduled using the same or different EPDCCH resource (e.g., the EPDCCH resource 660 of CC1 or EPDCCH resource 665 of CC2) as the previous subframe. In some cases, the identity of the EPDCCH resource 660 or 665 on which the downlink control transmission is carried may depend on whether a CCA was successful for CC1 and/or CC2, and/or the level of interference associated with CC1 and/or CC2.

In some cases, the first physical carrier and/or the second physical carrier may also be monitored for a downlink control transmission for the second physical carrier. For example, a second EPDCCH resource 670 of CC1 may carry a downlink control transmission for a transmission (e.g., a PDSCH transmission) on CC2 in a given subframe 655 or a second EPDCCH resource 675 of CC2 may carry a downlink control transmission for a transmission (e.g., the PDSCH transmission) on CC2 in the given subframe 655. A UE may therefore monitor both the first physical carrier and the second physical carrier for the downlink control transmission for CC2.

In some cases, the EPDCCH resource 660, 665, 670, and/or 675 may be a PDCCH resource.

The techniques described with reference to FIGS. 6A and/or 6B may be particularly useful when a physical carrier is cross-carrier scheduled with a physical carrier in a shared spectrum (e.g., an unlicensed or shared spectrum) in which transmitting devices contend for access. When a physical carrier is cross-carrier scheduled with a physical carrier in a spectrum in which transmitting devices have guaranteed access (e.g., in a licensed and/or LTE/LTE-A spectrum), the techniques described with reference to FIGS. 6A and/or 6B may not be desirable.

When a UE is configured to monitor both a first physical carrier and a second physical carrier for a downlink control transmission for the first physical carrier, it may be desirable to maintain a same or similar maximum number of blind decodes as would be performed when the UE is configured to monitor only a single physical carrier for the downlink control transmission. In order to maintain a reasonable maximum number of blind decodes, while also providing scheduling flexibility over a first physical carrier or a second physical carrier, various techniques may be employed. A first technique may include associating the first physical carrier and the second physical carrier with a common set of (and possibly reasonable number of) possible downlink control information (DCI) formats and/or a common set of (and possibly reasonable number of) possible DCI sizes. The downlink control transmission for the first physical carrier may then be blind decoded based on the common set of possible DCI formats and/or the common set of possible DCI sizes. A second technique may include sharing a same set of control resources of a physical channel among the control channels of different physical carriers. A third technique may include restricting a number of blind decodes performed for the downlink control transmission on at least one of the first physical carrier or the second physical carrier based on a cross-carrier scheduling between the first physical carrier and the second physical carrier. A fourth technique may include restricting the set of possible DCI formats and/or the set of possible DCI sizes associated with at least one of the first physical carrier or the second physical carrier when a downlink control transmission is used to schedule transmissions on a different physical carrier. The restricted set of possible DCI formats and/or the set of possible DCI sizes may, in turn, restrict the number of blind decodes (e.g., a restriction to three DCI sizes in a multiple-input multiple-output (MIMO) system may restrict the number of blind decodes to about sixty, whereas a restriction to two DCI sizes in a non-MIMO system may restrict the number of blind decodes to about 44).

The first technique for maintaining a reasonable number of blind decodes (i.e., associating the first physical carrier and the second physical carrier with a common set of possible DCI formats and/or a common set of possible DCI sizes) is described below in further detail.

Each of a plurality of UEs in a wireless communication system may be separately configured with a downlink transmission mode (TM) for each physical carrier, and each downlink TM may be associated with a set of DCI formats. For example, a downlink transmission mode 10 (TM10) may be associated with a DCI format 1A and a DCI format 2D. The DCI size of a DCI format for a particular UE and particular physical channel may depend on the DCI format itself and/or various other factors. The other factors may include system bandwidth; whether the DCI format is size-matched with another DCI format; and/or the set of enabled features for the DCI format for the particular UE and particular physical channel. The set of enabled features may include, for example, aperiodic sounding reference signal (SRS) triggering, cross-carrier scheduling, coordinated multipoint (CoMP) including one or more channel state information (CSI) processes), UE-specific search space (USS), common search space (CSS), number of antenna ports, etc. Thus, even under the same bandwidth and downlink TM, the DCI sizes for a DCI format used by two different physical carriers may differ.

A greater number of DCI sizes for a DCI format increases the maximum number of blind decodes that may be performed and may prevent search space sharing when a UE is configured to monitor two or more physical carriers for a downlink control transmission for a physical carrier. However, if the use of a common set of (and possibly reasonable number of) possible DCI formats and DCI sizes is enforced for all physical carriers configured for use by a particular UE, the maximum number of blind decodes performed by the particular UE may be decreased.

Figure 7:
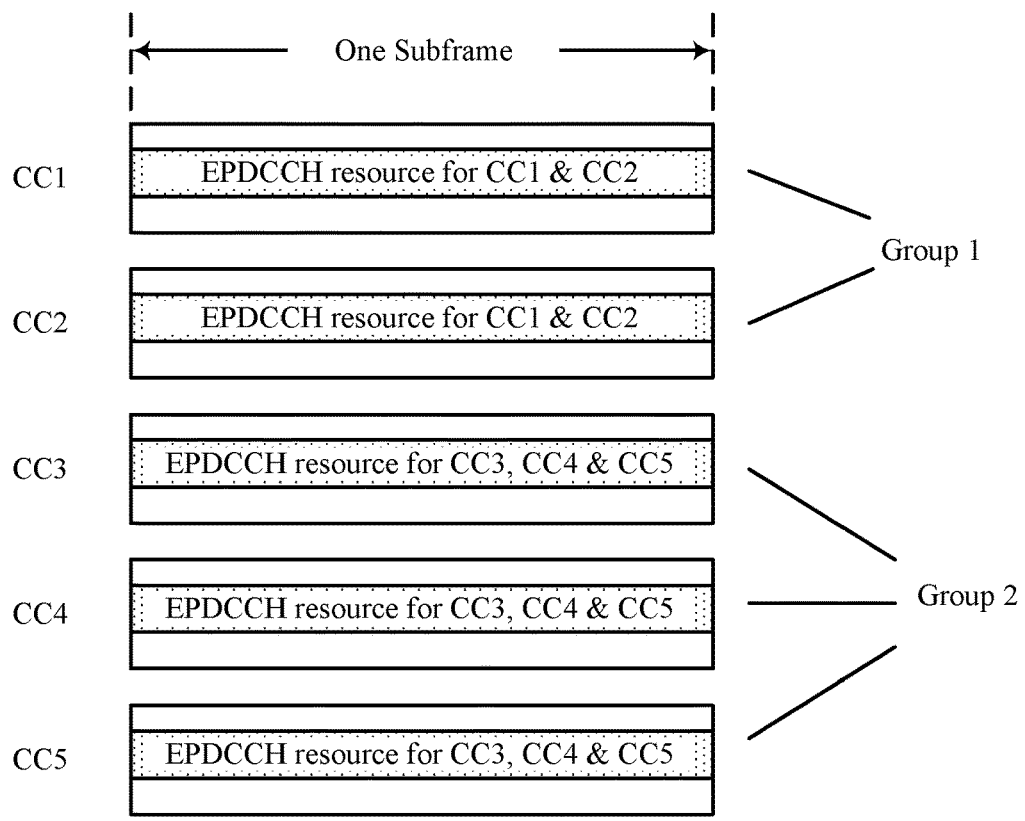
FIG. 7 shows an example of physical carriers grouped in first and second groups, in accordance with various aspects of the present disclosure.

In some cases, the use of a common set of possible DCI formats and DCI sizes across all physical carriers may be too restrictive (e.g., when two or more physical carriers have different system bandwidths). In these cases, DCI size-matching may be performed across two or more physical carriers in a group, and cross-carrier transmissions may be allowed with the group of physical carriers. In this regard, FIG. 7 shows an example 700 of a plurality of physical carriers (e.g., CC1, CC2, . . . , CC5). The physical carriers CC1 and CC2 may be grouped into a first group (e.g., Group 1) for the purpose of cross-carrier scheduling and may be DCI-size matched within Group 1. The physical carriers CC3, CC4, and CC5 may be grouped into a second group (e.g., Group 2) for the purpose of cross-carrier scheduling and may be DCI-size matched within Group 2. In some cases, more or fewer groups may be formed. In some cases, one or more physical carriers may not be grouped. By way of example, each of the physical carriers CC1 through CC5 is shown to have a control channel that is shared by each of the physical carriers in its group. In other embodiments, each of the physical carriers may have a separate control channel for each of the physical carriers in its group. By way of example, the control channels are shown to be EPDCCH control channels. In alternate embodiments, the control channels may take the form of PDCCH or other types of control channels.

Examples of the second technique for maintaining a reasonable number of blind decodes (i.e., sharing a same set of control resources of a physical channel among the control channels of different physical carriers) is shown in FIGS. 6A and/or 7, wherein the set of shared control resources include a shared set of EPDCCH resources.

The third technique for maintaining a reasonable number of blind decodes (i.e., restricting a number of blind decodes performed for the downlink control transmission on at least one of the first physical carrier or the second physical carrier based on a cross-carrier scheduling between the first physical carrier and the second physical carrier) is described below in further detail. The third technique may be useful in reducing the number of blind decodes under different DCI sizes and/or to reduce false alarm probability (e.g., the probably of incorrectly identifying a transmission as a downlink control transmission for a particular physical carrier).

The number of blind decodes performed for a downlink control transmission may in some cases be restricted by monitoring a restricted number of decoding candidates for the downlink control transmission on at least one of a first physical carrier and a second physical carrier. The restricted number of decoding candidates may be based on cross-carrier scheduling between the first physical carrier and the second physical carrier. The number of blind decodes performed for a downlink control transmission on at least one of the first physical carrier or the second physical carrier may also, or alternately, be restricted by monitoring a restricted number of resource sets for the downlink control transmission based on the cross-carrier scheduling between the first physical carrier and the second physical carrier. The number of blind decodes performed for a downlink control transmission on at least one of the first physical carrier or the second physical carrier may also, or alternately, be restricted by monitoring at least one resource set having a restricted size based on the cross-carrier scheduling between the first physical carrier and the second physical carrier.

Figure 8:
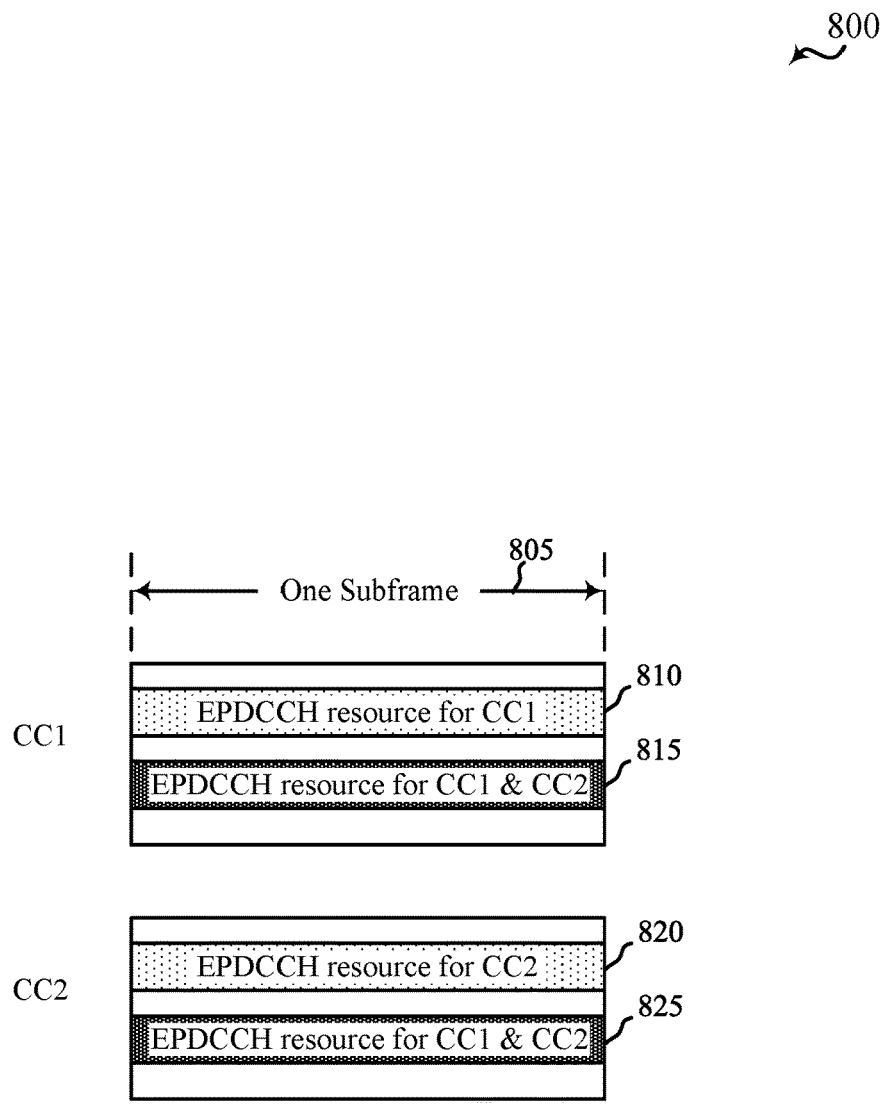
FIG. 8 shows another example in which a first physical carrier and a second physical carrier may be monitored for a downlink control transmission for the first physical carrier, in accordance with various aspects of the present disclosure.

FIG. 8 shows an example 800 in which a first physical carrier (e.g., CC1) and a second physical carrier (e.g., CC2) may be monitored for a downlink control transmission for the first physical carrier. In particular, either of a first EPDCCH resource 810 (e.g., a first resource set) or a second EPDCCH resource 815 (e.g., a second resource set) of CC1 may carry a downlink control transmission for a transmission (e.g., a PDSCH transmission) on CC1 in a given subframe 805. Alternately, an EPDCCH resource 825 of CC2 (e.g., a second EPDCCH resource 825 or resource set of CC2) may carry a downlink control transmission for the transmission (e.g., the PDSCH transmission) on CC1 in the given subframe 805. A UE may therefore monitor both the first and second EPDCCH resources 810, 815 of CC1, but only the second EPDCCH resource 825 of CC2 for the downlink control transmission for CC1. In the given subframe 805, the UE may discover the downlink control transmission for the PDSCH transmission on CC1 has been scheduled using the first EPDCCH resource 810 of CC1, the second EPDCCH resource 815 of CC1, or the second EPDCCH resource 825 of CC2. In another subframe, the UE may discover the downlink control transmission for CC1 has been scheduled using the same or different EPDCCH resource as the previous subframe. In some cases, the identity of the EPDCCH resource 810, 815, or 810 on which the downlink control transmission is carried may depend on whether a CCA was successful for CC1 and/or CC2, and/or the level of interference associated with CC1 and/or CC2.

In some cases, the first physical carrier and/or the second physical carrier may also be monitored for a downlink control transmission for the second physical carrier. For example, a second EPDCCH resource 815 of CC1 may carry a downlink control transmission for a transmission (e.g., a PDSCH transmission) on CC2 in a given subframe 805. Alternately, a first EPDCCH resource 820 or a second EPDCCH resource 825 of CC2 may carry a downlink control transmission for a transmission (e.g., the PDSCH transmission) on CC2 in the given subframe 805. A UE may therefore monitor both the first physical carrier and the second physical carrier for the downlink control transmission for CC2.

In some cases, the EPDCCH resource 660, 665, 670, and/or 675 may be a PDCCH resource.

An example of the fourth technique for maintaining a reasonable number of blind decodes (i.e., restricting the set of possible DCI formats and/or the set of possible DCI sizes associated with at least one of the first physical carrier or the second physical carrier when a downlink control transmission is used to schedule transmissions on a different physical carrier) may also be described with reference to FIG. 8. For example, a UE may monitor CC1 for DCI associated with both downlink grants and uplink grants (e.g., DCI formats 1A, 2D, 0, and 4), but only monitor CC2 for DCI associated with uplink grants (e.g., DCI formats 0 and 4) and refrain from monitoring CC2 for DCI associated with DCI formats 1A and 2D. In another example, a UE might only monitor CC1 and/or CC2 with DCI formats associated with (or not associated with) MIMO. In this manner, the number of blind decodes may be restricted despite there being distinct DCI sizes. Even in the presence of same DCI sizes, the restriction may help reduce false alarm probability. The number of blind decodes may be further restricted when the UE is not configured with SPS by, for example, only monitoring CC1 for DCI associated with DCI format 1A when the UE is not configured with SPS.

In wireless communication systems such as an LTE/LTE-A system, a UE may sometimes monitor a primary component carrier (PCC) for a system information broadcast and/or receive dedicated signaling that conveys system information. The UE may in some cases need to receive the system information via the PCC and/or the dedicated signaling before transmitting or receiving over at least one secondary component carrier (SCC). However, when use of the PCC is subject to CCA, the delivery of system information may experience delay (though SCC system information may still be delivered by an SCC PDSCH using dedicated signaling).

To enable the receipt of system information for one or more physical carriers (e.g., one or more CCs) despite a CCA failure on another physical carrier (e.g., despite a CCA failure such as the CCA failure described with reference to FIG. 5), system information for physical carriers may be transmitted and received via dedicated signaling, and/or a cross-carrier system information broadcast may be enabled.

The transmission and reception of system information via dedicated signaling may in some cases be provided by transmitting system information for a physical carrier (e.g., a PCC or an SCC) via dedicated signaling over a shared data channel (e.g., a PDSCH) of the physical carrier. A UE may then monitor the shared data channel of the physical carrier and receive the system information for the physical carrier via the dedicated signaling over the shared data channel of the physical carrier.

In some cases, a UE may monitor past CCA performance or system information delivery history to determine which physical carrier to use for dedicated signaling. For example, when the CCA performance of a physical carrier (e.g., a PCC or an SCC) is associated with one or more CCA failures (e.g., recent CCA failures), a shared data channel of another physical carrier (e.g., the other of the PCC or the SCC) may be used for dedicated signaling of system information, and the shared data channel of the other physical carrier may be monitored for system information for the second physical carrier.

A cross-carrier system information broadcast is a broadcast of system information for each of a number of physical carriers in a carrier group over each of the other physical carriers in the carrier group. Thus, a system information broadcast for a first physical carrier may be broadcast over both the first physical carrier and a second physical carrier, and possibly over other physical carriers in a carrier group.

A cross-carrier system information broadcast may be enabled for all physical carriers or for all of the physical carriers in a particular carrier group (e.g., on a per group basis, such as for one or both of the carrier groups described with reference to FIG. 7). The physical carriers within a carrier group may in some cases include at least one PCC and at least one SCC. In some cases, a system information broadcast may be transmitted over a physical broadcast channel (e.g., a PBCH).

When one or two resource sets are used as a common search space (CSS) for a downlink control transmission or DCI, as described, for example, with reference to FIGS. 6A and/or 6B, the combinations of sizes of the one or two resource sets may be limited. For example, the sizes of the one or two resources sets may be limited to one fixed combination, such as a combination where one resource set includes 4 physical resource block (PRB) pairs and the other resource set includes 8 PRB pairs. The location(s) (e.g., frequency location(s)) of the resource set(s) or PRB pairs of a CSS may in some cases be based on a cell identifier (ID) of a cell that transmits information using the at least one resource set. For example, in a frequency interleaved structure of a 20 Megahertz (MHz) system, the 4 PRB pairs may be located at PRB indices 0, 30, 60, and 90, and the 8 PRB pairs may be located at PRB indices 1, 13, 25, 37, 55, 67, 79, and 91 for a first cell ID (with the middle 6 PRBs avoided), and at PRB indices 2, 14, 26, 38, 56, 68, 80, and 92 for a second cell ID. In order to exploit frequency diversity and to satisfy the LTE 80% occupied bandwidth threshold, the frequency locations of the PRB pairs may occupy at least the edges of a given bandwidth.

In some cases, the size(s) and location(s) of the resource set(s) used as a CSS may be indicated to a UE. For example, the size(s) and location(s) may be broadcast to the UE via EPBCH. Alternately, the UE may perform a number of blind decodes to determine the size(s) and location(s) of the resource set(s).

In some cases, there may be interplay between CSS and USS resource sets for handling EPDCCH (or PDCCH) capacity, and the total number of resource sets monitored by a UE in a CSS and a USS. For example, three or more EPDCCH resource sets may be supported per UE, with up to 8 PRB pairs per resource set. In this example, a first resource set may be part of a CSS and second and third resource sets may be part of a USS. The first resource set may carry unicast traffic as well as other traffic. In a second example, two EPDCCH resource sets may be supported per UE, with at least one resource set having more than 8-PRB pairs. In this example, a first resource set may be part of a CSS and a second resource set may be part of a USS. The first resource set may include up to 8 PRB pairs (e.g., 2, 4, or 8 PRB pairs) and the second resource set may include up to 16 PRB pairs (e.g., 2, 4, 8, or 16 PRB pairs. Alternately, and by way of further example, the first and second resource sets may each include up to 16 PRB pairs or up to 12 PRB pairs. In a third example, the number of EPDCCH resource sets may be system bandwidth dependent. In this example, two resource sets, each having up to 8 PRB pairs, may be maintained for system bandwidths equal to or below 10 MHz, and for system bandwidths greater than 10 MHz, two or three resource sets configured as described with reference to the first two examples in this paragraph may be maintained.

From the perspective of a UE, and given the numbers of resource sets described in the preceding paragraph, the UE may monitor one CSS EPDCCH resource set and up to two USS EPDCCH resource sets, or up to two CSS EPDCCH resource sets and up to two USS EPDCCH resource sets. A CSS resource set and a USS resource set for a UE may be separate or joint. In the latter case, and given the numbers of resource sets described in the preceding paragraph, the UE may monitor one CSS+USS EPDCCH resource set and up to one USS EPDCCH resource set. Alternately, the UE may monitor two CSS+USS EPDCCH resource sets. A CSS EPDCCH resource set and a USS EPDCCH resource set may partly overlap or completely overlap.

Figure 9A:
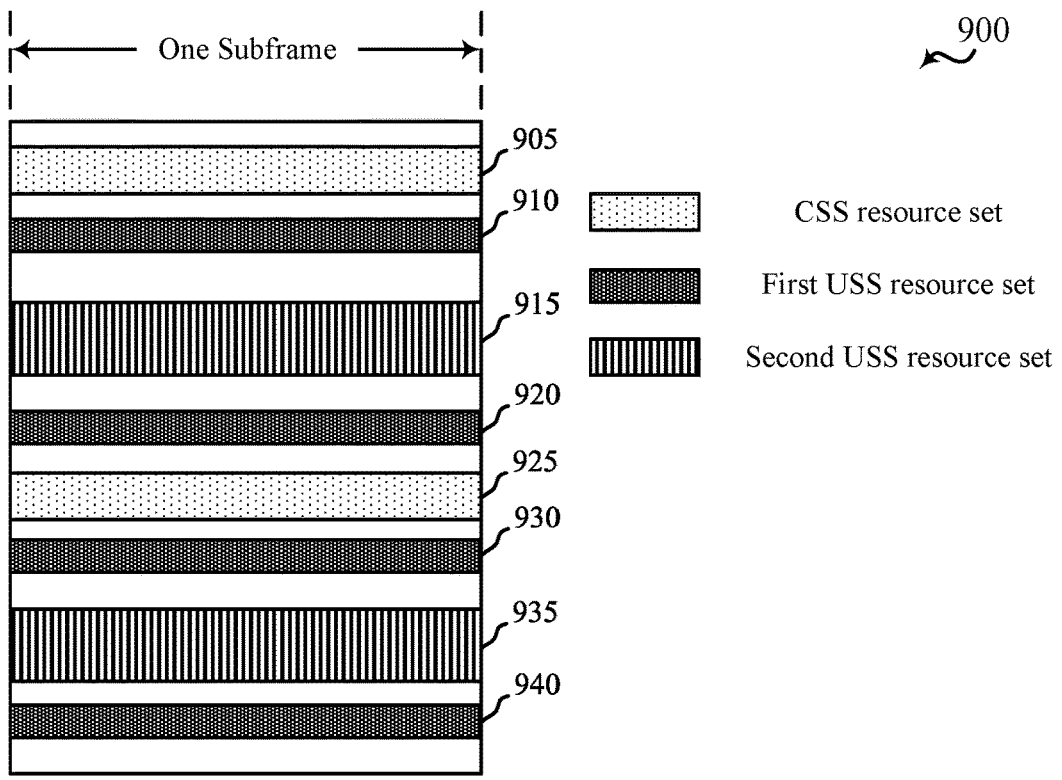
FIG. 9A shows an example of a non-overlapping common search space (CSS) and UE-specific search space (USS), in accordance with various aspects of the present disclosure.
Figure 9B:
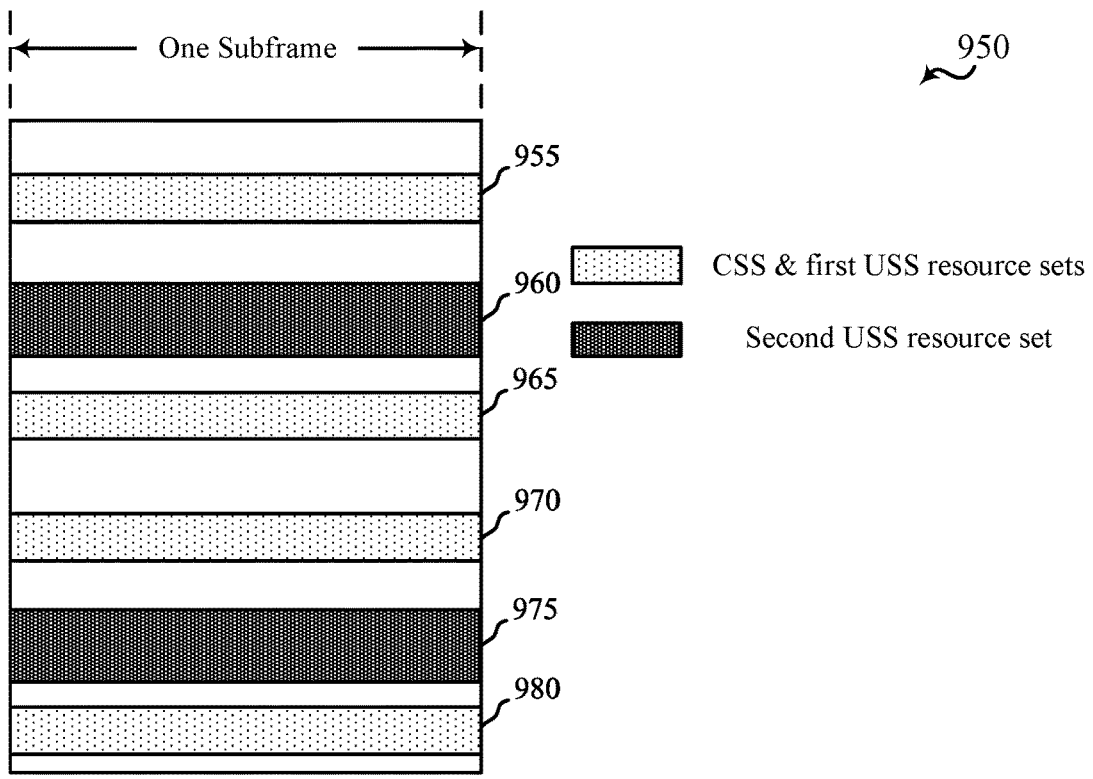
FIG. 9B shows an example of a completely overlapped common search space (CSS) and UE-specific search space (USS), in accordance with various aspects of the present disclosure.

FIG. 9A shows an example 900 of non-overlapping CSS and USS resource sets. In particular, a CSS resource set occupies bands 910, 920, 930, and 940 of a frequency spectrum, a first USS resource set occupies bands 915 and 935 of the frequency spectrum, and a second USS resource set occupies bands 905 and 925 of the frequency spectrum. In contrast, FIG. 9B shows an example 950 of completely overlapped CSS and USS resource sets. In particular, a CSS resource set and a first USS resource set occupy bands 955, 965, 970, and 980 of a frequency spectrum, and a second USS resource set occupy bands 960 and 975 of the frequency spectrum. In the examples 900 and 950, all UEs may monitor the CSS resource set, but different UEs may monitor the different USS resource sets.

In an LTE/LTE-A system, a download assignment index (DAI) in an uplink grant may indicate a total number of downlink subframes scheduled within a given association set. The association set is a set of downlink subframes that require acknowledgment (ACK)/negative-acknowledgment (NACK) feedback from a given uplink subframe. A DAI assists a UE in detecting whether it has missed one or more downlink grants for the association set. In a system (e.g., an unlicensed and/or shared spectrum LTE/LTE-A system) in which physical carriers are cross-scheduled, and in which transmitting devices contend for access to the physical carriers in a shared spectrum, it may be useful to indicate to a UE whether a CCA, or a CCA as a part of an ECCA operation, performed by a base station for a given physical carrier was successful. Thus, in some cases, a base station may transmit to a UE, over a first physical carrier of a shared spectrum, an indication of whether a CCA performed by the base station for a second physical carrier of the shared spectrum was successful.

A base station's indication of whether a CCA performed by the base station for a physical carrier was successful may be explicit or implicit. For example, an explicit indication of whether a CCA performed by a base station for a particular physical carrier was successful may include an indication provided by one bit of an uplink grant, broadcast signal, or UE-specific signal associated with another physical carrier. An implicit indication of whether a CCA performed by a base station for a particular physical carrier was successful may include, for example, a DAI associated with an uplink grant transmitted using another physical carrier (e.g., when a CCA fails, a 2-bit DAI may be set to binary 11 to indicate that no downlink subframes are scheduled for an association set of the physical carrier for which the CCA failed). In some examples, if a CCA indicates that a channel is available, CSI may be measured and/or reported based on reference signals in the frame including the CCA. In some cases, if a CCA indicates that a channel is not available, CSI may be measured and/or reported based on a previous frame, or may be omitted for the frame containing the CCA.

A UE may use an indication of whether a CCA performed for a physical carrier was successful to determine a total ACK/NACK payload size in an uplink subframe configured to carry ACK/NACK information for more than one physical carrier. For example, if a UE is configured to use five physical carriers, but CCA performed by a base station is only successful for three of the physical carriers, the ACK/NACK payload size in an uplink subframe configured to ACK/NACK information for the five physical carriers may be determined based on the ACK/NACK information for the three physical carriers for which CCA was successful.

Figure 10:
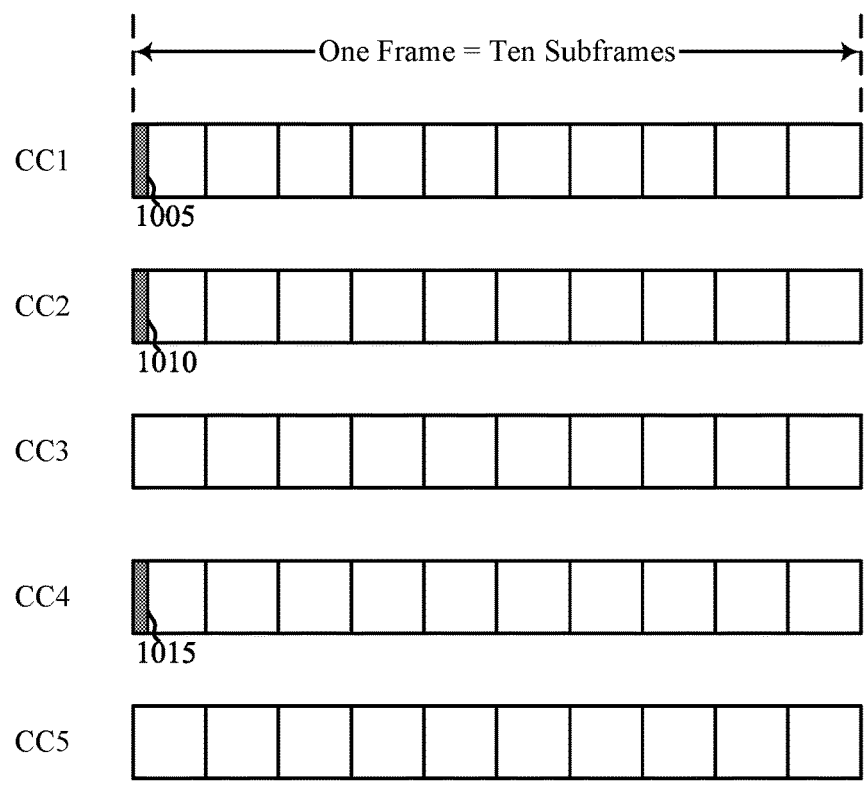
FIG. 10 shows an example broadcast of indications of CCA success, in accordance with various aspects of the present disclosure.

FIG. 10 shows an example 1000 broadcast of indications of CCA success for the physical carriers CC1 through CC5. In particular, each physical carrier may carry a set of N−1 bits, where N is the number of physical carriers in a group of physical carriers for which indications of CCA success are being transmitted. In the example 1000, N=5, so each physical carry may include four bits for indicating the success or failure of CCAs performed for other physical carriers in the group. Each bit may assume a logic "1" when CCA succeeds for a respective one of the physical carriers, and may assume a logic "0" when CA fails for the respective one of the physical carriers. A bit need not be included for the physical carrier on which a set of four bits is carried, as the CCA success for the physical carrier carrying a set of four bits is implicitly known. In the example 1000 shown in FIG. 10, CCA is successful for physical carriers CC1, CC2, and CC4, and thus, a set 1005, 1010, or 1015 of N−1 bits indicating the relevant CCA successes and failures is transmitted over each of the physical carriers CC1, CC2, and CC4. A respective set of N−1 bits may be provided for each subframe for which CCAs are performed.

In unlicensed spectrum, there may be a specified occupied bandwidth threshold for a channel. The occupied bandwidth threshold may be imposed by a regulatory body (e.g., the Federal Communications Commission). Occupied bandwidth may be defined as a frequency sweep from 0.5% energy to 99.5% energy. An occupied bandwidth threshold may indicate, for example, that the occupied bandwidth needs to be greater than or equal to 80% of a nominal bandwidth. When only a limited number of UEs are scheduled for downlink transmission and their corresponding downlink transmissions do not fill the downlink system bandwidth in accordance with an occupied bandwidth threshold, a filler signal may be transmitted over at least one unscheduled resource in a frame, to meet the occupied bandwidth threshold. The filler signal may in some cases include a predetermined sequence, such as a channel usage beacon signal (CUBS).

In other embodiments, failure to meet an occupied bandwidth threshold may be overcome by increasing a bandwidth of at least one channel transmitted over a frame to satisfy the occupied bandwidth threshold for the frame. For example, a modulation order or code rate may be reduced so that a transport block size may be increased to occupy a larger number of resources.

In other embodiments, failure to meet an occupied bandwidth threshold may be overcome by allocating search space resources (e.g., additional search space resources) to at least one UE.

In some cases, an expanded/enhanced physical control format indicator channel (EPCFICH) may be blindly decoded as part of the blind decode of a physical carrier. A portion the EPCFICH may be used to carry a control format indicator value. The control format indicator value may be used to determine a number of subframes of a frame that will be used by a base station for downlink transmissions over the physical carrier. In some cases, a CUBS, such as through additional bits, may be used to indicate the number of subframes to be used for transmission. The number of subframes of a frame that will be used by a base station for downlink transmissions over a physical carrier may in some cases be used by a UE to 1) determine a sleep schedule of the UE, or 2) schedule ACK/NACK transmissions.

By way of example, an EPCFICH may be transmitted and received during a first subframe of a frame, and in some cases in a first symbol of the first subframe of the frame. Alternately, an EPCFICH may be transmitted and received during a last symbol of a last subframe of the frame. The latter may be useful to indicate an End of Transmission, or a last subframe to be transmitted, when a base station does not know, a priori, how many downlink subframes it will transmit. Further, a CUBS signal may be transmitted at the end of transmission, or in the next subframe such as the first symbol of the next subframe, to indicate an End of Transmission.

A bitwidth of the control format indicator value may be based on the structure of a frame. For example, if a frame has N downlink subframes, $\log_2(N)$ bits enable a base station to notify a UE of any possible number of scheduled downlink subframes in a frame.

Figure 11:
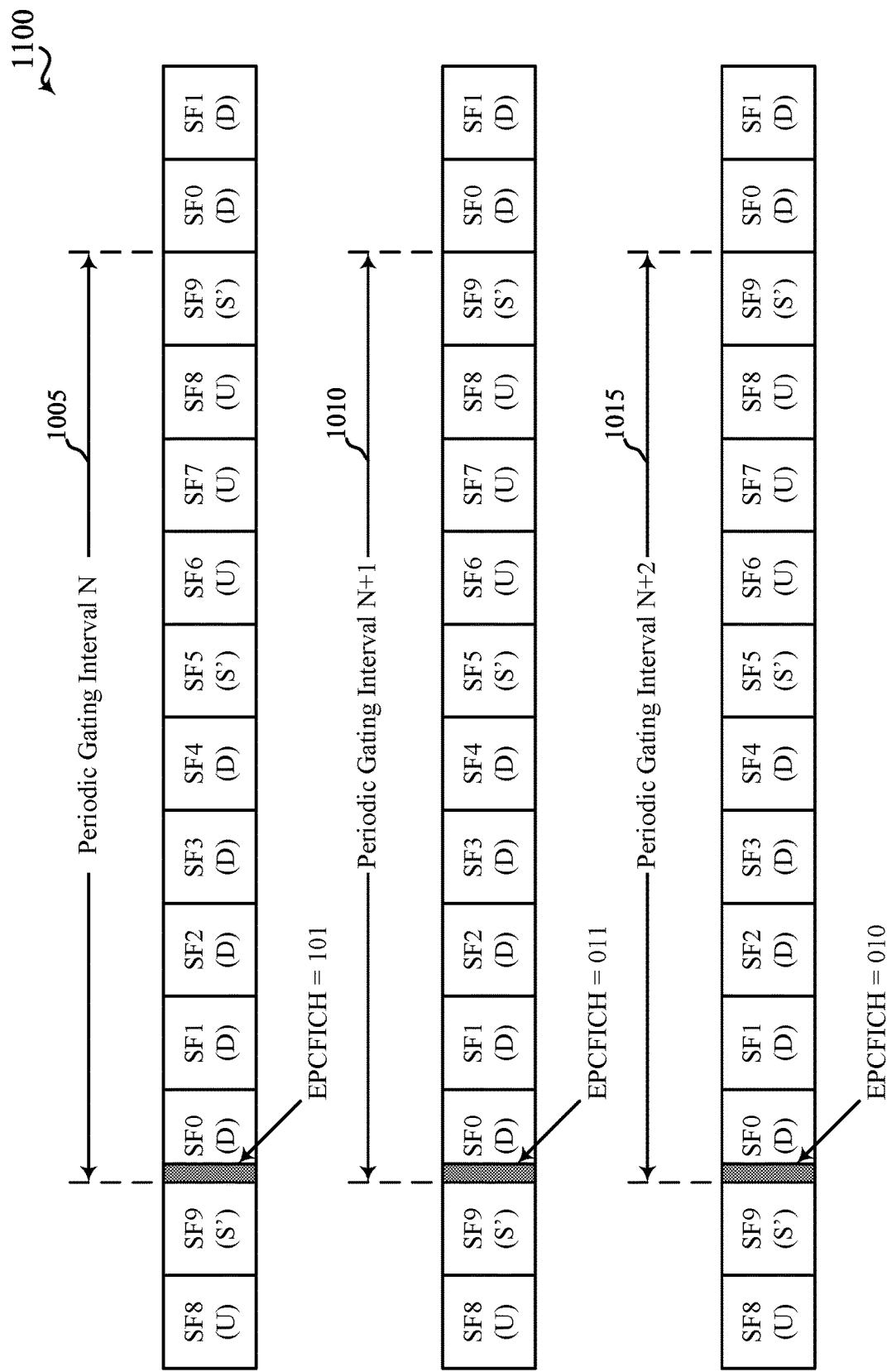
FIG. 11 shows an exemplary transmission of control format indicator values during respective periodic gating intervals, in accordance with various aspects of the present disclosure.

FIG. 11 shows an exemplary transmission 1100 of control format indicator values 1105, 1110, and 1115 during respective periodic gating intervals (or frames) n, n+1, and n+2. A control format indicator value of 001 may indicate that a base station has scheduled a downlink subframe in a first subframe of a frame; a control format indicator value of 010 may indicate that a base station has scheduled downlink subframes in first and second subframes of a frame; and so on.

Figure 12A:
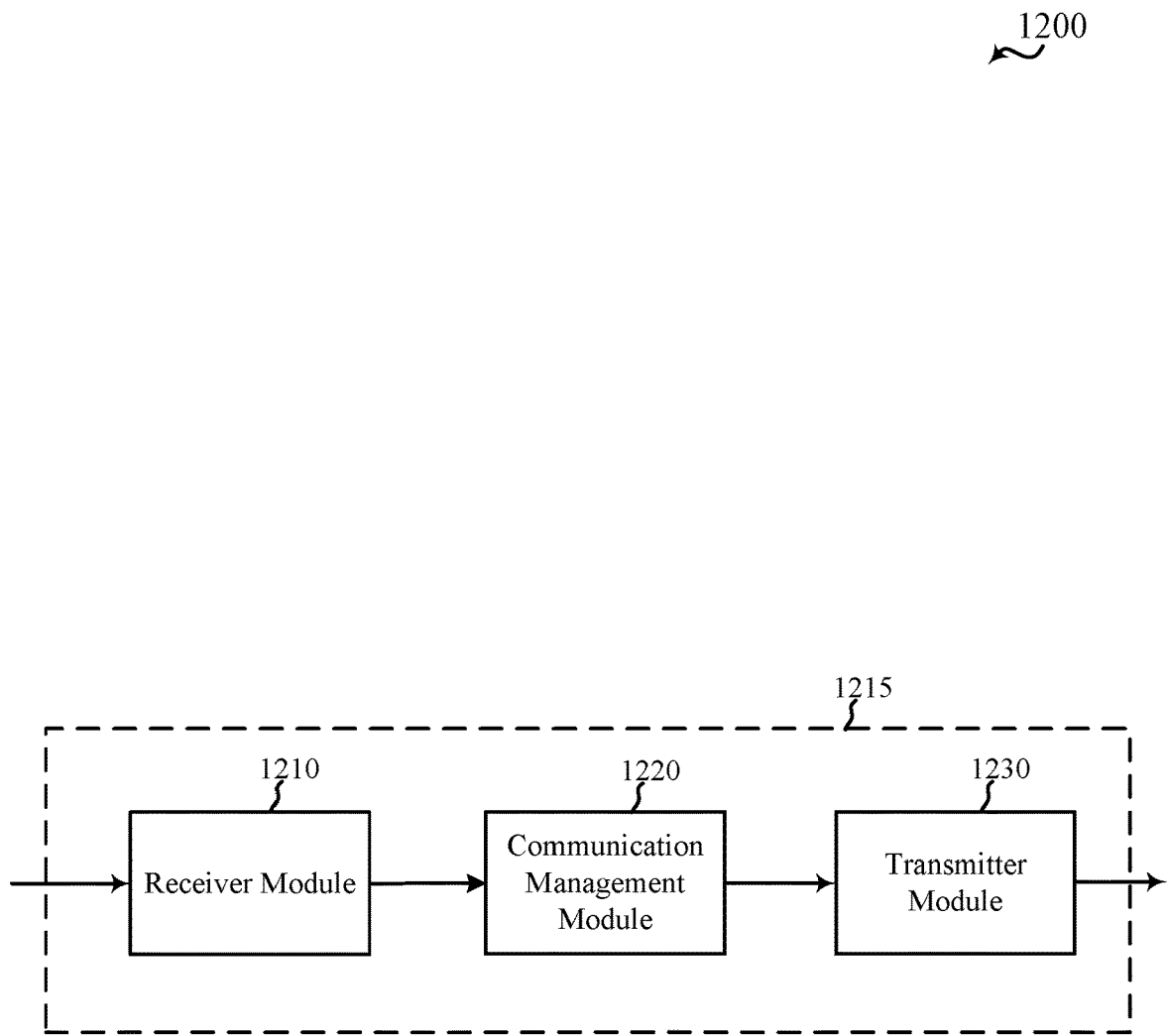
FIGS. 12A & 12B show block diagrams of apparatuses for use in wireless communication, in accordance with various aspects of the present disclosure.

FIG. 12A shows a block diagram 1200 of an apparatus 1215 for use in wireless communication, in accordance with various aspects of the present disclosure. In some embodiments, the apparatus 1215 may be an example of one or more aspects of one or more of the UEs 115 and/or 215 described with reference to FIG. 1, 2A, and/or 2B. The apparatus 1215 may also be a processor. The apparatus 1215 may include a receiver module 1210, a communication management module 1220, and/or a transmitter module 1230. Each of these components may be in communication with each other.

The components of the apparatus 1215 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1210 may be or include a radio frequency (RF) receiver, such as an RF receiver operable to receive transmissions in a first radio frequency spectrum band and/or a second radio frequency spectrum band. In some cases, the first radio frequency spectrum band may be a licensed radio frequency spectrum band (e.g., an LTE/LTE-A radio frequency spectrum band) and/or the second radio frequency spectrum band may be an unlicensed radio frequency spectrum band. The receiver module 1210 may be used to receive various types of data and/or control signals (i.e., transmissions) over one or more communication links (e.g., physical channels) of a wireless communication system including the first radio frequency spectrum band and/or the second radio frequency spectrum band, such as one or more communication links of the wireless communication system 100, 200, and/or 250 described with reference to FIGS. 1, 2A, and/or 2B.

In some embodiments, the transmitter module 1230 may be or include an RF transmitter, such as an RF transmitter operable to transmit in the first radio frequency spectrum band and/or the second radio frequency spectrum band. The transmitter module 1230 may be used to transmit various types of data and/or control signals (i.e., transmissions) over one or more communication links (e.g., physical channels) of a wireless communication system, such as one or more communication links of the wireless communication system 100, 200, and/or 250 described with reference to FIGS. 1, 2A, and/or 2B.

In some embodiments, the communication management module 1220 may be used to manage wireless communication over the first radio frequency spectrum band and/or the second radio frequency spectrum band. For example, the communication management module 1220 may be used to manage wireless communication in a supplemental downlink mode and/or a carrier aggregation mode using the first radio frequency spectrum band and the second radio frequency spectrum band, and/or in a standalone mode of operation using the second radio frequency spectrum band. In some cases, the communication management module 1220 may manage downlink control information for a number of physical carriers over which the apparatus 1215 may receive downlink control transmission. The downlink control information may include, for example, same-carrier or cross-carrier scheduling information for a number of physical carriers, system information, indicators of whether CCA was successful for particular physical carriers, and/or control status indicator values.

Figure 12B:
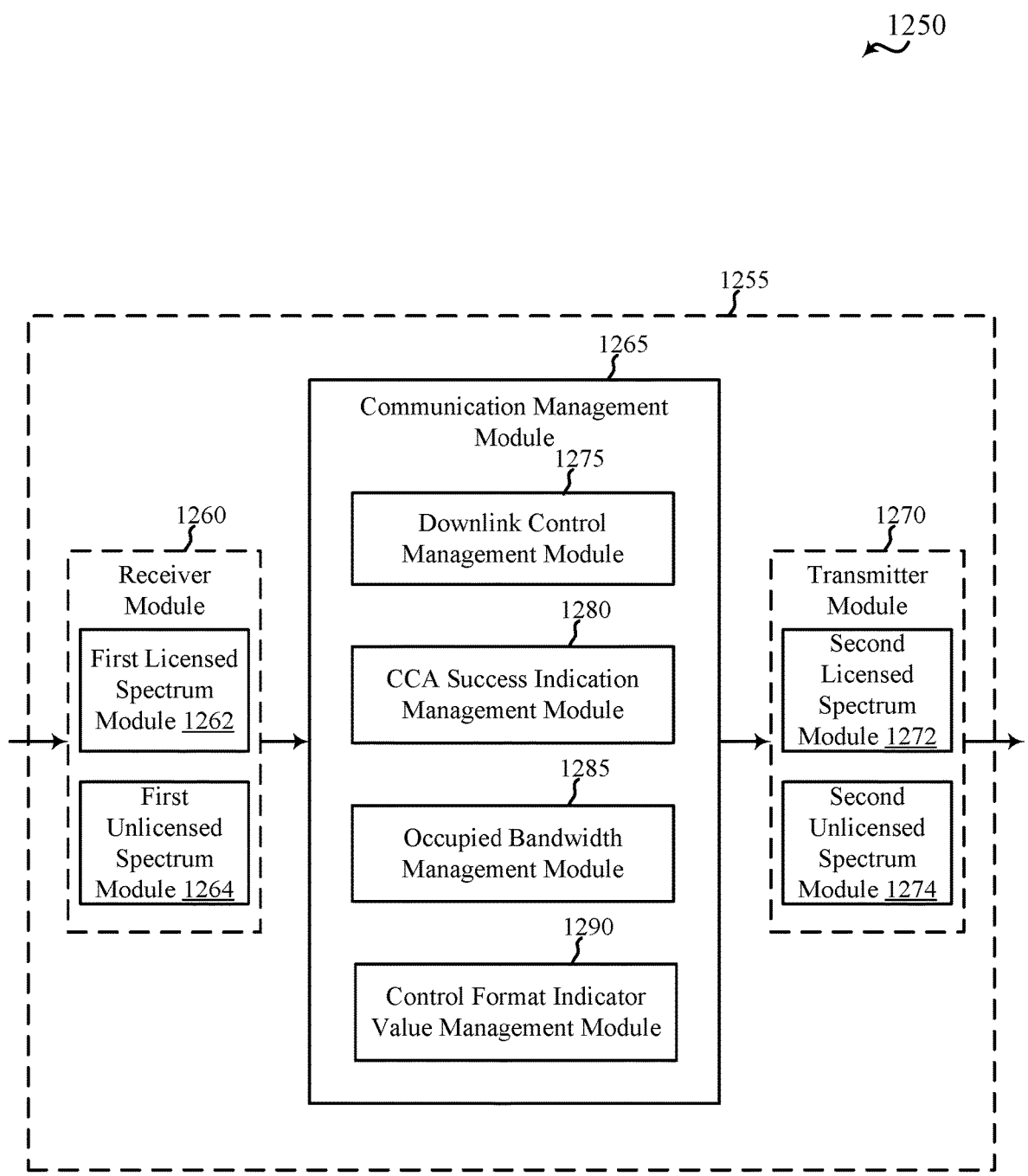

FIG. 12B shows a block diagram 1250 of an apparatus 1255 for use in wireless communication, in accordance with various aspects of the present disclosure. In some embodiments, the apparatus 1255 may be an example of one or more aspects of one or more of the apparatus 1215 described with reference to FIG. 12A and/or the UEs 115 and/or 215 described with reference to FIGS. 1, 2A, and/or 2B. The apparatus 1255 may also be a processor. The apparatus 1255 may include a receiver module 1260, a communication management module 1265, and/or a transmitter module 1270. Each of these components may be in communication with each other.

The components of the apparatus 1255 may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 1260 may be or include an RF receiver, such as an RF receiver operable to receive transmissions in a first radio frequency spectrum band and/or a second radio frequency spectrum band. In some cases, the first radio frequency spectrum band may be a licensed radio frequency spectrum band (e.g., an LTE/LTE-A radio frequency spectrum band) and/or the second radio frequency spectrum band may be an unlicensed radio frequency spectrum band. The RF receiver may include separate receivers for the first radio frequency spectrum band and the second radio frequency spectrum band. The separate receivers may in some cases take the form of a first licensed spectrum module 1262 for communicating over the first radio frequency spectrum band, and a first unlicensed spectrum module 1264 for communicating over the second radio frequency spectrum band. The receiver module 1260, including the first licensed spectrum module 1262 and/or the first unlicensed spectrum module 1264, may be used to receive various types of data and/or control signals (i.e., transmissions) over one or more communication links (e.g., physical channels) of a wireless communication system, such as one or more communication links of the wireless communication system 100, 200, and/or 250 described with reference to FIGS. 1, 2A, and/or 2B.

In some embodiments, the transmitter module 1270 may be or include an RF transmitter, such as an RF transmitter operable to transmit in the first radio frequency spectrum band and/or the second radio frequency spectrum band. The RF transmitter may include separate transmitters for the first radio frequency spectrum band and the second radio frequency spectrum band. The separate transmitters may in some cases take the form of a second licensed spectrum module 1272 for communicating over the first radio frequency spectrum band, and a second unlicensed spectrum module 1274 for communicating over the second radio frequency spectrum band. The transmitter module 1270, including the second licensed spectrum module 1272 and/or the second unlicensed spectrum module 1274, may be used to transmit various types of data and/or control signals (i.e., transmissions) over one or more communication links (e.g., physical channels) of a wireless communication system, such as one or more communication links of the wireless communication system 100, 200, and/or 250 described with reference to FIGS. 1, 2A, and/or 2B.

In some embodiments, the communication management module 1265 may be an example of one or more aspects of the communication management module 1220 described with reference to FIG. 12A and may include a downlink control management module 1275, a CCA success indication management module 1280, an occupied bandwidth management module 1285, and/or a control format indicator value management module 1290.

In some embodiments, the downlink control management module 1275 may be used to identify at least a first physical carrier and a second physical carrier used by an operator in a shared spectrum, and to monitor both the first physical carrier and the second physical carrier for a downlink control transmission for the first physical carrier, as described, for example, with reference to FIGS. 6A and/or 6B. In some cases, the downlink control management module 1275 may receive an indication from the CCA success indication management module 1280 whether a channel is available. In some examples, if an indication that a channel is available is received, the downlink control management module 1275 may measure and/or report CSI, such as CSI feedback for a second physical layer in an uplink subframe, such as based on reference signals in the frame including the CCA. In some examples, if an indication that a channel is not available is received, the downlink control management module 1275 may measure and/or report CSI based on a previous frame, or may omit CSI for the frame.

In some embodiments, the CCA success indication management module 1280 may be used to receive, over a first physical carrier of a shared spectrum such as an unlicensed or shared spectrum, an indication of whether a CCA, or a CCA as a part of an ECCA operation, performed by a base station was successful for a second physical carrier of the shared spectrum.

In some embodiments, the occupied bandwidth management module 1285 may be used to determine whether a total set of transmissions scheduled for a frame satisfies an occupied bandwidth threshold for the frame. If not, the occupied bandwidth management module 1285 may transmit a filler signal over at least one unscheduled resource in the frame based on the determination.

In some embodiments, the control format indicator value management module 1290 may receive, over a physical carrier in a shared spectrum, a control format indicator value for a frame. Based on the control format indicator value, the control format indicator value management module 1290 may determine a number of subframes of the frame to be used by a base station for downlink transmissions over the physical carrier.

Figure 13A:
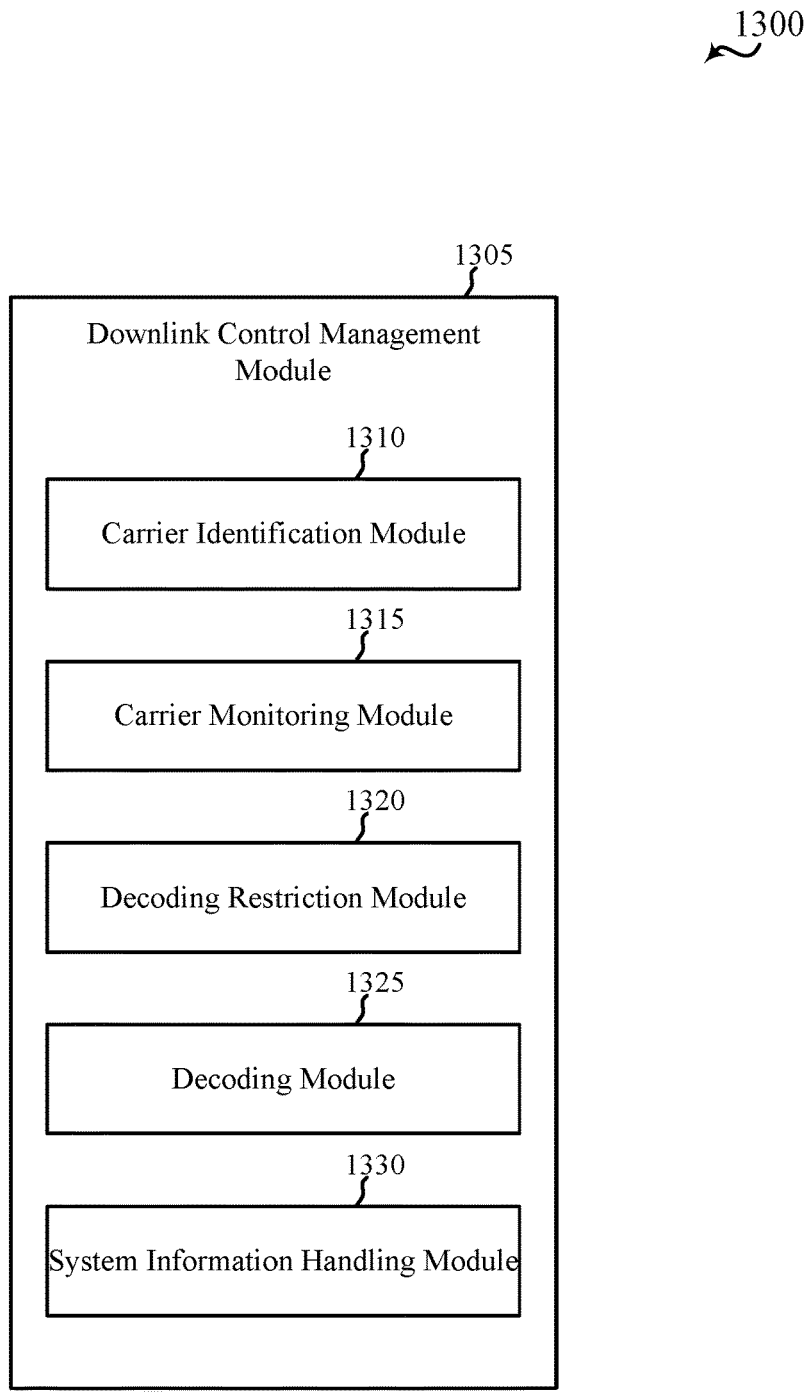
FIG. 13A shows a block diagram of a downlink control management module for use in wireless communication, in accordance with various aspects of the present disclosure.

FIG. 13A shows a block diagram 1300 of a downlink control management module 1305 for use in wireless communication, in accordance with various aspects of the present disclosure. The downlink control management module 1305 may be an example of one or more aspects of the downlink control management module 1275 described with reference to FIG. 12B. The downlink control management module 1305 may include a carrier identification module 1310, a carrier monitoring module 1315, a decoding restriction module 1320, a decoding module 1325, and/or a system information handling module 1330.

The components of the downlink control management module 1305 may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the carrier identification module 1310 may be used to identify at least a first physical carrier and a second physical carrier used by an operator in a shared or unlicensed spectrum.

In some embodiments, at least one of the first physical carrier or the second physical carrier may include a control channel for a different physical carrier, as described, for example, with reference to FIGS. 6A and/or 6B. In other embodiments, at least one of the first physical carrier or the second physical carrier may include a control channel for a plurality of different physical carriers, as described, for example, with reference to FIG. 6A.

In some embodiments, at least the first physical carrier and the second physical carrier may be associated with a common set of possible DCI formats and/or a common set of possible DCI sizes.

In some cases, at least one of the first physical carrier or the second physical carrier may include a primary component carrier and the other of the first physical carrier or the second physical carrier may include a secondary component carrier.

In some embodiments, the carrier monitoring module 1315 may be used to monitor both a first physical carrier and a second physical carrier identified by the carrier identification module 1310 for a downlink control transmission for the first physical carrier. In some cases, the carrier monitoring module 1315 may also monitor the first physical carrier and the second physical carrier for a downlink control transmission for the second physical carrier.

In some embodiments, monitoring the first physical carrier and the second physical carrier for the downlink control transmission may include monitoring the first physical carrier for at least a first DCI format and the second physical carrier for at least a second DCI format. The first DCI format may be different from the second DCI format.

In some embodiments, monitoring the first physical carrier and the second physical carrier for the downlink control transmission may include monitoring the first physical carrier for at least a first DCI size and the second physical carrier for at least a second DCI size. The first DCI size may be different from the second DCI size.

In some embodiments, monitoring the first physical carrier and the second physical carrier for the downlink control transmission may include restricting the monitoring of the second physical carrier to DCI associated with uplink grants for the first physical carrier. In some cases, monitoring the first physical carrier and the second physical carrier for the downlink control transmission may further include 1) monitoring the first physical carrier for at least a first DCI format associated with downlink grants for the first physical carrier and monitoring at least a second DCI format associated with uplink grants for the first physical carrier, and 2) monitoring the second physical carrier for at least the second DCI format associated with uplink grants for the first physical carrier. In some cases, the method 1700 may include refraining from monitoring the second physical carrier for at least the first DCI format associated with downlink grants for the first physical carrier. The first DCI format associated with downlink grants for the first physical carrier may be different from the second DCI format associated with uplink grants for the first physical carrier. An example of the operations described in this paragraph is described with reference to FIG. 8.

In some embodiments, monitoring the first physical carrier and the second physical carrier for a downlink control transmission may include monitoring a restricted number of decoding candidates for the downlink control transmission, on at least one of the first physical carrier or the second physical carrier, based on cross-carrier scheduling.

In some embodiments, monitoring the first physical carrier and the second physical carrier for a downlink control transmission may include monitoring a restricted number of resource sets for the downlink control transmission based on cross-carrier scheduling.

In some embodiments, monitoring the first physical carrier and the second physical carrier for a downlink control transmission may include monitoring at least one resource set including a restricted size based on cross-carrier scheduling.

In some embodiments, the monitoring may include monitoring a CSS including at least one resource set, as described, for example, with reference to FIGS. 9A and/or 9B. In some embodiments, at least one resource set of the CSS may be separate from a USS, as described, for example, with reference to FIG. 9A. In other embodiments, at least one resource set of the CSS may at least partially overlap a USS. In some cases, that at least partial overlap may be a complete overlap, as described, for example, with reference to FIG. 9B.

In some embodiments, the total number of resource sets monitored by a UE for the CSS and a USS may be restricted.

In some embodiments, a location or locations of resources of the at least one resource set may be based on a cell ID of a cell that transmits information using the at least one resource set.

In some embodiments, the carrier monitoring module 1315 may monitor a shared data channel (e.g., a PDSCH) of a first physical carrier for system information for the first physical carrier. In some embodiments, the shared data channel of the first physical carrier may be monitored for the system information for the first physical carrier in response to a CCA failure associated with the second physical carrier.

In some embodiments, the decoding restriction module 1320 may be used to restrict a number of blind decodes performed for a downlink control transmission on at least one of a first physical carrier or a second physical carrier based on a cross-carrier scheduling between the first physical carrier and the second physical carrier.

In some embodiments, the decoding module 1325 may be used to perform a number of blind decodes for a downlink control transmission on at least one of a first physical carrier or a second physical carrier. In some cases, the number of blind decodes performed by the decoding module 1325 may be restricted based on a number of factors. In some cases, a downlink control transmission may be blind decoded for a first physical carrier or a second physical carrier based on a common set of possible DCI formats and/or a common set of DCI sizes.

In some embodiments, the system information handling module 1330 may be used to receive system information for a number of physical carriers. In some cases, and by way of example, the system information handling module 1330 may receive system information for a first physical carrier via dedicated signaling over a shared data channel of the first physical carrier. In some cases, and by way of further example, a system information broadcast may be received for the first physical carrier over a physical broadcast channel of each of the first physical carrier and the second physical carrier.

Figure 13B:
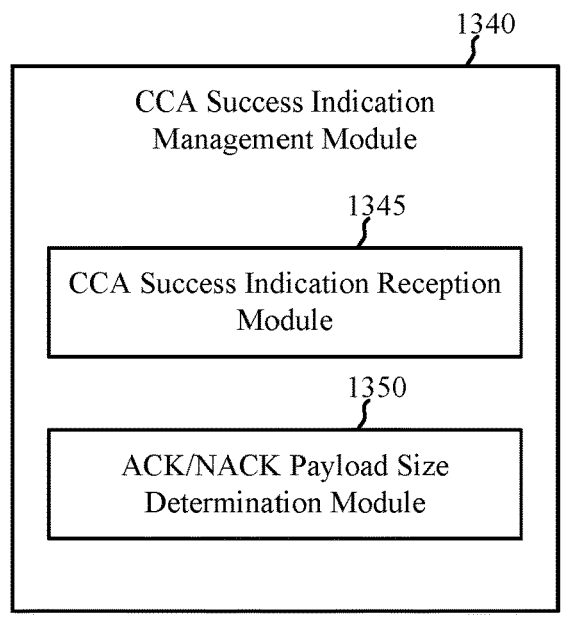
FIG. 13B shows a block diagram of a CCA success indication management module for use in wireless communication, in accordance with various aspects of the present disclosure.

FIG. 13B shows a block diagram 1335 of a CCA success indication management module 1340 for use in wireless communication, in accordance with various aspects of the present disclosure. The CCA success indication management module 1340 may be an example of one or more aspects of the CCA success indication management module 1280 described with reference to FIG. 12B. The CCA success indication management module 1340 may include a CCA success indication reception module 1345 and/or an ACK/NACK payload size determination module 1350.

The components of the CCA success indication management module 1340 may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the CCA success indication reception module 1345 may be used to receive, over a first physical carrier of the shared spectrum, an indication of whether a CCA, or a CCA as a part of an ECCA operation, performed by a base station was successful for a second physical carrier of the shared spectrum.

In some embodiments, an uplink grant for the second physical carrier may be received over the first physical carrier, and the indication of whether the CCA performed by the base station was successful may be received by the CCA success indication reception module 1345 as part of the uplink grant. In other embodiments, a signal including the indication of whether the CCA performed by the base station was successful may be received via at least one of a broadcast signal or a UE-specific signal transmitted over the first physical carrier. In yet other embodiments, a downlink assignment index may be received by the CCA success indication reception module 1345 over the first physical carrier, and the indication of whether the CCA for the second physical carrier was successful may be implicit in the downlink assignment index.

In some embodiments, the ACK/NACK payload size determination module 1350 may be used to determine a total ACK/NACK payload size in an uplink subframe based on an indication of whether a CCA for a physical carrier was successful.

Figure 13C:
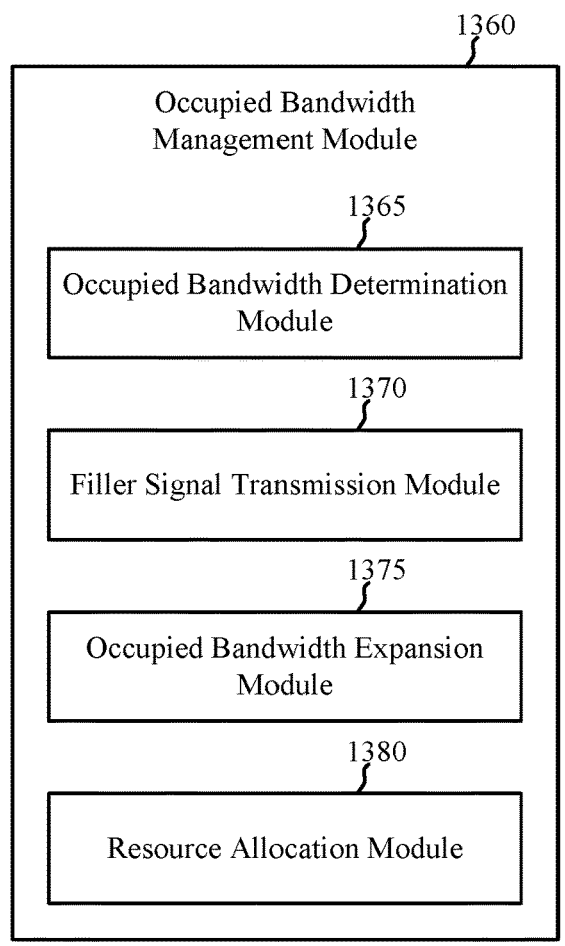
FIG. 13C shows a block diagram of an occupied bandwidth management module for use in wireless communication, in accordance with various aspects of the present disclosure.

FIG. 13C shows a block diagram 1355 of an occupied bandwidth management module 1360 for use in wireless communication, in accordance with various aspects of the present disclosure. The occupied bandwidth management module 1360 may be an example of one or more aspects of the occupied bandwidth management module 1285 described with reference to FIG. 12B. The occupied bandwidth management module 1360 may include an occupied bandwidth determination module 1365, a filler signal transmission module 1370, an occupied bandwidth expansion module 1375, and/or a resource allocation module 1380.

The components of the occupied bandwidth management module 1360 may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the occupied bandwidth determination module 1365 may be used to determine whether a total set of transmissions scheduled for a frame satisfies an occupied bandwidth threshold for the frame.

In some embodiments, the filler signal transmission module 1370 may be used to transmit a filler signal over at least one unscheduled resource in a frame, based on a determination made by the occupied bandwidth determination module 1365 (e.g., a determination that the occupied bandwidth does not satisfy an occupied bandwidth threshold of the frame). In some cases, the filler signal may include a predetermined sequence, such as a channel usage beacon signal (CUBS).

In some embodiments, the occupied bandwidth expansion module 1375 may be used to increase a bandwidth of at least one channel transmitted over a frame to satisfy the occupied bandwidth threshold for the frame. The occupied bandwidth expansion module 1375 may be activated based on a determination by the occupied bandwidth determination module 1365 that the occupied bandwidth does not satisfy an occupied bandwidth threshold of the frame. In some cases, increasing the bandwidth of the at least one channel transmitted over the frame may include reducing a modulation order or code rate for the at least one channel transmitted over the frame.

In some embodiments, the resource allocation module 1380 may be used to allocate search space resources to at least one UE based on a determination made by the occupied bandwidth determination module 1365.

Figure 13D:
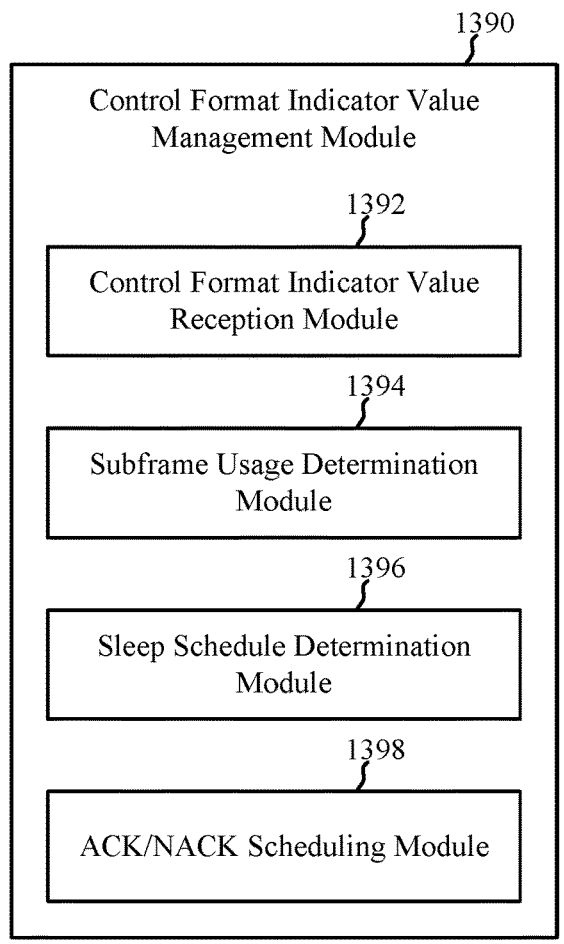
FIG. 13D shows a block diagram of a control format indicator value management module for use in wireless communication, in accordance with various aspects of the present disclosure.

FIG. 13D shows a block diagram 1385 of a control format indicator value management module 1390 for use in wireless communication, in accordance with various aspects of the present disclosure. The control format indicator value management module 1390 may be an example of one or more aspects of the control format indicator value management module 1290 described with reference to FIG. 12B. The control format indicator value management module 1390 may include a control format indicator value reception module 1392, a subframe usage determination module 1394, a sleep schedule determination module 1396, and/or an ACK/NACK scheduling module 1398.

The components of the control format indicator value management module 1390 may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the control format indicator value reception module 1392 may be used to receive a control format indicator value for a frame over a physical carrier in a shared spectrum. In some embodiments, the control format indicator value may be received during a first subframe of a frame, and in some cases during a first symbol of the first subframe. In other embodiments, the control format indicator value may be received during a last symbol of a last subframe of a frame. A bitwidth of the control format indicator value may be based on the structure of a frame.

In some embodiments, the subframe usage determination module 1394 may be used to determine, based on a control format indicator value received by the control format indicator value reception module 1392, a number of subframes of a frame to be used by a base station for downlink transmissions over a physical carrier.

In some embodiments, the sleep schedule determination module 1396 may be used to determine, based on a control format indicator value received by the control format indicator value reception module 1392, a sleep schedule of a UE for a frame.

In some embodiments, the ACK/NACK scheduling module 1398 may be used to schedule ACK/NACK transmissions based on a control format indicator value received by the control format indicator value reception module 1392.

Figure 14:
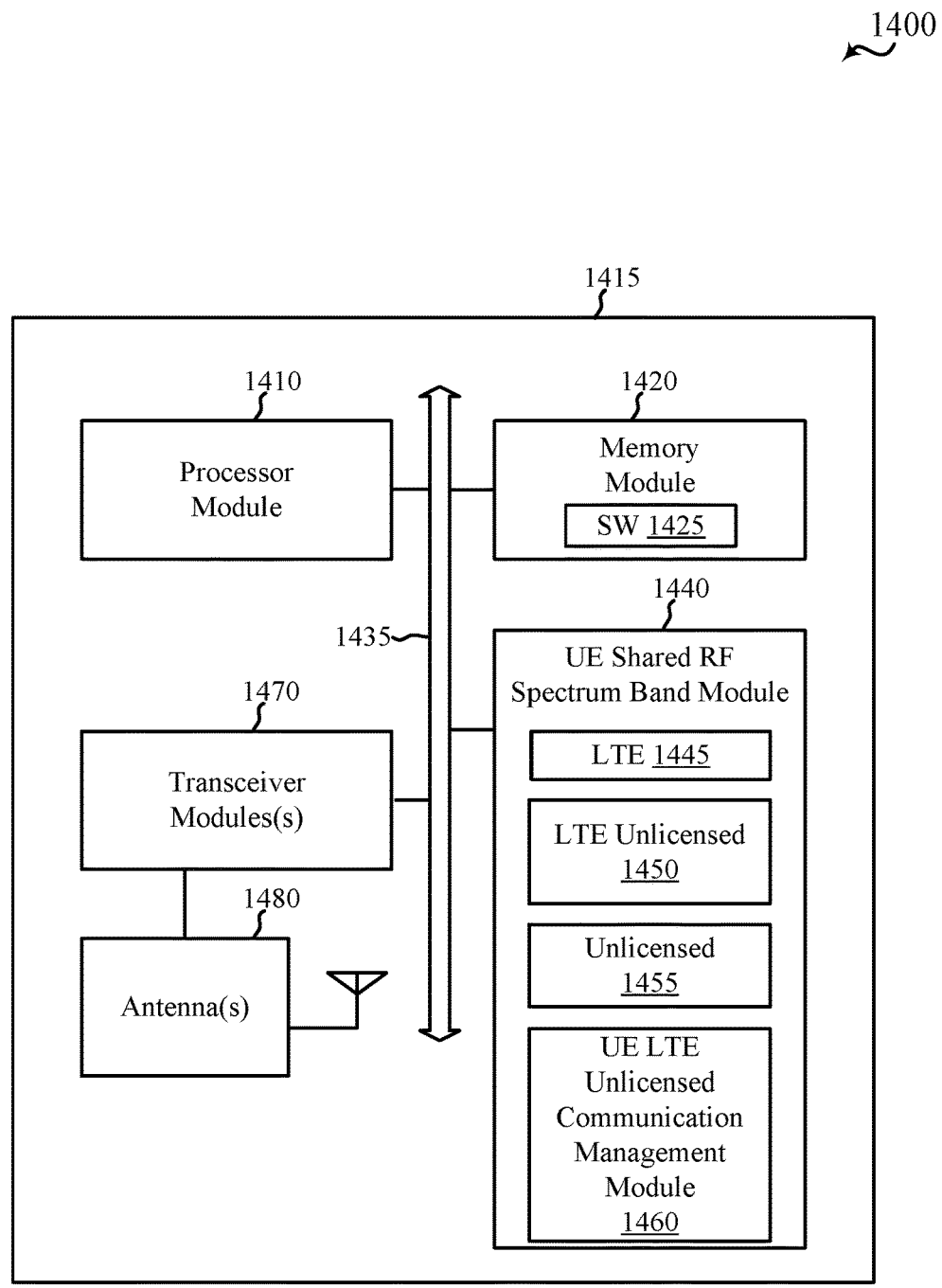
FIG. 14 shows a block diagram illustrating a UE configured for wireless communication, in accordance with various aspects of the present disclosure.

FIG. 14 shows a block diagram 1400 of a UE 1415 configured for wireless communication, in accordance with various aspects of the present disclosure. The UE 1415 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 1415 may in some cases have an internal power supply (not shown), such as a small battery, to facilitate mobile operation. In some embodiments, the UE 1415 may be an example of one or more aspects of one of the apparatuses 1215 and/or 1255 described with reference to FIGS. 12A and/or 12B, and/or one of the UEs 115 and/or 215 described with reference to FIGS. 1, 2A, and/or 2B. The UE 1415 may be configured to implement at least some of the features and functions described with reference to FIGS. 1, 2A, 2B, 3, 4A, 4B, 5, 6A, 6B, 7, 8, 9A, 9B, 10, 11, 12A, 12B, 13A, 13B, 13C, and/or 13D. The UE 1415 may be configured to communicate with one or more of the eNBs or apparatuses 105 and/or 205 described with reference to FIGS. 1, 2A, and/or 2B.

The UE 1415 may include a processor module 1410, a memory module 1420, at least one transceiver module (represented by transceiver module(s) 1470), at least one antenna (represented by antenna(s) 1480), and/or a UE shared RF spectrum band module 1440. Each of these components may be in communication with each other, directly or indirectly, over one or more buses 1435.

The memory module 1420 may include random access memory (RAM) and/or read-only memory (ROM). The memory module 1420 may store computer-readable, computer-executable software (SW) code 1425 containing instructions that are configured to, when executed, cause the processor module 1410 to perform various functions described herein for communicating over a first radio frequency spectrum band (e.g., an LTE/LTE-A and/or licensed radio frequency spectrum band) and/or a second radio frequency spectrum band. Alternatively, the software code 1425 may not be directly executable by the processor module 1410 but be configured to cause the UE 1415 (e.g., when compiled and executed) to perform various of the functions described herein.

The processor module 1410 may include an intelligent hardware device, e.g., a CPU, a microcontroller, an ASIC, etc. The processor module 1410 may process information received through the transceiver module(s) 1470 and/or information to be sent to the transceiver module(s) 1470 for transmission through the antenna(s) 1480. The processor module 1410 may handle, alone or in connection with the UE shared RF spectrum band module 1440, various aspects of communicating over the first radio frequency spectrum band and/or the second radio frequency spectrum band.

The transceiver module(s) 1470 may include a modem configured to modulate packets and provide the modulated packets to the antenna(s) 1480 for transmission, and to demodulate packets received from the antenna(s) 1480. The transceiver module(s) 1470 may in some cases be implemented as one or more transmitter modules and one or more separate receiver modules. The transceiver module(s) 1470 may support communications in the first radio frequency spectrum band and/or the second radio frequency spectrum band. The transceiver module(s) 1470 may be configured to communicate bi-directionally, via the antenna(s) 1480, with one or more of the eNBs or apparatuses 105 and/or 205 described with reference to FIGS. 1, 2A, and/or 2B. While the UE 1415 may include a single antenna, there may be embodiments in which the UE 1415 may include multiple antennas 1480.

The UE shared RF spectrum band module 1440 may be configured to perform and/or control some or all of the features and/or functions described with reference to FIGS. 1, 2A, 2B, 3, 4A, 4B, 5, 6A, 6B, 7, 8, 9A, 9B, 10, 11, 12A, 12B, 13A, 13B, 13C, and/or 13D related to wireless communication in a shared radio frequency spectrum band such as the first radio frequency spectrum band and/or the second radio frequency spectrum band. For example, the UE shared RF spectrum band module 1440 may be configured to support a supplemental downlink mode, a carrier aggregation mode, and/or a standalone mode of operation in the second radio frequency spectrum band. The UE shared RF spectrum band module 1440 may include an LTE module 1445 configured to handle LTE communications, an LTE unlicensed module 1450 configured to handle LTE/LTE-A communications over an unlicensed or shared spectrum, and/or an unlicensed module 1455 configured to handle communications other than LTE/LTE-A communications in the unlicensed spectrum. The UE shared RF spectrum band module 1440 may also include a UE LTE unlicensed communication management module 1460. The UE LTE unlicensed communication management module 1460 may be an example of one or more aspects of the communication management module 1220 and/or 1265 described with reference to FIG. 12A and/or 12B. The UE shared RF spectrum band module 1440, or portions of it, may include a processor, and/or some or all of the functionality of the UE shared RF spectrum band module 1440 may be performed by the processor module 1410 and/or in connection with the processor module 1410.

Figure 15:
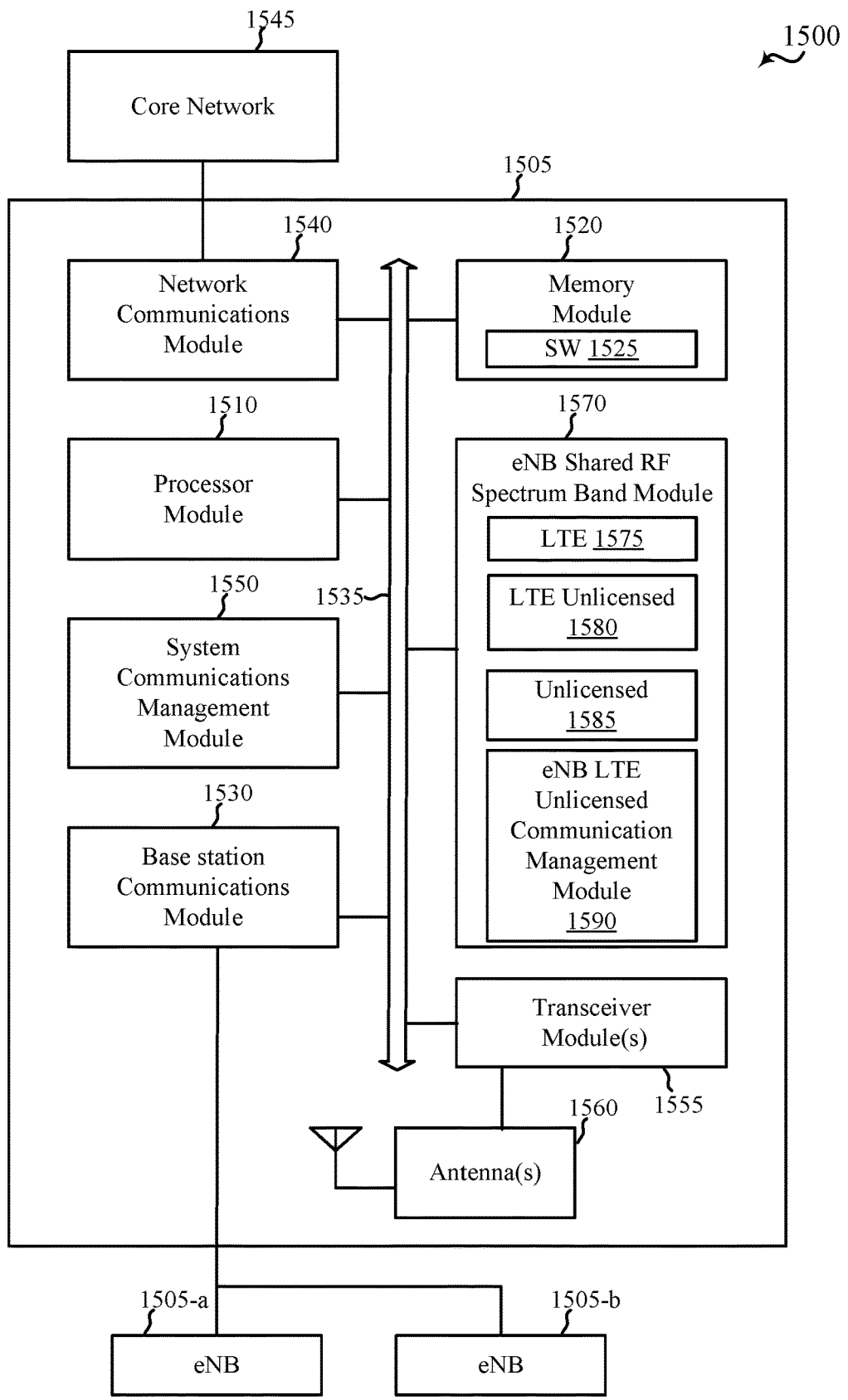
FIG. 15 shows a block diagram illustrating an eNB configured for wireless communication, in accordance with various aspects of the present disclosure.

FIG. 15 shows a block diagram 1500 illustrating a node 1505 configured for wireless communication, in accordance with various aspects of the present disclosure. The node 1505 may have various configurations and may be included or be part of an access point, a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a WiFi node, and/or a UE. In some embodiments, the node 1505 may be an example of one or more aspects of one of the access points 105 and/or 205 described with reference to FIGS. 1, 2A, and/or 2B. The node 1505 may be configured to implement or facilitate at least some of the features and functions described with reference to FIGS. 1, 2A, 2B, 3, 4A, 4B, 5, 6A, 6B, 7, 8, 9A, 9B, 10, 11, 12A, 12B, 13A, 13B, 13C, and/or 13D. The node 1505 may include a processor module 1510, a memory module 1520, at least one transceiver module (represented by transceiver module(s) 1555), at least one antenna (represented by antenna(s) 1560), and/or an eNB shared RF spectrum band module 1570. The node 1505 may also include one or more of a base station communications module 1530, a network communications module 1540, and a system communications management module 1550. Each of these components may be in communication with each other, directly or indirectly, over one or more buses 1535.

The memory module 1520 may include RAM and/or ROM. The memory module 1520 may store computer-readable, computer-executable software (SW) code 1525 containing instructions that are configured to, when executed, cause the processor module 1510 to perform various functions described herein for communicating over a first radio frequency spectrum band (e.g., an LTE/LTE-A and/or licensed radio frequency spectrum band) and/or a second radio frequency spectrum band. Alternatively, the software code 1525 may not be directly executable by the processor module 1510 but be configured to cause the node 1505 (e.g., when compiled and executed) to perform various functions described herein.

The processor module 1510 may include an intelligent hardware device, e.g., a central processing unit (CPU), a microcontroller, an ASIC, etc. The processor module 1510 may process information received through the transceiver module(s) 1555, the base station communications module 1530, and/or the network communications module 1540. The processor module 1510 may also process information to be sent to the transceiver module(s) 1555 for transmission through the antenna(s) 1560, to the base station communications module 1530 for transmission to one or more other nodes or eNBs 1505-*a* and 1505-*b*, and/or to the network communications module 1540 for transmission to a core network 1545, which may be an example of aspects of the core network 130 described with reference to FIG. 1. The processor module 1510 may handle, alone or in connection with the eNB shared RF spectrum band module 1570, various aspects of communicating over the first radio frequency spectrum band and/or the second radio frequency spectrum band.

The transceiver module(s) 1555 may include a modem configured to modulate packets and provide the modulated packets to the antenna(s) 1560 for transmission, and to demodulate packets received from the antenna(s) 1560. The transceiver module(s) 1555 may in some cases be implemented as one or more transmitter modules and one or more separate receiver modules. The transceiver module(s) 1555 may support communications in the first radio frequency spectrum band and/or the second radio frequency spectrum band. The transceiver module(s) 1555 may be configured to communicate bi-directionally, via the antenna(s) 1560, with one or more of the UEs or apparatuses 115, 215, 1215, 1255, and/or 1415 described with reference to FIGS. 1, 2A, 2B, 12A, 12B, and/or 14, for example. The node 1505 may typically include multiple antennas 1560 (e.g., an antenna array). The node 1505 may communicate with the core network 1545 through the network communications module 1540. The node 1505 may also communicate with other nodes or eNBs, such as the eNBs 1505-*a* and 1505-*b*, using the base station communications module 1530.

According to the architecture of FIG. 15, the system communications management module 1550 may manage communications with other nodes, base stations, eNBs, and/or apparatuses. In some cases, functionality of the system communications management module 1550 may be implemented as a component of the transceiver module(s) 1555, as a computer program product, and/or as one or more controller elements of the processor module 1510.

The eNB shared RF spectrum band module 1570 may be configured to perform, control, and/or facilitate some or all of the features and/or functions described with reference to FIGS. 1, 2A, 2B, 3, 4A, 4B, 5, 6A, 6B, 7, 8, 9A, 9B, 10, 11, 12A, 12B, 13A, 13B, 13C, and/or 13D related to wireless communication in a shared radio frequency spectrum band such as the first radio frequency spectrum band and/or the second radio frequency spectrum band. In some cases, the eNB shared RF spectrum band module 1570 may be configured to support a supplemental downlink mode, a carrier aggregation mode, and/or a standalone mode of operation in the second radio frequency spectrum band. The eNB shared RF spectrum band module 1570 may include an LTE module 1575 configured to handle LTE communications, an LTE unlicensed module 1580 configured to handle LTE/LTE-A communications in an unlicensed or shared spectrum, and/or an unlicensed module 1585 configured to handle communications other than LTE/LTE-A communications in an unlicensed or shared spectrum. The eNB shared RF spectrum band module 1570 may also include an eNB LTE unlicensed communication management module 1590. The eNB LTE unlicensed communication management module 1590 may generate and transmit some or all of the data and/or control information received by the apparatuses and/or UEs 115, 215, 1215, 1255, and/or 1415 described with reference to FIGS. 1, 2A, 2B, 12A, 12B, and/or 14. In some cases, and by way of example, the eNB LTE unlicensed communication management module 1590 may indicate control information, such as the set/subset of DCI formats that should be monitored on a given physical carrier, to each of a number of UEs, in a semi-static fashion (e.g., using a radio resource control (RRC) configuration/reconfiguration message). The eNB shared RF spectrum band module 1570, or portions of it, may include a processor, and/or some or all of the functionality of the eNB shared RF spectrum band module 1570 may be performed by the processor module 1510 and/or in connection with the processor module 1510.

Figure 16:
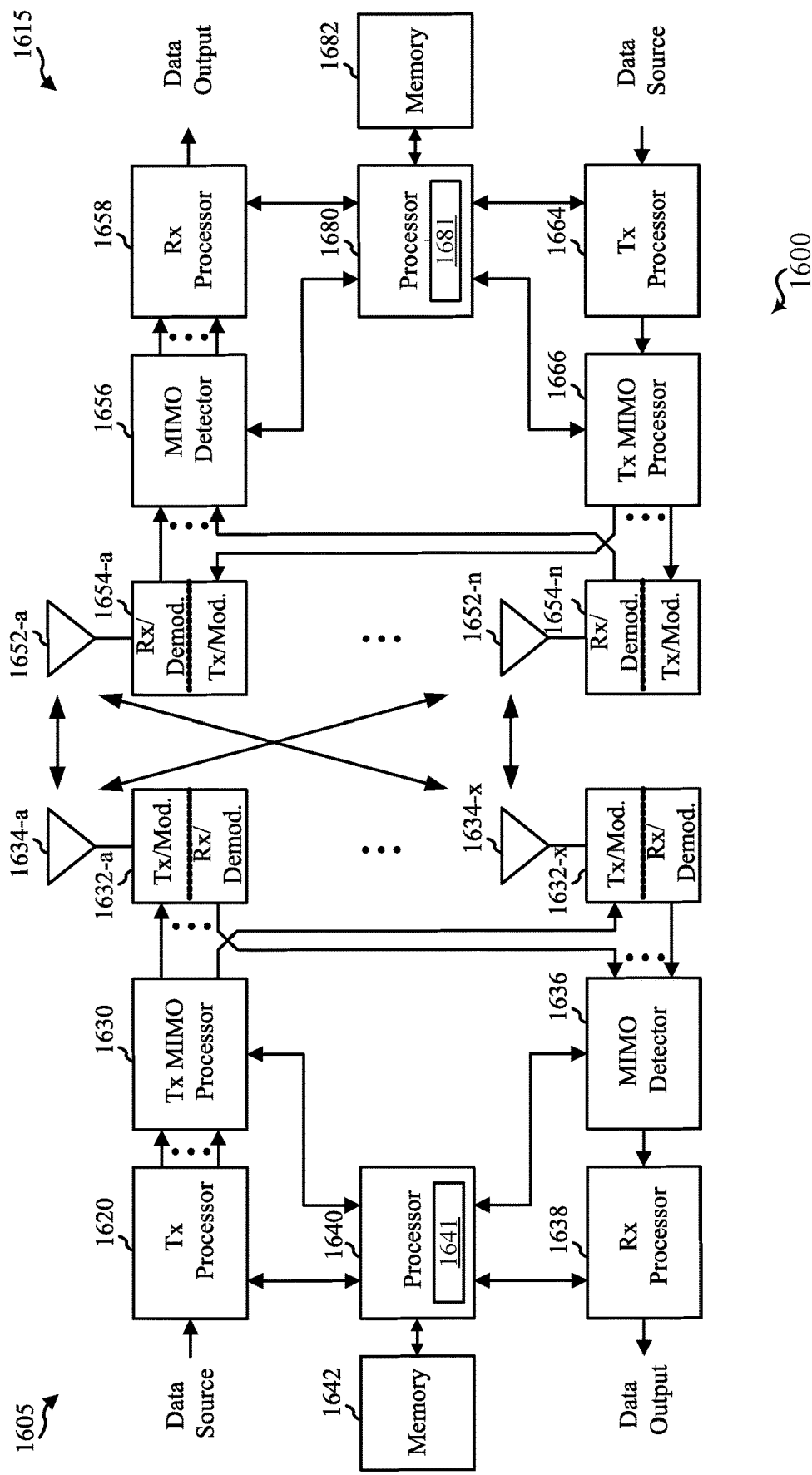
FIGS. 16 shows a block diagram of a multiple-input multiple-output (MIMO) communications system that is shown to include an eNB and a UE, in accordance with various aspects of the present disclosure.

FIG. 16 shows a block diagram of a multiple-input multiple-output (MIMO) communications system 1600 that is shown to include an eNB 1605 and a UE 1615, in accordance with various aspects of the present disclosure. The eNB 1605 and the UE 1615 may support wireless communication over a first radio frequency spectrum band (e.g., an LTE/LTE-A and/or licensed radio frequency spectrum band) and/or a second radio frequency spectrum band. The eNB 1605 may be an example of one or more aspects of one of the eNBs 105, 205, and/or 1505 described with reference to FIGS. 1, 2A, 2B, and/or 15. The UE 1615 may be an example of one or more aspects of one of the apparatuses 1205 and/or 1255 described with reference to FIGS. 12A and/or 12B, and/or one of the UEs 115, 215, and/or 1415 described with reference to FIGS. 1, 2A, 2B, and/or 14. The MIMO communications system 1600 may illustrate aspects of the wireless communication system 100, 200, and/or 250 described with reference to FIGS. 1, 2A, and/or 2B.

The eNB 1605 may be equipped with antennas 1634-a through 1634-x, and the UE 1615 may be equipped with antennas 1652-a through 1652-n. In the MIMO communications system 1600, the eNB 1605 may be able to send data over multiple communication links at the same time. Each communication link may be called a "layer" and the "rank" of the communication link may indicate the number of layers used for communication. For example, in a 2×2 MIMO system where the eNB 1605 transmits two "layers," the rank of the communication link between the eNB 1605 and the UE 1615 may be two.

At the eNB 1605, a transmit (Tx) processor 1620 communicatively coupled with a transmit memory 1642 may receive data from a data source. The transmit processor 1620 may process the data. The transmit processor 1620 may also generate a reference sequence for a number of reference symbols and/or a cell-specific reference signal. A transmit (Tx) MIMO processor 1630 may perform spatial processing (e.g., precoding) on data symbols, control symbols, and/or reference symbols, if applicable, and may provide output symbol streams to the transmit (Tx) modulators 1632-a through 1632-x. Each modulator 1632 may process a respective output symbol stream (e.g., for OFDM, etc.) to obtain an output sample stream. Each modulator 1632 may further process (e.g., convert to analog, amplify, filter, and upconvert) the output sample stream to obtain a downlink (DL) signal. In one example, DL signals from modulators 1632-a through 1632-x may be transmitted via the antennas 1634-a through 1634-x, respectively.

At the UE 1615, the antennas 1652-a through 1652-n may receive the DL signals from the eNB 1605 and may provide the received signals to the receive (Rx) demodulators 1654-a through 1654-n, respectively. Each demodulator 1654 may condition (e.g., filter, amplify, downconvert, and digitize) a respective received signal to obtain input samples. Each demodulator 1654 may further process the input samples (e.g., for OFDM, etc.) to obtain received symbols. A MIMO detector 1656 may obtain received symbols from all the demodulators 1654-a through 1654-n, perform MIMO detection on the received symbols if applicable, and provide detected symbols. A receive (Rx) processor 1658 may process (e.g., demodulate, deinterleave, and decode) the detected symbols, providing decoded data for the UE 1615 to a data output, and provide decoded control information to a processor 1680, or memory 1682.

On the uplink (UL), at the UE 1615, a transmit (Tx) processor 1664 may receive and process data from a data source. The transmit processor 1664 may also generate a reference sequence for a number of reference symbols and/or a reference signal. The symbols from the transmit processor 1664 may be precoded by a transmit (Tx) MIMO processor 1666 if applicable, further processed by the transmit (Tx) modulators 1654-a through 1654-n (e.g., for SC-FDMA, etc.), and be transmitted to the eNB 1605 in accordance with the transmission parameters received from the eNB 1605. At the eNB 1605, the UL signals from the UE 1615 may be received by the antennas 1634, processed by the receiver (Rx) demodulators 1632, detected by a MIMO detector 1636 if applicable, and further processed by a receive (Rx) processor 1638. The receive processor 1638 may provide decoded data to a data output and to the processor 1640.

The processors 1640 and 1680 may include respective modules or functions 1641 and 1681 for managing wireless communication in the first radio frequency spectrum band and/or the second radio frequency spectrum band. In some embodiments, the module or function 1641 may be an example of one or more aspects of the eNB LTE unlicensed communication management module 1590 described with reference to FIG. 15, and/or the module or function 1681 may be an example of one or more aspects of the communication management module 1220, 1265, and/or 1460 described with reference to FIG. 12A, 12B, and/or 14. The eNB 1605 may use the module or function 1641 to communicate with the UE 1615 and/or other UEs or apparatuses, while the UE 1615 may use the module or function 1681 to communicate with the eNB 1605 and/or other eNBs or apparatuses. In some cases, the eNB 1605 and UE 1615 may only transmit a channel or channels over the second radio frequency spectrum band after performing a successful CCA.

The components of the eNB 1605 may, individually or collectively, be implemented using one or more ASICs adapted to perform some or all of the applicable functions in hardware. Each of the noted modules may be a means for performing one or more functions related to operation of the MIMO communications system 1600. Similarly, the components of the UE 1615 may, individually or collectively, be implemented using one or more ASICs adapted to perform some or all of the applicable functions in hardware. Each of the noted components may be a means for performing one or more functions related to operation of the MIMO communications system 1600.

Figure 17:
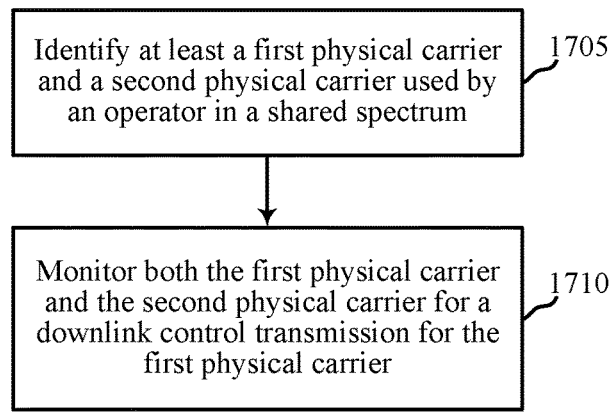
FIG. 17 is a flowchart illustrating an examples of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the apparatuses 1215 and/or 1255 described with reference to FIG. 12A and/or 12B, and/or one or more of the UEs 115, 215, 1415, and/or 1615 described with reference to FIGS. 1, 2A, 2B, 14, and/or 16. In some embodiments, an apparatus or UE such as one of the apparatuses 1215 or 1255, or one of the UEs 115, 215, 1415, or 1615, may execute one or more sets of codes to control the functional elements of the apparatus or UE to perform the functions described below.

At block 1705, at least a first physical carrier and a second physical carrier used by an operator in an unlicensed or shared spectrum may be identified. The operation(s) at block 1705 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier identification module 1310 described with reference to FIG. 13A.

In some embodiments, at least one of the first physical carrier or the second physical carrier may include a control channel for a different physical carrier, as described, for example, with reference to FIGS. 6A and/or 6B. In other embodiments, at least one of the first physical carrier or the second physical carrier may include a control channel for a plurality of different physical carriers, as described, for example, with reference to FIG. 6A.

In some cases, at least one of the first physical carrier or the second physical carrier may include a primary component carrier and the other of the first physical carrier or the second physical carrier may include a secondary component carrier.

At block 1710, both the first physical carrier and the second physical carrier may be monitored for a downlink control transmission for the first physical carrier. In some cases, the first physical carrier and the second physical carrier may also be monitored for a downlink control transmission for the second physical carrier. The operation(s) at block 1710 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier monitoring module 1315 described with reference to FIG. 13A.

In some embodiments, monitoring the first physical carrier and the second physical carrier for the downlink control transmission may include monitoring the first physical carrier for at least a first DCI format and the second physical carrier for at least a second DCI format. The first DCI format may be different from the second DCI format.

In some embodiments, monitoring the first physical carrier and the second physical carrier for the downlink control transmission may include monitoring the first physical carrier for at least a first DCI size and the second physical carrier for at least a second DCI size. The first DCI size may be different from the second DCI size.

In some embodiments, monitoring the first physical carrier and the second physical carrier for the downlink control transmission may include restricting the monitoring of the second physical carrier to DCI associated with uplink grants for the first physical carrier. In some cases, monitoring the first physical carrier and the second physical carrier for the downlink control transmission may further include 1) monitoring the first physical carrier for at least a first DCI format associated with downlink grants for the first physical carrier and monitoring at least a second DCI format associated with uplink grants for the first physical carrier, and 2) monitoring the second physical carrier for at least the second DCI format associated with uplink grants for the first physical carrier. In some cases, the method 1700 may include refraining from monitoring the second physical carrier for at least the first DCI format associated with downlink grants for the first physical carrier. The first DCI format associated with downlink grants for the first physical carrier may be different from the second DCI format associated with uplink grants for the first physical carrier. An example of the operations described in this paragraph is described with reference to FIG. 8.

The method 1700 may be performed in various contexts, such as, in a supplemental downlink mode, in a carrier aggregation mode, or in a standalone mode of operation in the second radio frequency spectrum band.

Thus, the method 1700 may provide for wireless communication. It should be noted that the method 1700 is just one implementation and that the operations of the method 1700 may be rearranged or otherwise modified such that other implementations are possible.

Figure 18:
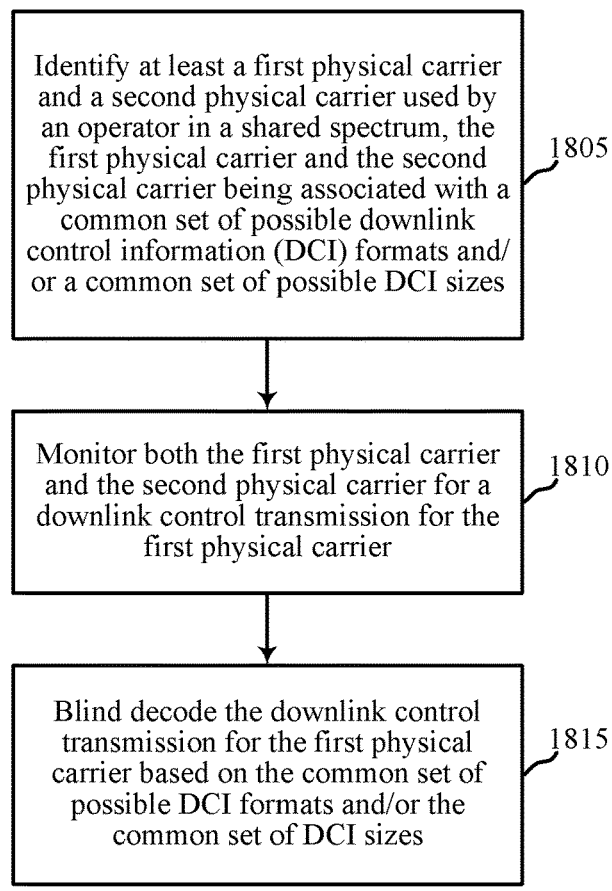
FIG. 18 is a flowchart illustrating an examples of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, an apparatus or UE such as one of the apparatuses 1215 or 1255, or one of the UEs 115, 215, 1415, or 1615, may execute one or more sets of codes to control the functional elements of the apparatus or UE to perform the functions described below.

At block 1805, at least a first physical carrier and a second physical carrier used by an operator in an unlicensed or shared spectrum may be identified. The first physical carrier and the second physical carrier may be associated with a common set of possible DCI formats and/or a common set of possible DCI sizes. The operation(s) at block 1805 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier identification module 1310 described with reference to FIG. 13A.

In some cases, at least one of the first physical carrier or the second physical carrier may include a primary component carrier and the other of the first physical carrier or the second physical carrier may include a secondary component carrier.

At block 1810, both the first physical carrier and the second physical carrier may be monitored for a downlink control transmission for the first physical carrier. In some cases, the first physical carrier and the second physical carrier may also be monitored for a downlink control transmission for the second physical carrier. The operation(s) at block 1810 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier monitoring module 1315 described with reference to FIG. 13A.

At block 1815, the downlink control transmission for the first physical carrier may be blind decoded based on the common set of possible DCI formats and/or the common set of DCI sizes. The operation(s) at block 1815 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the decoding module 1325 described with reference to FIG. 13A.

The method 1800 may be performed in various contexts, such as, in a supplemental downlink mode, in a carrier aggregation mode, or in a standalone mode of operation in the second radio frequency spectrum band.

Thus, the method 1800 may provide for wireless communication. It should be noted that the method 1800 is just one implementation and that the operations of the method 1800 may be rearranged or otherwise modified such that other implementations are possible.

Figure 19:
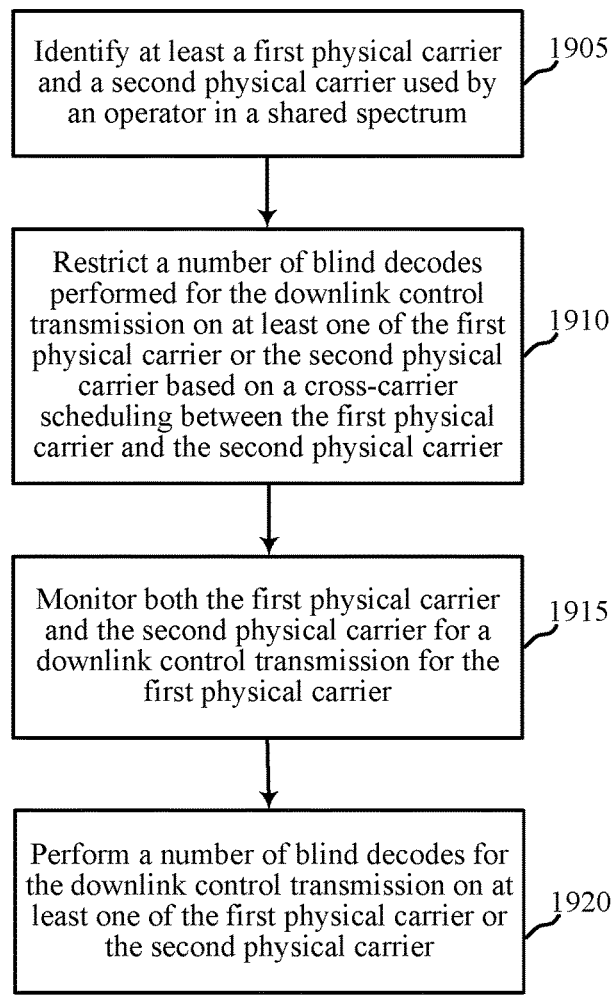
FIG. 19 is a flowchart illustrating an examples of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 1905, at least a first physical carrier and a second physical carrier used by an operator in an unlicensed or shared spectrum may be identified. The operation(s) at block 1905 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier identification module 1310 described with reference to FIG. 13A.

In some cases, at least one of the first physical carrier or the second physical carrier may include a primary component carrier and the other of the first physical carrier or the second physical carrier may include a secondary component carrier.

At block 1910, a number of blind decodes performed for the downlink control transmission on at least one of the first physical carrier or the second physical carrier may be restricted based on a cross-carrier scheduling between the first physical carrier and the second physical carrier. The operation(s) at block 1910 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the decoding restriction module 1320 described with reference to FIG. 13A.

At block 1915, both the first physical carrier and the second physical carrier may be monitored for a downlink control transmission for the first physical carrier. In some cases, the first physical carrier and the second physical carrier may also be monitored for a downlink control transmission for the second physical carrier. The operation(s) at block 1915 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier monitoring module 1315 described with reference to FIG. 13A.

In some embodiments, monitoring the first physical carrier and the second physical carrier for the downlink control transmission may include monitoring a restricted number of decoding candidates for the downlink control transmission on at least one of the first physical carrier or the second physical carrier based on the cross-carrier scheduling.

In some embodiments, monitoring the first physical carrier and the second physical carrier for the downlink control transmission may include monitoring a restricted number of resource sets for the downlink control transmission based on the cross-carrier scheduling.

In some embodiments, monitoring the first physical carrier and the second physical carrier for the downlink control transmission may include monitoring at least one resource set including a restricted size based on the cross-carrier scheduling.

At block 1920, a number of blind decodes may be performed for the downlink control transmission on at least one of the first physical carrier or the second physical carrier. The operation(s) at block 1920 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the decoding module 1325 described with reference to FIG. 13A.

The method 1900 may be performed in various contexts, such as, in a supplemental downlink mode, in a carrier aggregation mode, or in a standalone mode of operation in the second radio frequency spectrum band.

Thus, the method 1900 may provide for wireless communication. It should be noted that the method 1900 is just one implementation and that the operations of the method 1900 may be rearranged or otherwise modified such that other implementations are possible.

Figure 20:
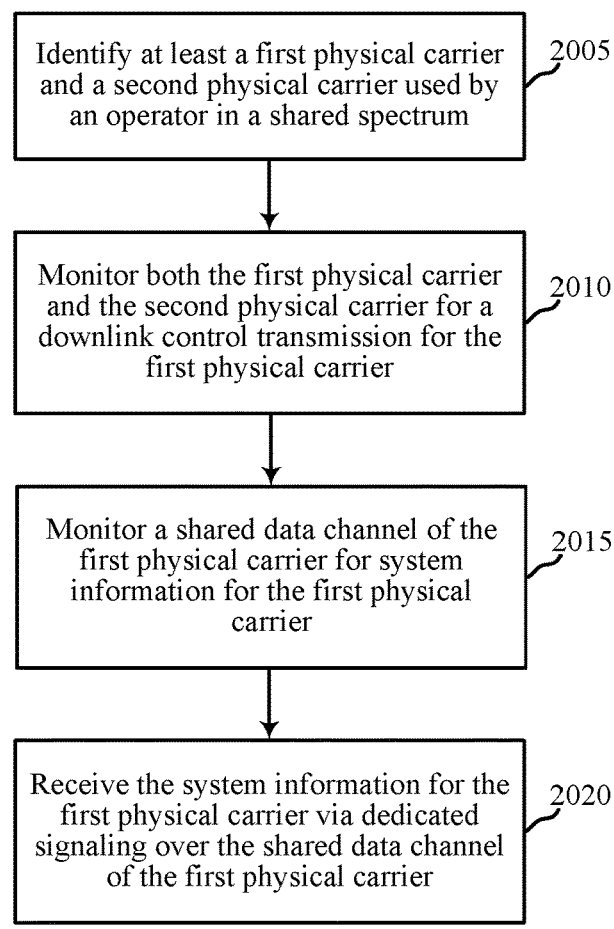
FIG. 20 is a flowchart illustrating an examples of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 2005, at least a first physical carrier and a second physical carrier used by an operator in an unlicensed or shared spectrum may be identified. The operation(s) at block 2005 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier identification module 1310 described with reference to FIG. 13A.

In some cases, at least one of the first physical carrier or the second physical carrier may include a primary component carrier and the other of the first physical carrier or the second physical carrier may include a secondary component carrier.

At block 2010, both the first physical carrier and the second physical carrier may be monitored for a downlink control transmission for the first physical carrier. In some cases, the first physical carrier and the second physical carrier may also be monitored for a downlink control transmission for the second physical carrier. The operation(s) at block 2010 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier monitoring module 1315 described with reference to FIG. 13A.

At block 2015, a shared data channel (e.g., a PDSCH) of the first physical carrier may be monitored for system information for the first physical carrier. The operation(s) at block 2015 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier monitoring module 1315 described with reference to FIG. 13A.

In some embodiments, the shared data channel of the first physical carrier may be monitored for the system information for the first physical carrier in response to a CCA failure associated with the second physical carrier.

At block 2020, the system information for the first physical carrier may be received via dedicated signaling over the shared data channel of the first physical carrier. The operation(s) at block 2020 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the system information handling module 1330 described with reference to FIG. 13A.

The method 2000 may be performed in various contexts, such as, in a supplemental downlink mode, in a carrier aggregation mode, or in a standalone mode of operation in the second radio frequency spectrum band.

Thus, the method 2000 may provide for wireless communication. It should be noted that the method 2000 is just one implementation and that the operations of the method 2000 may be rearranged or otherwise modified such that other implementations are possible.

Figure 21:
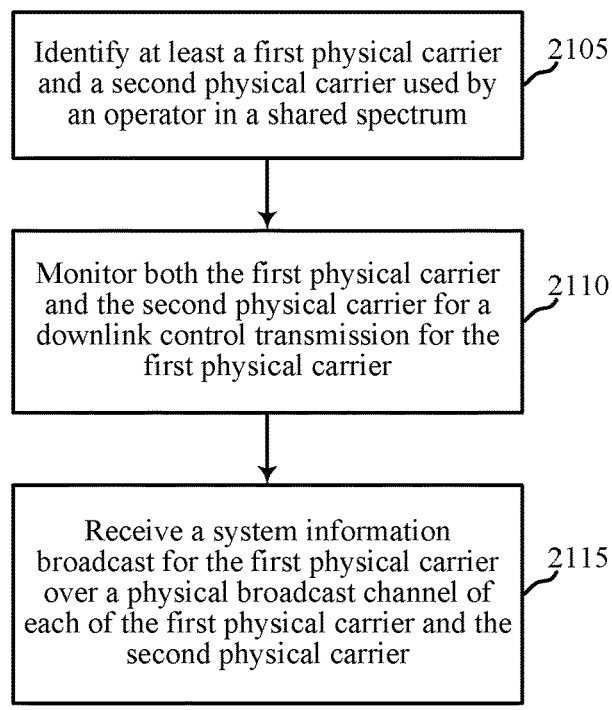
FIG. 21 is a flowchart illustrating an examples of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the apparatuses 1215 and/or 1255 described with reference to FIG. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 2105, at least a first physical carrier and a second physical carrier used by an operator in an unlicensed or shared spectrum may be identified. The operation(s) at block 2105 may in some cases be performed using the communication management module 1220, 1265, 1460, and/or 1681 described with reference to FIGS. 12A, 12B, 14, and/or 16, the downlink control management module 1275 and/or 1305 described with reference to FIG. 12B and/or 13A, and/or the carrier identification module 1310 described with reference to FIG. 13A.

In some cases, at least one of the first physical carrier or the second physical carrier may include a primary component carrier and the other of the first physical carrier or the second physical carrier may include a secondary component carrier.

At block 2110, both the first physical carrier and the second physical carrier may be monitored for a downlink control transmission for the first physical carrier. In some cases, the first physical carrier and the second physical carrier may also be monitored for a downlink control transmission for the second physical carrier. The operation(s) at block 2110 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier monitoring module 1315 described with reference to FIG. 13A.

At block 2115, a system information broadcast may be received for the first physical carrier over a physical broadcast channel of each of the first physical carrier and the second physical carrier. The operation(s) at block 2115 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the system information handling module 1330 described with reference to FIG. 13A.

The method 2100 may be performed in various contexts, such as, in a supplemental downlink mode, in a carrier aggregation mode, or in a standalone mode of operation in the second radio frequency spectrum band.

Thus, the method 2100 may provide for wireless communication. It should be noted that the method 2100 is just one implementation and that the operations of the method 2100 may be rearranged or otherwise modified such that other implementations are possible.

Figure 22:
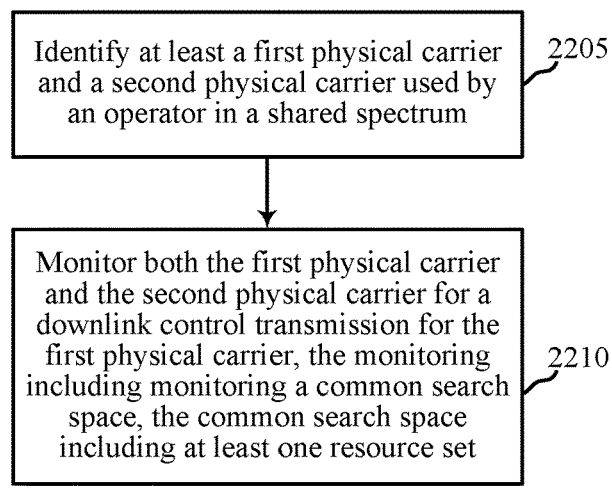
FIG. 22 is a flowchart illustrating an examples of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 2205, at least a first physical carrier and a second physical carrier used by an operator in an unlicensed or shared spectrum may be identified. The operation(s) at block 2205 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier identification module 1310 described with reference to FIG. 13A.

In some cases, at least one of the first physical carrier or the second physical carrier may include a primary component carrier and the other of the first physical carrier or the second physical carrier may include a secondary component carrier.

At block 2210, both the first physical carrier and the second physical carrier may be monitored for a downlink control transmission for the first physical carrier. The monitoring may include monitoring a CSS including at least one resource set, as described, for example, with reference to FIGS. 9A and/or 9B. The operation(s) at block 2210 may in some cases be performed using the communication management module 1220, 1265, 1460, and/or 1681 described with reference to FIGS. 12A, 12B, 14, and/or 16, the downlink control management module 1275 and/or 1305 described with reference to FIGS. 12B and/or 13A, and/or the carrier monitoring module 1315 described with reference to FIG. 13A.

In some embodiments, at least one resource set of the CSS may be separate from a USS, as described, for example, with reference to FIG. 9A. In other embodiments, at least one resource set of the CSS may at least partially overlap a USS. In some cases, that at least partial overlap may be a complete overlap, as described, for example, with reference to FIG. 9B.

In some embodiments, the total number of resource sets monitored by a UE for the CSS and a USS may be restricted.

In some embodiments, a location or locations of resources of the at least one resource set may be based on a cell ID of a cell that transmits information using the at least one resource set.

The method 2200 may be performed in various contexts, such as, in a supplemental downlink mode, in a carrier aggregation mode, or in a standalone mode of operation in the second radio frequency spectrum band.

Thus, the method 2200 may provide for wireless communication. It should be noted that the method 2200 is just one implementation and that the operations of the method 2200 may be rearranged or otherwise modified such that other implementations are possible.

FIG. 23 is a flow chart illustrating an example of a method 2300 for wireless communication, in accordance with various aspects of the present disclosure. For clarity, the method 2300 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 2305, an indication of whether a CCA, such as a CCA as a part of an ECCA operation, performed by a base station was successful, for a second physical carrier of a shared spectrum, may be received over a first physical carrier of the shared spectrum. The operation(s) at block 2305 may in some cases be performed using the communication management module 1220, 1265, 1460, and/or 1681 described with reference to FIGS. 12A, 12B, 14, and/or 16, the CCA success indication management module 1280 and/or 1340 described with reference to FIGS. 12B and/or 13B, and/or the CCA success indication reception module 1345 described with reference to FIG. 13B.

In some embodiments, an uplink grant for the second physical carrier may be received over the first physical carrier, and the indication of whether the CCA performed by the base station was successful may be received as part of the uplink grant. In other embodiments, a signal including the indication of whether the CCA performed by the base station was successful may be received over the first physical carrier. The signal may in some cases include at least one of a broadcast signal or a UE-specific signal. In yet other embodiments, a downlink assignment index may be received over the first physical carrier, and the indication of whether the CCA for the second physical carrier was successful may be implicit in the downlink assignment index.

In some cases, at least one of the first physical carrier or the second physical carrier may include a primary component carrier and the other of the first physical carrier or the second physical carrier may include a secondary component carrier.

The method 2300 may be performed in various contexts, such as, in a supplemental downlink mode, in a carrier aggregation mode, or in a standalone mode of operation in the second radio frequency spectrum band.

Thus, the method 2300 may provide for wireless communication. It should be noted that the method 2300 is just one implementation and that the operations of the method 2300 may be rearranged or otherwise modified such that other implementations are possible.

Figure 24:
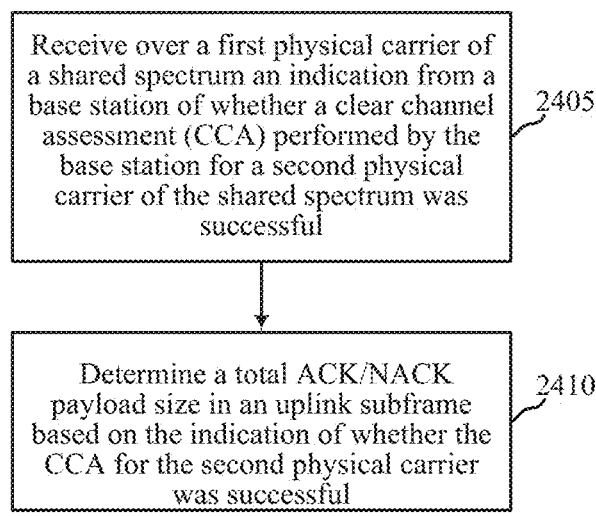
FIG. 24 is a flowchart illustrating an examples of a method for wireless communication, in accordance with various aspects of the present disclosure.

FIG. 24 is a flow chart illustrating an example of a method 2400 for wireless communication, in accordance with various aspects of the present disclosure. For clarity, the method 2400 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 2405, an indication of whether a CCA, such as a CCA as a part of an ECCA operation, performed by a base station was successful, for a second physical carrier of a shared spectrum, may be received over a first physical carrier of the shared spectrum. The operation(s) at block 2405 may in some cases be performed using the communication management module 1220, 1265, 1460, and/or 1681 described with reference to FIGS. 12A, 12B, 14, and/or 16, the CCA success indication management module 1280 and/or 1340 described with reference to FIGS. 12B and/or 13B, and/or the CCA success indication reception module 1345 described with reference to FIG. 13B.

In some embodiments, an uplink grant for the second physical carrier may be received over the first physical carrier, and the indication of whether the CCA performed by the base station was successful may be received as part of the uplink grant. In other embodiments, a signal including the indication of whether the CCA performed by the base station was successful may be received over the first physical carrier. The signal may in some cases include at least one of a broadcast signal or a UE-specific signal. In yet other embodiments, a downlink assignment index may be received over the first physical carrier, and the indication of whether the CCA for the second physical carrier was successful may be implicit in the downlink assignment index. In some cases, a CSI feedback for the second physical carrier in an uplink subframe may be determined based on the indication of whether the CCA for the second physical carrier was successful. If the CCA indicates availability of a channel, CSI may be measured and/or reported, such as based on reference signals in the frame including the CCA.

In some examples, if the CCA indicates a channel or carrier is not available, CSI may be measured and/or reported for that channel or carrier, such as based on a previous frame, or CSI may be omitted for the frame.

At block 2410, a total ACK/NACK payload size in an uplink subframe may be determined based on the indication of whether the CCA for the second physical carrier was successful. The operation(s) at block 2410 may in some cases be performed using the communication management module 1220, 1265, 1460, and/or 1681 described with reference to FIG. 12A, 12B, 14, and/or 16, the CCA success indication management module 1280 and/or 1340 described with reference to FIG. 12B and/or 13B, and/or the ACK/NACK payload size determination module 1350 described with reference to FIG. 13B.

In some cases, at least one of the first physical carrier or the second physical carrier may include a primary component carrier and the other of the first physical carrier or the second physical carrier may include a secondary component carrier.

The method 2400 may be performed in various contexts, such as, in a supplemental downlink mode, in a carrier aggregation mode, or in a standalone mode of operation in the second radio frequency spectrum band.

Thus, the method 2400 may provide for wireless communication. It should be noted that the method 2400 is just one implementation and that the operations of the method 2400 may be rearranged or otherwise modified such that other implementations are possible.

Figure 25:
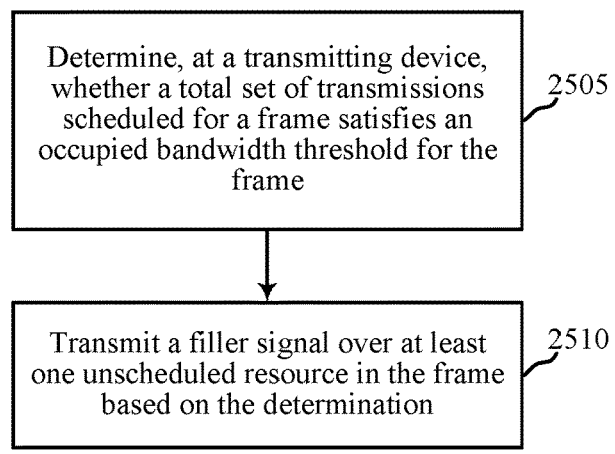
FIG. 25 is a flowchart illustrating an examples of a method for wireless communication, in accordance with various aspects of the present disclosure.

FIG. 25 is a flow chart illustrating an example of a method 2500 for wireless communication, in accordance with various aspects of the present disclosure. For clarity, the method 2500 is described below with reference to aspects of one or more of the apparatuses 1215 and/or 1255 described with reference to FIGS. 12A and/or 12B, one of the eNBs 105, 205, 1505, and/or 1605 described with reference to FIGS. 1, 2A, 2B, 15, and/or 16, and/or one or more of the UEs 115, 215, 1415, and/or 1615 described with reference to FIGS. 1, 2A, 2B, 14, and/or 16. In some embodiments, an apparatus, eNB, or UE such as one of the apparatuses 1215 or 1255, one of the eNBs 105, 205, 1505, or 1605, or one of the UEs 115, 215, 1415, or 1615, may execute one or more sets of codes to control the functional elements of the apparatus, eNB, or UE to perform the functions described below.

At block 2505, it may be determined, at a transmitting device such as a UE or eNB, whether a total set of transmissions scheduled for a frame satisfies an occupied bandwidth threshold for the frame. The operation(s) at block 2505 may in some cases be performed using the communication management module 1220, 1265, 1460, 1590, 1641, and/or 1681 described with reference to FIGS. 12A, 12B, 14, and/or 16, the occupied bandwidth management module 1285 and/or 1360 described with reference to FIGS. 12B and/or 13C, and/or the occupied bandwidth determination module 1365 described with reference to FIG. 13C.

At block 2510, a filler signal may be transmitted over at least one unscheduled resource in the frame based on the determination made at block 2505 (e.g., based on a determination that the occupied bandwidth does not satisfy the occupied bandwidth threshold of the frame). The operation(s) at block 2510 may in some cases be performed using the communication management module 1220, 1265, 1460, 1590, 1641, and/or 1681 described with reference to FIGS. 12A, 12B, 14, and/or 16, the occupied bandwidth management module 1285 and/or 1360 described with reference to FIGS. 12B and/or 13C, and/or the filler signal transmission module 1370 described with reference to FIG. 13C.

In some cases, the filler signal may include a predetermined sequence, such as a CUBS.

The method 2500 may be performed in various contexts, such as, in a supplemental downlink mode, in a carrier aggregation mode, or in a standalone mode of operation in the second radio frequency spectrum band.

Thus, the method 2500 may provide for wireless communication. It should be noted that the method 2500 is just one implementation and that the operations of the method 2500 may be rearranged or otherwise modified such that other implementations are possible.

Figure 26:
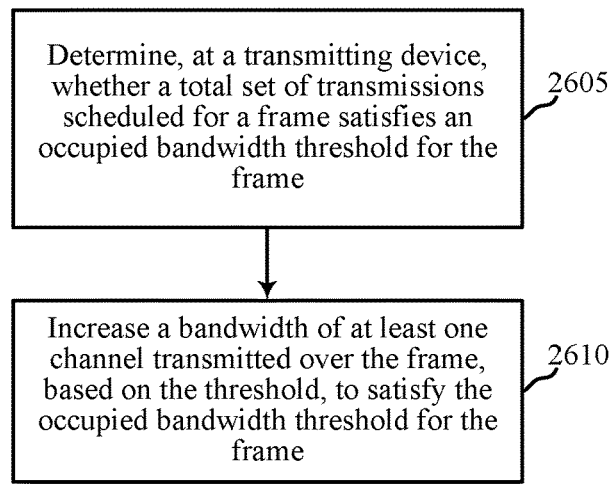
FIG. 26 is a flowchart illustrating an examples of a method for wireless communication, in accordance with various aspects of the present disclosure.

FIG. 26 is a flow chart illustrating an example of a method 2600 for wireless communication, in accordance with various aspects of the present disclosure. For clarity, the method 2600 is described below with reference to aspects of one or more of the apparatuses 1215 and/or 1255 described with reference to FIGS. 12A and/or 12B, one of the eNBs 105, 205, 1505, and/or 1605 described with reference to FIGS. 1, 2A, 2B, 15, and/or 16, and/or one or more of the UEs 115, 215, 1415, and/or 1615 described with reference to FIGS. 1, 2A, 2B, 14, and/or 16. In some embodiments, an apparatus, eNB, or UE such as one of the apparatuses 1215 or 1255, one of the eNBs 105, 205, 1505, or 1605, or one of the UEs 115, 215, 1415, or 1615, may execute one or more sets of codes to control the functional elements of the apparatus, eNB, or UE to perform the functions described below.

At block 2605, it may be determined, at a transmitting device such as a UE or eNB, whether a total set of transmissions scheduled for a frame satisfies an occupied bandwidth threshold for the frame. The operation(s) at block 2605 may in some cases be performed using the communication management module 1220, 1265, 1460, 1590, 1641, and/or 1681 described with reference to FIGS. 12A, 12B, 14, and/or 16, the occupied bandwidth management module 1285 and/or 1360 described with reference to FIGS. 12B and/or 13C, and/or the occupied bandwidth determination module 1365 described with reference to FIG. 13C.

At block 2610, a bandwidth of at least one channel transmitted over the frame may be increased, based on the determination made at block 2605, to satisfy the occupied bandwidth threshold for the frame. In some cases, increasing the bandwidth of the at least one channel transmitted over the frame may include reducing a modulation order or code rate for the at least one channel transmitted over the frame. The operation(s) at block 2610 may in some cases be performed using the communication management module 1220, 1265, 1460, 1590, 1641, and/or 1681 described with reference to FIGS. 12A, 12B, 14, and/or 16, the occupied bandwidth management module 1285 and/or 1360 described with reference to FIGS. 12B and/or 13C, and/or the occupied bandwidth expansion module 1375 described with reference to FIG. 13C.

The method 2600 may be performed in various contexts, such as, in a supplemental downlink mode, in a carrier aggregation mode, or in a standalone mode of operation in the second radio frequency spectrum band.

Thus, the method 2600 may provide for wireless communication. It should be noted that the method 2600 is just one implementation and that the operations of the method 2600 may be rearranged or otherwise modified such that other implementations are possible.

Figure 27:
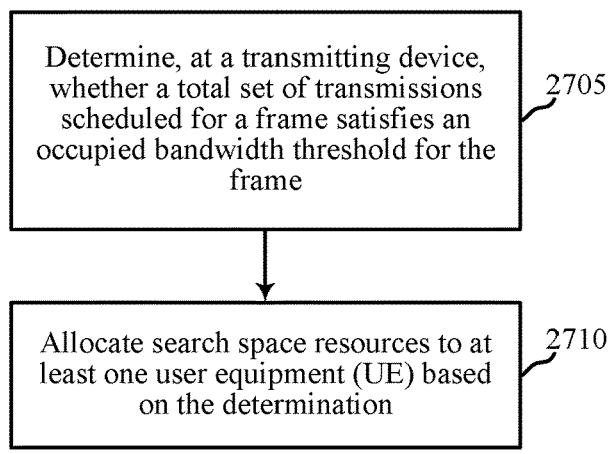
FIG. 27 is a flowchart illustrating an examples of a method for wireless communication, in accordance with various aspects of the present disclosure.

FIG. 27 is a flow chart illustrating an example of a method 2700 for wireless communication, in accordance with various aspects of the present disclosure. For clarity, the method 2700 is described below with reference to aspects of one or more of the apparatuses 1215 and/or 1255 described with reference to FIGS. 12A and/or 12B, one of the eNBs 105, 205, 1505, and/or 1605 described with reference to FIGS. 1, 2A, 2B, 15, and/or 16, and/or one or more of the UEs 115, 215, 1415, and/or 1615 described with reference to FIGS. 1, 2A, 2B, 14, and/or 16. In some embodiments, an apparatus, eNB, or UE such as one of the apparatuses 1215 or 1255, one of the eNBs 105, 205, 1505, or 1605, or one of the UEs 115, 215, 1415, or 1615, may execute one or more sets of codes to control the functional elements of the apparatus, eNB, or UE to perform the functions described below.

At block 2705, it may be determined, at a transmitting device such as a UE or eNB, whether a total set of transmissions scheduled for a frame satisfies an occupied bandwidth threshold for the frame. The operation(s) at block 2705 may in some cases be performed using the communication management module 1220, 1265, 1460, 1590, 1641, and/or 1681 described with reference to FIGS. 12A, 12B, 14, and/or 16, the occupied bandwidth management module 1285 and/or 1360 described with reference to FIGS. 12B and/or 13C, and/or the occupied bandwidth determination module 1365 described with reference to FIG. 13C.

At block 2710, search space resources may be allocated to at least one UE based on the determination made at block 2705. The operation(s) at block 2710 may in some cases be performed using the communication management module 1220, 1265, 1460, 1590, 1641, and/or 1681 described with reference to FIGS. 12A, 12B, 14, and/or 16, the occupied bandwidth management module 1285 and/or 1360 described with reference to FIGS. 12B and/or 13C, and/or the resource allocation module 1380 described with reference to FIG. 13C.

The method 2700 may be performed in various contexts, such as, in a supplemental downlink mode, in a carrier aggregation mode, or in a standalone mode of operation in the second radio frequency spectrum band.

Thus, the method 2700 may provide for wireless communication. It should be noted that the method 2700 is just one implementation and that the operations of the method 2700 may be rearranged or otherwise modified such that other implementations are possible.

Figure 28:
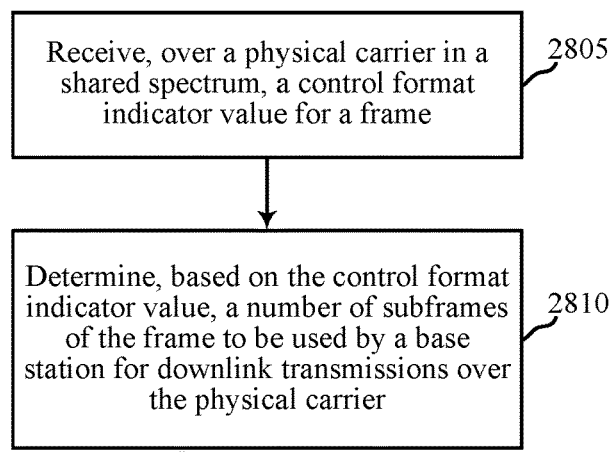
FIG. 28 is a flowchart illustrating an examples of a method for wireless communication, in accordance with various aspects of the present disclosure.

FIG. 28 is a flow chart illustrating an example of a method 2800 for wireless communication, in accordance with various aspects of the present disclosure. For clarity, the method 2800 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 2805, a control format indicator value for a frame may be received over a physical carrier in a shared spectrum. The operation(s) at block 2805 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13C, and/or the control format indicator value reception module 1392 described with reference to FIG. 13D.

In some embodiments, the control format indicator value may be received during a first subframe of a frame, and in some cases during a first symbol of the first subframe. In other embodiments, the control format indicator value may be received during a last symbol of a last subframe of a frame. A bitwidth of the control format indicator value may be based on the structure of a frame.

At block 2810, a number of subframes of the frame to be used by a base station for downlink transmissions over the physical carrier may be determined based on the control format indicator value received at block 2805. The operation(s) at block 2810 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13D, and/or the subframe usage determination module 1394 described with reference to FIG. 13D.

The method 2800 may be performed in various contexts, such as, in a supplemental downlink mode, in a carrier aggregation mode, or in a standalone mode of operation in the second radio frequency spectrum band.

Thus, the method 2800 may provide for wireless communication. It should be noted that the method 2800 is just one implementation and that the operations of the method 2800 may be rearranged or otherwise modified such that other implementations are possible.

Figure 29:
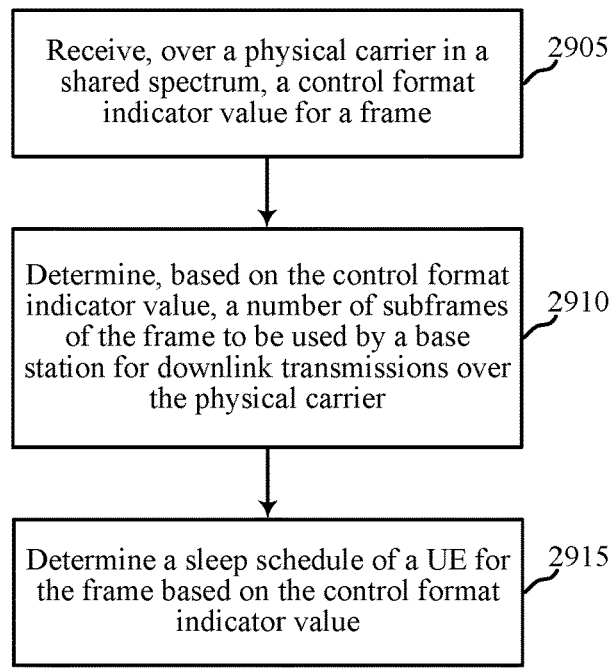
FIG. 29 is a flowchart illustrating an examples of a method for wireless communication, in accordance with various aspects of the present disclosure.

FIG. 29 is a flow chart illustrating an example of a method 2900 for wireless communication, in accordance with various aspects of the present disclosure. For clarity, the method 2900 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 2905, a control format indicator value for a frame may be received over a physical carrier in a shared spectrum. The operation(s) at block 2905 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13C, and/or the control format indicator value reception module 1392 described with reference to FIG. 13D.

In some embodiments, the control format indicator value may be received during a first subframe of a frame, and in some cases during a first symbol of the first subframe. In other embodiments, the control format indicator value may be received during a last symbol of a last subframe of a frame. A bitwidth of the control format indicator value may be based on the structure of a frame.

At block 2910, a number of subframes of the frame to be used by a base station for downlink transmissions over the physical carrier may be determined based on the control format indicator value received at block 2905. The operation(s) at block 2910 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13D, and/or the subframe usage determination module 1394 described with reference to FIG. 13D.

At block 2915, a sleep schedule of a UE for the frame may be determined based on the control format indicator value received at block 2905. The operation(s) at block 2915 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13D, and/or the sleep schedule determination module 1396 described with reference to FIG. 13D.

The method 2900 may be performed in various contexts, such as, in a supplemental downlink mode, in a carrier aggregation mode, or in a standalone mode of operation in the second radio frequency spectrum band.

Thus, the method 2900 may provide for wireless communication. It should be noted that the method 2900 is just one implementation and that the operations of the method 2900 may be rearranged or otherwise modified such that other implementations are possible.

Figure 30:
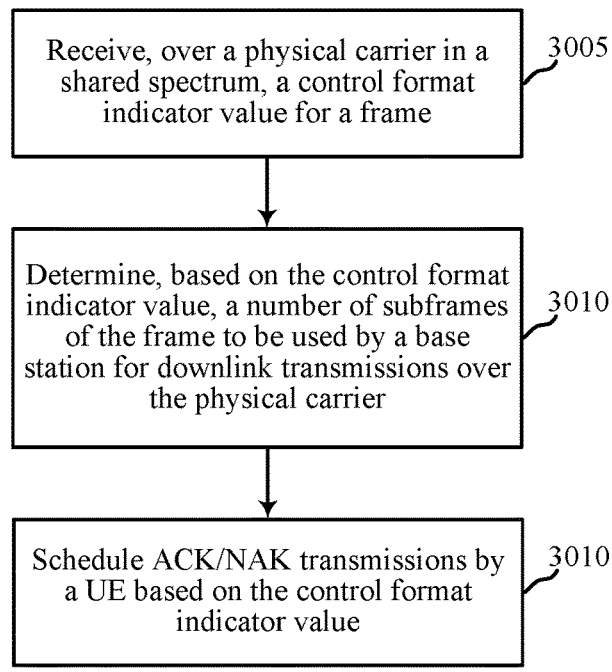
FIG. 30 is a flowchart illustrating an examples of a method for wireless communication, in accordance with various aspects of the present disclosure.

FIG. 30 is a flow chart illustrating an example of a method 3000 for wireless communication, in accordance with various aspects of the present disclosure. For clarity, the method 3000 is described below with reference to aspects of one or more of the apparatuses 1215 and/or 1255 described with reference to FIGS. 12A and/or 12B, and/or one or more of the UEs 115, 215, 1415, and/or 1615 described with reference to FIGS. 1, 2A, 2B, 14, and/or 16. In some embodiments, a device or UE such as one of the apparatuses 1215 or 1255, or one of the UEs 115, 215, 1415, or 1615, may execute one or more sets of codes to control the functional elements of the device or UE to perform the functions described below.

At block 3005, a control format indicator value for a frame may be received over a physical carrier in a shared spectrum. The operation(s) at block 3005 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13C, and/or the control format indicator value reception module 1392 described with reference to FIG. 13D.

In some embodiments, the control format indicator value may be received during a first subframe of a frame, and in some cases during a first symbol of the first subframe. In other embodiments, the control format indicator value may be received during a last symbol of a last subframe of a frame. A bitwidth of the control format indicator value may be based on the structure of a frame.

At block 3010, a number of subframes of the frame to be used by a base station for downlink transmissions over the physical carrier may be determined based on the control format indicator value received at block 3005. The operation(s) at block 3010 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13D, and/or the subframe usage determination module 1394 described with reference to FIG. 13D.

At block 3015, ACK/NACK transmissions may be scheduled by a UE based on the control format indicator value received at block 3005. The operation(s) at block 3015 may in some cases be performed using the communication management module 1220, 1265, 1460, and/or 1681 described with reference to FIGS. 12A, 12B, 14, and/or 16, the control format indicator value management module 1290 and/or 1390 described with reference to FIGS. 12B and/or 13D, and/or the ACK/NACK scheduling module 1398 described with reference to FIG. 13D.

The method 3000 may be performed in various contexts, such as, in a supplemental downlink mode, in a carrier aggregation mode, or in a standalone mode of operation in the second radio frequency spectrum band.

Thus, the method 3000 may provide for wireless communication. It should be noted that the method 3000 is just one implementation and that the operations of the method 3000 may be rearranged or otherwise modified such that other implementations are possible.

In some cases, two or more of the methods 1700, 1800, 1900, 2000, 2100, 2200, 2300, 2400, 2500, 2600, 2700, 2800, 2900, and/or 3000 described with reference to FIGS. 19, 20, 21, 22, 23, 24, 25, 26, 27, 28, 29, and/or 30 may be combined.

The detailed description set forth above in connection with the appended drawings describes exemplary embodiments and does not represent the only embodiments that may be implemented or that are within the scope of the claims. The terms "example" and "exemplary," when used in this description, mean "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
monitoring a first carrier for an indication of a result of a clear channel assessment (CCA) for a second carrier, wherein the first carrier is in a licensed dedicated spectrum and the second carrier is in an unlicensed spectrum;
receiving, over the second carrier, a control format indicator value for a frame based on the indication of the result; and
determining, based on the control format indicator value, a number of subframes of the frame to be used by a node for downlink transmissions over the second carrier, wherein the control format indicator value is received during one of a first symbol of a first subframe of the frame or a last symbol of a last subframe of a previous frame.

2. The method of claim 1, further comprising:
determining a sleep schedule of a user equipment (UE) for the frame based on the control format indicator value.

3. The method of claim 1, wherein a bitwidth of the control format indicator value is based on a structure of the frame.

4. The method of claim 1, wherein the number of subframes of the frame comprises at least one partial subframe.

5. An apparatus for wireless communication, comprising:
a processor; and
memory coupled to the processor, wherein the processor is configured to:
monitor a first carrier for an indication of a result of a clear channel assessment (CCA) for a second carrier, wherein the first carrier is in a licensed dedicated spectrum and the second carrier is in an unlicensed spectrum;
receive, over the second carrier, a control format indicator value for a frame based on the indication of the result; and
determine, based on the control format indicator value, a number of subframes of the frame to be used by a node for downlink transmissions over the second carrier, wherein the control format indicator value is received during one of a first symbol of a first subframe of the frame or a last symbol of a last subframe of a previous frame.

6. The apparatus of claim 5, wherein the processor is further configured to:
determine a sleep schedule of a user equipment (UE) for the frame based on the control format indicator value.

7. The apparatus of claim 5, wherein a bitwidth of the control format indicator value is based on a structure of the frame.

8. The apparatus of claim 5, wherein the number of subframes of the frame comprises at least one partial subframe.

9. A method for wireless communication, comprising:
transmitting over a first carrier an indication of a result of a clear channel assessment (CCA) for a second carrier, wherein the first carrier is in a licensed dedicated spectrum and the second carrier is in an unlicensed spectrum;
determining a number of subframes of a frame to be used by a node for downlink transmissions over the second carrier; and
transmitting, over the second carrier, a control format indicator value for the frame based on the determined number of subframes of the frame, wherein the control format indicator value is transmitted during one of a first symbol of a first subframe of the frame or a last symbol of a last subframe of a previous frame.

10. The method of claim 9, wherein a bitwidth of the control format indicator value is based on a structure of the frame.

11. The method of claim 9, wherein the number of subframes of the frame comprises at least one partial subframe.

12. An apparatus for wireless communication, comprising:
a processor; and
memory coupled to the processor, wherein the processor is configured to:
transmit over a first carrier an indication of a result of a clear channel assessment (CCA) for a second carrier, wherein the first carrier is in a licensed dedicated spectrum and the second carrier is in an unlicensed spectrum;
determine a number of subframes of a frame to be used by a node for downlink transmissions over the second carrier; and
transmit, over the second carrier, a control format indicator value for the frame based on the determined number of subframes of the frame, wherein the control format indicator value is transmitted during one of a first symbol of a first subframe of the frame or a last symbol of a last subframe of a previous frame.

13. The apparatus of claim 12, wherein the number of subframes of the frame comprises at least one partial subframe.

\* \* \* \* \*